United States Patent
Jakobsson et al.

(10) Patent No.: US 12,335,395 B2
(45) Date of Patent: Jun. 17, 2025

(54) ARTIFACT ORIGINATION AND CONTENT TOKENIZATION

(71) Applicant: Artema Labs, Inc, Los Angeles, CA (US)

(72) Inventors: Bjorn Markus Jakobsson, Portola Valley, CA (US); Ajay Kapur, Valencia, CA (US); Madhu Vijayan, Venice, CA (US); Stephen C. Gerber, Austin, TX (US)

(73) Assignee: Artema Labs, Inc., Los Angeles, CA (US)

( * ) Notice: Subject to any disclaimer, the term of this patent is extended or adjusted under 35 U.S.C. 154(b) by 177 days.

(21) Appl. No.: 17/811,853

(22) Filed: Jul. 11, 2022

(65) Prior Publication Data

US 2023/0011621 A1    Jan. 12, 2023

Related U.S. Application Data

(60) Provisional application No. 63/234,086, filed on Aug. 17, 2021, provisional application No. 63/220,641, (Continued)

(51) Int. Cl.
*H04L 9/32* (2006.01)
*H04L 9/30* (2006.01)

(52) U.S. Cl.
CPC .............. *H04L 9/3213* (2013.01); *H04L 9/30* (2013.01); *H04L 9/3247* (2013.01); *H04L 9/3297* (2013.01)

(58) Field of Classification Search
CPC . H04L 9/50; H04L 9/30; H04L 9/3213; H04L 9/3247; H04L 9/3297
See application file for complete search history.

(56) References Cited

U.S. PATENT DOCUMENTS 11,348,099 B2    5/2022  Vijayan
11,468,431 B2*   10/2022  Williams .............. G06Q 20/40
(Continued)

FOREIGN PATENT DOCUMENTS

WO    2012122994 A1    9/2012
WO    2023288205 A1    1/2023

OTHER PUBLICATIONS

International Preliminary Report on Patentability for International Application PCT/US2022/073615, Report issued Jan. 16, 2024, Mailed on Jan. 25, 2024, 08 Pgs.
(Continued)

*Primary Examiner* — Theodore C Parsons
(74) *Attorney, Agent, or Firm* — KPPB LLP

(57) ABSTRACT

Devices can be configured to broadcast blocks incorporating artifact origination tokens. Devices can include network interfaces, memory; and processors. Processors can be configured to obtain artifact-to-time association elements. Artifact-to-time association elements can include artifact references and timestamps. Timestamps can include references to artifact references. Processors can be further configured to obtain artifact origination tokens. Artifact origination tokens can include artifact-to-time association element, certifier descriptors indicating certifier public keys, and/or certifier digital signatures. Certifier digital signatures can be generated based on certifier public keys and/or artifact-to-time association elements. Processors can be further configured to obtain ledger entries including artifact origination tokens with public keys, compute challenges based on ledger entries, and broadcast blocks incorporating the ledger entries. Blocks can be validated using cryptographic systems to obtain proof based challenges.

20 Claims, 37 Drawing Sheets

Related U.S. Application Data filed on Jul. 12, 2021, provisional application No. 63/220,488, filed on Jul. 10, 2021.

(56) References Cited

U.S. PATENT DOCUMENTS

| | | | |
|---|---|---|---|
| 2002/0198873 A1 | 12/2002 | Chu-Carroll | |
| 2003/0095665 A1 | 5/2003 | Wheeler et al. | |
| 2014/0325221 A1 | 10/2014 | Rothschild et al. | |
| 2017/0374049 A1 | 12/2017 | Ateniese et al. | |
| 2020/0007331 A1* | 1/2020 | Wentz | H04L 9/006 |
| 2021/0035246 A1* | 2/2021 | Schouppe | H04L 9/50 |
| 2022/0229883 A1* | 7/2022 | Khandelwal | G06F 21/64 |

OTHER PUBLICATIONS

International Search Report and Written Opinion for International Application No. PCT/US2022/073615, Search completed Sep. 16, 2022, Mailed Oct. 13, 2022, 15 pgs.

Camenisch et al., "Signature Schemes and Anonymous Credentials from Bilinear Maps", Annual International Cryptology Conference CRYPTO 2004: Advances in Cryptology—CRYPTO 2004 pp. 56-72.

Collberg et al., "Self-Plagiarism in Computer Science", Communications of the ACM, Apr. 2005, vol. 48 No. 4, pp. 88-94.

Daian et al., "Flash Boys 2.0: Frontrunning, Transaction Reordering, and Consensus Instability in Decentralized Exchanges", arXiv preprint arXiv: 1904.05234 (2019). Apr. 10, 2019 (Apr. 10, 2019) Retrieved on Sep. 11, 2022 (Sep. 11, 2022) from https://arxiv.org/abs/1904.05234.

Firsov et al., "Verified Security of BLT Signature Scheme", CPP 2020: Proceedings of the 9th ACM Sigplan International Conference on Certified Programs and Proofs Jan. 2020 pp. 244-257 https://doi.org/10.1145/3372885.3373828.

Makela, "Survey of Semantic Search Research", Proceedings of the Seminar on Knowledge Management on the Semantic, 2008, 11 pgs.

Ross et al., "Determining Song Similarity using Deep Unsupervised Learning", 2017, CS229 Final Project Report, 6 pgs.

\* cited by examiner

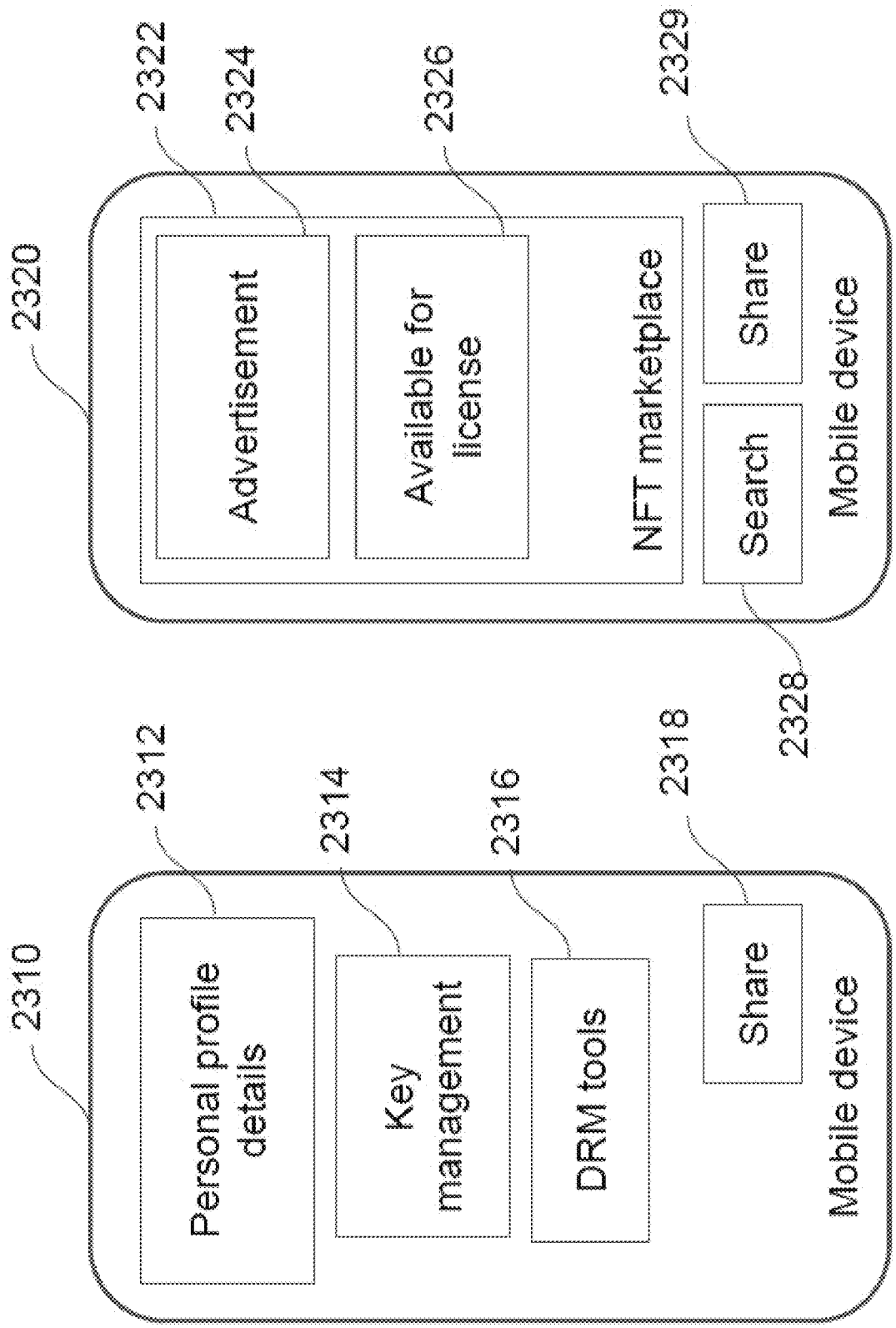

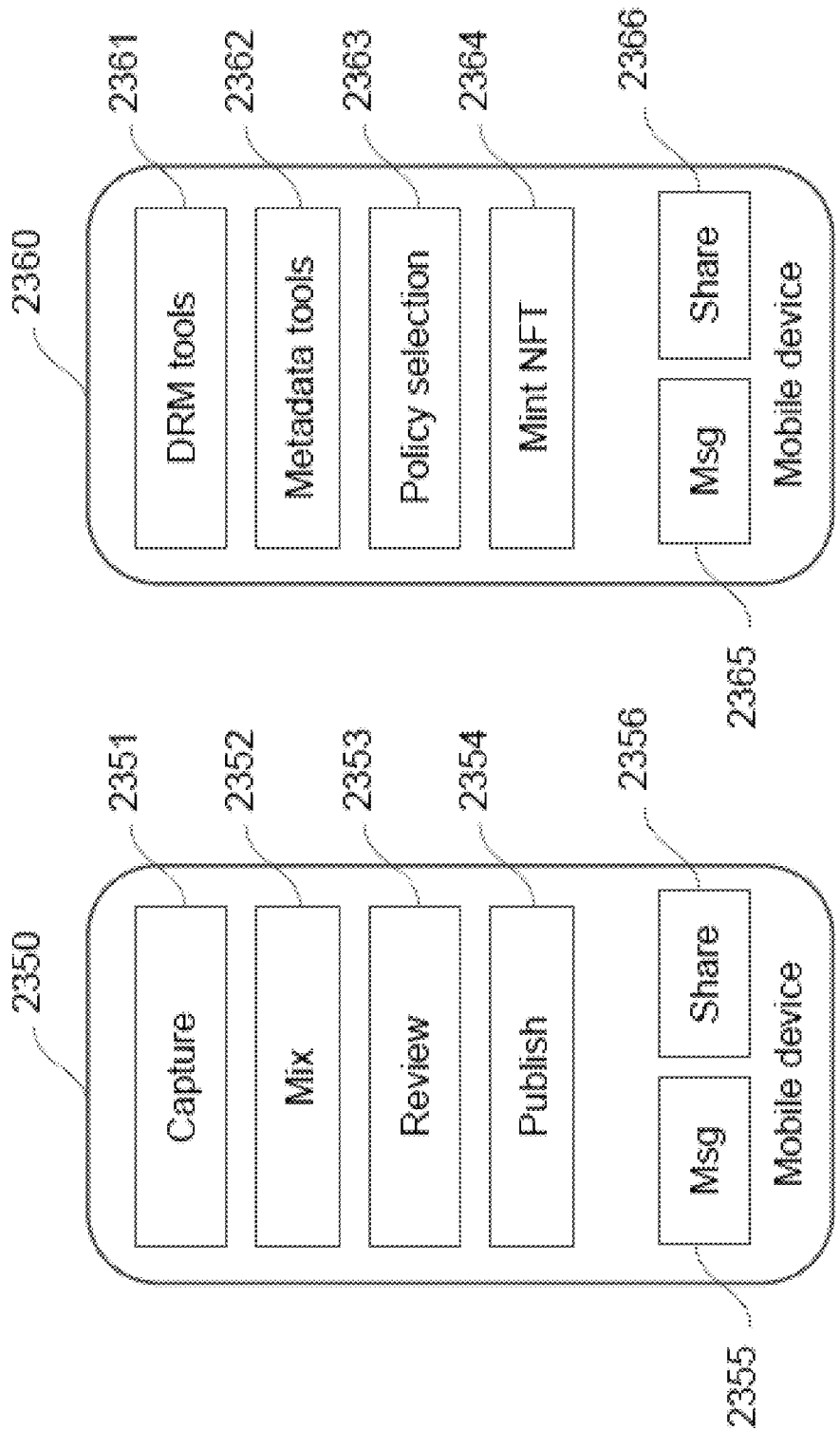

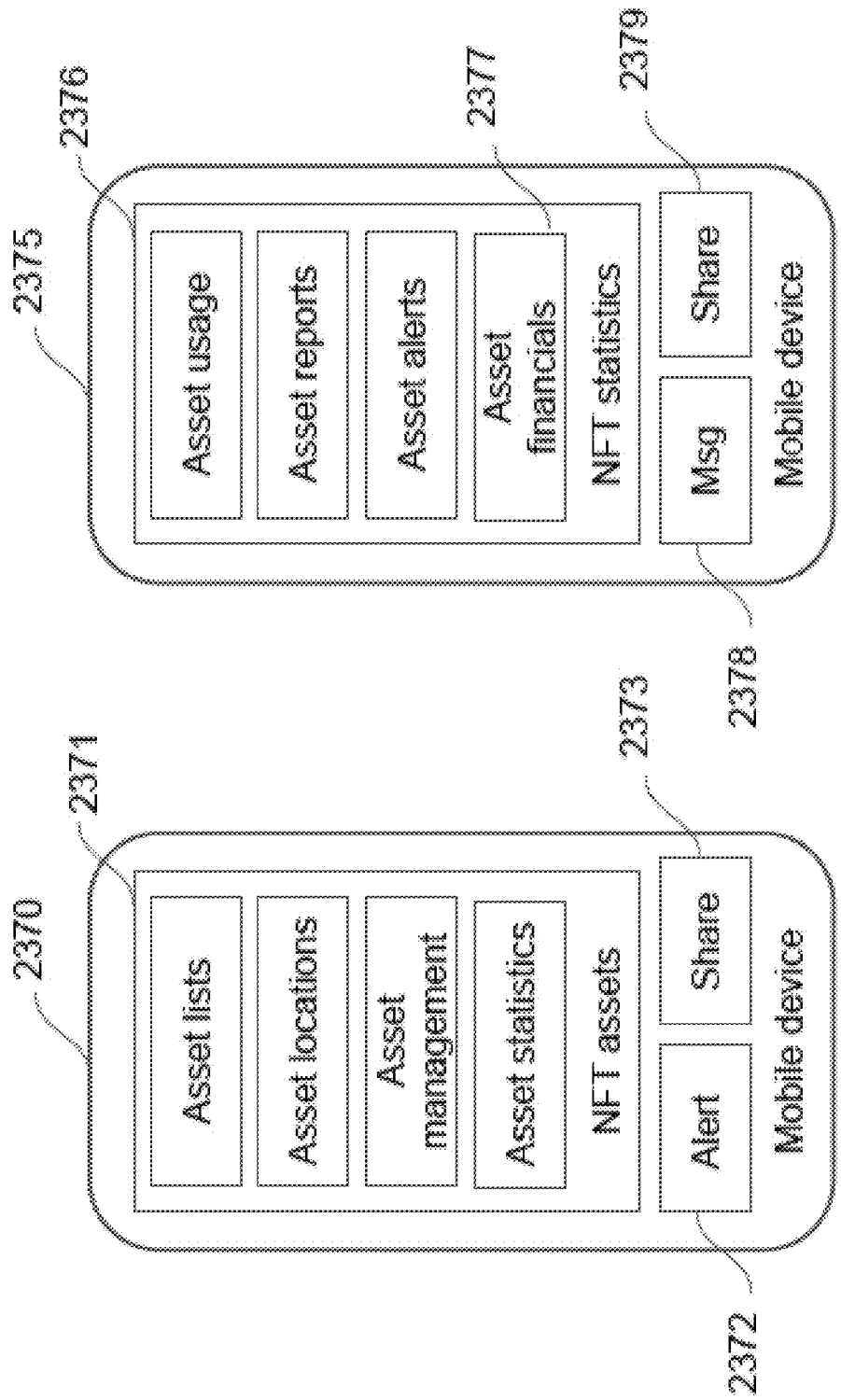

ARTIFACT ORIGINATION AND CONTENT TOKENIZATION

CROSS-REFERENCE TO RELATED APPLICATIONS

The current application claims the benefit of and priority under 35 U.S.C. § 119(e) to U.S. Provisional Patent Application No. 63/220,488 entitled "Content Origin Determination and Tokenization" filed Jul. 10, 2021, U.S. Provisional Patent Application No. 63/220,641 entitled "Tokenization and Quantification of Creative Content Elements" filed Jul. 12, 2021, and U.S. Provisional Patent Application No. 63/234,086 entitled "Tokenization and Promotion of Authored Content" filed Aug. 17, 2021; the disclosures of which are hereby incorporated by reference in their entireties for all purposes.

FIELD OF THE INVENTION

This invention relates to cryptography. More particularly it relates to accessing and generating tokens associated with cryptographic systems.

BACKGROUND OF THE INVENTION

Cryptography can be used to provide security, privacy and authenticity to transactions. Some cryptographic components, such as digital signatures and encryption functions, are standardized and well-studied with known security characteristics. Cryptography can be used to create immutable ledgers such as (but not limited to) blockchains. Immutable ledgers and blockchains can be based on a variety of cryptographic methods. In some implementations of immutable ledgers and blockchains, mining is used to securely add information. Mining can include computer systems (often referred to as "miners") generating proofs based on computational challenges. Generally, a proof can be an output of a function that conforms to one or more requirements defined by a challenge. A proof protocol can be a function used to generate a proposed proof. The proof protocol can be iteratively performed until a proof is generated which meets the requirements of the challenge. The requirements of the challenge can be based on a difficulty. Mining can also include the use of computer systems known as "verifiers" that perform processes to check the generated proofs. In many instances, a proof can be easily verified based on providing successful inputs to a verifier. Miners and verifies can be implemented using any one or more of personal computers, application-specific integrated circuits, mobile devices (e.g. a mobile phone or tablet), server computer systems, virtual machines executing on computer systems, and/or any other form of computing device capable of performing computations associated with the performance of a particular mining or verifier function.

In a traditional blockchain based payment, a payer receives a public key from a payee and generates a digital signature on a message that includes the received public key. This enables the holder of the associated private key, namely the payee, to use the generated digital signature and the private key associated with the signed public key to spend money according to the same technique as the payer used to transfer funds to the payee. In traditional systems, a token (e.g. a fungible token) can be transferred to multiple payees (e.g. transfer ⅓ of token to a payee and ⅔ of a token to a second payee (e.g. the payer). Traditionally, non-fungible token, cannot be transferred in part, so there can only be one recipient.

SUMMARY OF THE INVENTION

A device can be configured to broadcast blocks incorporating artifact origination tokens. In an embodiment, the device includes a network interface, memory and a processor. The processor configured to obtain an artifact-to-time association element. The artifact-to-time association element including an artifact reference, and a timestamp. The timestamp including a reference to the artifact reference. The processor further configured to obtain an artifact origination token. The artifact origination token including the artifact-to-time association element, a certifier descriptor indicating a certifier public key, and a certifier digital signature. The certifier digital signature generated based on the certifier public key and the artifact-to-time association element. The processor further configured to obtain a ledger entry including the artifact origination token and a public key, and compute a challenge using a cryptographic system. The challenge is based on the ledger entry. The processor further configured to broadcast a block that incorporates the ledger entry to securely add the block to a distributed ledger. The block is capable of being validated by using a cryptographic system to obtain a proof based on the challenge.

In another embodiment, the processor is further configured to receive the block, and the proof is obtained based on the block.

In a further embodiment, the proof is generated based on an iterative process.

In still another embodiment, the timestamp further comprises a reference to a blockchain.

In a still further embodiment, the timestamp further comprises assertions.

In yet another embodiment, the artifact reference is a URL to where an artifact is stored.

In a still yet further embodiment, the artifact-to-time association element further comprises an artifact checksum.

In still another additional embodiment, the artifact-to-time association element further comprises a certainty score.

In a still further additional embodiment, the artifact-to-time association element further comprises a precision score.

In still another embodiment again, the artifact-to-time association element further comprises an origination assessment score.

In yet another additional embodiment, the artifact-to-time association element further comprises a context descriptor.

In a yet further additional embodiment, wherein the timestamp is an origination timestamp.

In yet another embodiment again, the processor is further configured to receive a proof of origination.

In a yet further embodiment again, the processor is further configured to receive origination evidence.

In another additional embodiment again, the origination evidence is based on timestamped version of an artifact.

In a further additional embodiment again, the origination evidence comprises a series of timestamps associated with a series of version of an artifact.

In still yet another additional embodiment, the artifact is a document.

In another embodiment, the artifact was generated using a trusted service.

In a further embodiment, the origination evidence is obtained from the trusted service.

In still another embodiment, the origination evidence is an assertion obtained by from the trusted service.

In a still further embodiment, the timestamp is created by a trusted platform.

In yet another embodiment, the timestamp is created by a trusted execution environment.

In a yet further embodiment, the timestamp is created by a digital rights management platform.

In another additional embodiment, the artifact-to-time association element further comprise an initiation timestamp indicating when creation of an artifact was initiated.

In a further additional embodiment, the artifact-to-time association element further comprise a completion timestamp indicating when creation of an artifact was completed.

In a further additional embodiment again, the timestamp further comprises an assertion by a certifier.

In still yet another embodiment, the ledger entry associates the artifact origination token with a public key.

In a still yet further embodiment, the timestamp is generated based on public postings.

In still another additional embodiment, the artifact origination token further comprises a certifier certificate.

In a still further additional embodiment, the artifact origination token further comprises a claimant public key.

In still another embodiment again, the artifact origination token further comprises a certifier descriptor.

A device can be configured to broadcast blocks incorporating artifact-to-time association elements. In an embodiment, the device includes a network interface, memory, and a processor. The processor configured to obtain an artifact-to-time association element. The artifact-to-time association element including an artifact reference, and a timestamp. The timestamp including a reference to the artifact reference. The processor further configured to obtain a ledger entry including the artifact-to-time association element, and compute a challenge using a cryptographic system. The challenge is based on the ledger entry. The processor further configured to broadcast a block that incorporates the ledger entry to securely add the block to a distributed ledger. The block is capable of being validated by using a cryptographic system to obtain a proof based on the challenge.

In a still yet further embodiment, the processor is further configured to receive the block; and the proof is obtained based on the block.

In still another additional embodiment, the proof is generated based on an iterative process.

In a still further additional embodiment, the proof is generated based on an iterative process.

In still another embodiment again, the timestamp further comprises a reference to a blockchain.

In a still further embodiment again, the timestamp further comprises assertions.

In yet another additional embodiment, wherein the artifact reference comprises a URL to where an artifact is stored.

In yet another embodiment again, the artifact-to-time association element further comprises an artifact checksum.

In a yet further embodiment again, the artifact-to-time association element further comprises a certainty score.

In another additional embodiment again, the artifact-to-time association element further comprises a precision score.

In another embodiment, the artifact-to-time association element further comprises an origination assessment score.

In a further embodiment, the artifact-to-time association element further comprises a context descriptor.

In a still further embodiment, the timestamp is an origination timestamp.

In yet another embodiment, the processor is further configured to receive a proof of origination.

In a yet further embodiment, wherein the processor is further configured to receive origination evidence.

In another additional embodiment, the origination evidence is based on timestamped version of an artifact.

In a further additional embodiment, the origination evidence comprises a series of timestamps associated with a series of version of an artifact.

In another embodiment again, the artifact is a document.

In a further embodiment again, the artifact was generated using a trusted service.

In still yet another embodiment, the origination evidence is obtained from the trusted service.

In a still yet further embodiment, the origination evidence is an assertion obtained by from the trusted service.

In still another additional embodiment, the timestamp is created by a trusted platform.

In a still further additional embodiment, the timestamp is created by a trusted execution environment.

In still another embodiment again, the timestamp is created by a digital rights management platform.

In a still further embodiment again, the artifact-to-time association element further comprise an initiation timestamp indicating when creation of an artifact was initiated.

In yet another additional embodiment, the artifact-to-time association element further comprise a completion timestamp indicating when creation of an artifact was completed.

In yet another embodiment again, the timestamp further comprises an assertion by a certifier.

In a yet further embodiment again, the timestamp is generated based on public postings.

A device can be configured to broadcast blocks incorporating artifact origination tokens. In an embodiment, the device includes a network interface, memory, and a processor. The processor configured to receive a reference to a content file, generate metadata elements based on the content file, and generate a ledger entry including a non-fungible token. The non-fungible token including a reference to a content file, and the metadata elements. The processor further configured to compute a challenge using a cryptographic system. The challenge is based on the ledger entry. The processor further configured to broadcast a block that incorporates the ledger entry to securely add the block to a distributed ledger. The block is capable of being validated by using a cryptographic system to obtain a proof based on the challenge.

In another embodiment, the processor is further configured to receive the block; and the proof is obtained based on the block.

In a further embodiment, the proof is generated based on an iterative process.

In a still yet further embodiment, the metadata elements are generated by an AI classifier.

In still another additional embodiment, the content file is a video file.

In a still further additional embodiment, the content file is an audio file.

In still another embodiment again, the content file is a document.

In a still further embodiment again, the processor is further configured to store the metadata elements.

In yet another additional embodiment, the processor is further configured to perform searches on the metadata elements.

In yet another embodiment again, the processor is further configured to transmit the reference to the content file based on a result from a search, the search performed on the metadata elements.

In a yet further embodiment again, the metadata elements comprise content classifications.

In another additional embodiment again, the processor is further configured to receive a collaboration request, and match a collaboration request to the non-fungible token based on the metadata elements.

In another embodiment, the metadata elements comprise a policy.

In a further embodiment, generating metadata elements can be further based on inputs received from a user.

In a still further embodiment, the metadata elements comprise content categories.

In yet another embodiment, the metadata elements comprise content characteristics.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIG. 23A conceptually illustrates an example implementation of a personal profile functionality.

FIG. 23B conceptually illustrates an example implementation of an NFT marketplace functionality.

FIG. 23E conceptually illustrates an example implementation of an NFT content creation functionality.

FIG. 23F conceptually illustrates an example implementation of an NFT content publishing functionality.

FIG. 23G conceptually illustrates an example implementation of an NFT asset management functionality.

FIG. 23H conceptually illustrates an example implementation of an NFT asset statistics functionality specifically for the NFT assets produced by the owner.

DETAILED DESCRIPTION

Figure 1:
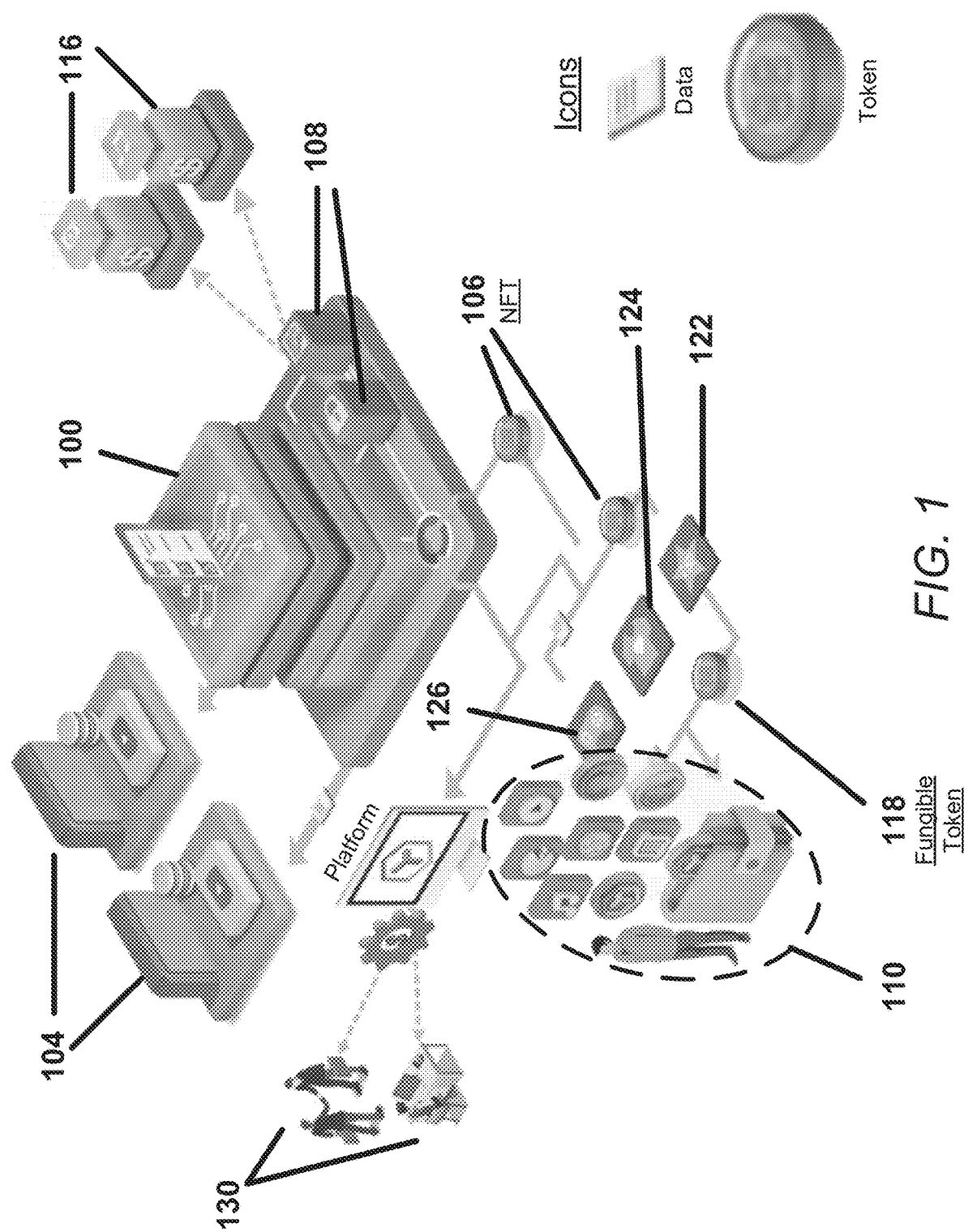
FIG. 1 is a conceptual diagram of an NFT platform in accordance with an embodiment of the invention.

Traditionally, ownership rights are commonly supported by evidence of physical possession. For example, a person with physical possession of a painting can be assumed to be the owner of the painting, absent any indications of the opposite, such as a report of a theft, the knowledge of the true owner, or the sheer implausibility of ownership. On the Internet, this is more problematic. Firstly, it is not always easy to determine what is plausible, especially given pseudonymity. It is especially problematic in the context of NFTs, where ownership is commonly distinct from access rights, license rights and copyright. For example, an NFT of a famous photo associates ownership of that famous photo with a party associated with the NFT, but does not typically bar others from accessing the photo, which may be freely available on the Internet. The problem is particularly troublesome in that it is, in principle at least, possible for anybody to claim ownership of an artifact by minting an NFT from it, and associating the NFT with themselves. This is not only true for NFTs, but holds for any token, such as a movie script, a musical composition, or a fractional ownership in an enterprise.

In various embodiments, ownership of NFTs and associated artifacts are improved. Systems and methods in accordance with some embodiments of the invention can address the maintenance of ownership and enable a dramatic reduction of fraud risk. The solutions can help content producers, such as artists; middlemen that invest their time and money in identifying new talent; and investors that support this economy.

At the heart of the problem of ownership of digital content, lies the matter of origin. The origin of an artifact can be proven using various techniques providing provenance, such as certifications, endorsements, recommendations, and/or transaction histories. In several embodiments, systems and processes enable determining and proving original ownership of artifacts and associated NFTs.

In several embodiments, providing origination determination and tokenization services helps creators and artists protect their artifacts from fakes, modifications, and forgeries and enables them to provide certification, in the form of a token, from an authority. The token may help protect the artifact, or asset, financially such as with the insurance examples herein. Publishers and distributors of origin-certified assets may be able to reduce costs associated with vetting information before publication, or even to reduce risk for those publishers that seldom, or never, properly source the information in their publications.

In several embodiments, certification authorities providing origin determinations and resulting tokens can provide a wealth of rich services. For example, the authority may offer creators, and/or artifact owners, with a simple token to certify that something existed at a given time; or to tokenize that something unique exists at the time of a timestamp; or to tokenize that something is unique and valuable at the time of a timestamp; or to tokenize that something is unique and valuable at the time of a timestamp and to continuously monitor for fakes and forgeries moving forward; or to be able to also assign evidence of ownership of an asset. The additional service of tokenizing the evidence revealed by the authority serves to protect the authority, but can also serve to enable the content creator to later defend his or her work, whether via smart contracts, in legal settings, or during negotiations. In several embodiments, authorities can make evidence available to creators at the time of the token generation, or later. In a number of embodiments, tokenized evidence, much like documenting a crime scene, can reveal the authority's methods and contacts. Tokenizing artifacts with an origin determination, as performed in various embodiments, much like an artist's signature on canvas, can also make it far easier to locate an asset owner for subsequent licensing efforts.

Various art-related industries, such as the music and or writing industry, suffer from numerous copyright, ownership, and marketplace problems. Generally speaking, artists of many types, such as, but not limited to musicians, actors, novelists, script authors, painters, tattoo artists, jewelry designers, graphic designers, and even graffiti artists are challenged by a lack of legal knowledge, poor representation whether legal or from enterprises such as music labels, the introduction of intermediaries between artists and their audience or fans, and industry practices that have not kept up with technological advances. Examples of the problems are many. Artists can be rather disconnected from their fan base in a way they are unable to monetize their content. Artists can be forced, by marketplace circumstances, to offer their products on intermediary platforms such as streaming platforms for audio and video and artwork such as iTunes™, Spotify™, and Amazon Music™, etc., and traditional record labels, at a substantial loss of profit to the artist. Artists can have difficulty gaining early follower momentum without the assistance of the centralized recording industry. Artists rarely get the opportunity to set the "licensing terms" for their creations. Many artists often sign away ownership of their creations whether through ignorance or leverage from an intermediary such as a recording label. Artists are not protected, and are unable to monetize, from 3rd-parties that utilize the content and metadata for algorithms such as those used by machine learning systems in the training process. Artists, especially new artists, lack visibility and advertising within the intermediary platforms. Artists, especially new artists, want the ability to interact heavily with their prime influencers. Artists, especially new artists, are unable to directly benefit from recommendations and inexpensive direct advertising. Artists do not directly profit from their social media interactions. Artists often play only one instrument or two and it is difficult for them to publish a "beat", for instance, for other artists to license and build upon. Artists find it difficult in today's environment, to release short music tracks to elicit feedback. Artists gain little content usage knowledge from the big systems that stream the content. And finally, fans often lose or misplace content—records break, downloads get lost, content is stolen etc. Artists often have many platforms for releasing the products, such as fully produced and mastered music and many streaming platforms such as those mentioned above. The artists also have social media platforms at their disposal. For example, a musician has fans that can also follow on social media platforms, learn about the artist's latest concerts, releases, and other personal information that they want to share. However, there is no monetization that happens directly from the social media followers other than indirect marketing of the artist's music and events. If, for example, the artist is starting to compose a new song, there is no ability to post new melodic ideas and truly see how the fans react, other than a series of likes. In a best-case scenario the new melody post might go viral, but the only entity to benefit is the social media platform itself.

In several embodiments of the invention, content creators are able to generate content, receive feedback directly from fans, collaborate with other artists, set policies for licensing and derivative works, serve content to fans based on demographics information and other information, license works from other content creators, etc. In various embodiments, content users can search databases to find specific content based on various filters. In several embodiments, integrated applications are provided where content creators can create works, market works, set licensing policies, mint NFTs, license works from others, receive editorial services, and demonstrate the originality of content.

Non-Fungible Token (NFT) Platforms

Turning now to the drawings, systems and methods for implementing blockchain-based Non-Fungible Token (NFT) platforms in accordance with various embodiments of the invention are illustrated. In several embodiments, blockchain-based NFT platforms are platforms which enable content creators to issue, mint, and transfer Non-Fungible Tokens (NFTs) directed to content including, but not limited to, rich media content.

In a number of embodiments, content creators can issue NFTs to users within the NFT platform. NFTs can be created around a large range of real-world media content and intellectual property. Movie studios can mint digital collectibles for their movies, characters, notable scenes and/or notable objects. Record labels can mint digital collectibles for artists, bands, albums and/or songs. Similarly, official digital trading cards can be made from likeness of celebrities, cartoon characters and/or gaming avatars.

NFTs minted using NFT platforms in accordance with various embodiments of the invention can have multifunctional programmable use cases including rewards, private access to premium content and experiences, as discounts toward the purchase of goods, among many other value-added use cases.

In many embodiments, each NFT can have a set of attributes that define its unique properties. NFTs may therefore be classified based on which attributes are emphasized. Possible classifications may address, but are not limited to: NFTs as identifying entities, NFTs output by other NFTs, NFTs as content creation assets, and NFTs as evaluating entities. NFTs can be interpreted differently by various platforms in order to create platform-specific user experiences. The metadata associated with an NFT may also include digital media assets such as (but not limited to) images, videos about the specific NFT, and the context in which it was created (studio, film, band, company song etc.).

In many embodiments, NFT storage may be facilitated through mechanisms for the transfer of payment from users to one or more service providers. Through these mechanisms, a payment system for NFT maintenance can allow for incremental payment and ongoing asset protection. NFT storage may be additionally self-regulated through willing participants disclosing unsatisfactory NFT management in exchange for rewards.

In many embodiments, the NFT platform can include media wallet applications that enable users to securely store NFTs and/or other tokens on their devices. Furthermore, media wallets (also referred to as "digital wallets") can enable users to obtain NFTs that prove purchase of rights to access a particular piece of media content on one platform and use the NFT to gain access to the purchased content on another platform. The consumption of such content may be governed by content classification directed to visual user interface systems.

In several embodiments, users can download and install media wallet applications to store NFTs on the same computing devices used to consume streamed and/or downloaded content. Media wallet applications and NFTs can disseminate data concerning media consumption on the computing devices on which the media wallet applications are installed and/or based upon observations indicative of media consumption independently of the device. Media consumption data may include, but is not limited to, data reporting the occurrence of NFT transactions, data reporting the occurrence of NFT event interactions data reporting the content of NFT transactions, data reporting the content of media wallet interactions, and/or data reporting the occurrence of media wallet interactions.

While various aspects of NFT platforms, NFTs, media wallets, blockchain configurations, reporting structures, and maintenance systems are discussed above, NFT platforms and different components that can be utilized within NFT platforms in accordance with various embodiments of the invention are discussed further below.

NFT Platforms

An NFT platform in accordance with an embodiment of the invention is illustrated in FIG. 1. The NFT platform 100 utilizes one or more immutable ledgers (e.g. one or more blockchains) to enable a number of verified content creators 104 to access an NFT registry service to mint NFTs 106 in a variety of forms including (but not limited to) celebrity NFTs 122, character NFTs from games 126, NFTs that are redeemable within games 126, NFTs that contain and/or enable access to collectibles 124, and NFTs that have evolutionary capabilities representative of the change from one NFT state to another NFT state.

Issuance of NFTs 106 via the NFT platform 100 enables verification of the authenticity of NFTs independently of the content creator 104 by confirming that transactions written to one or more of the immutable ledgers are consistent with the smart contracts 108 underlying the NFTs.

As is discussed further below, content creators 104 can provide the NFTs 106 to users to reward and/or incentivize engagement with particular pieces of content and/or other user behavior including (but not limited to) the sharing of user personal information (e.g. contact information or user ID information on particular services), demographic information, and/or media consumption data with the content creator and/or other entities. In addition, the smart contracts 108 underlying the NFTs can cause payments of residual royalties 116 when users engage in specific transactions involving NFTs (e.g. transfer of ownership of the NFT).

In a number of embodiments, users utilize media wallet applications 110 on their devices to store NFTs 106 distributed using the NFT platform 100. Users can use media wallet applications 110 to obtain and/or transfer NFTs 106. In facilitating the retention or transfer of NFTs 106, media wallet applications may utilize wallet user interfaces that engage in transactional restrictions through either uniform or personalized settings. Media wallet applications 110 in accordance with some embodiments may incorporate NFT filtering systems to avoid unrequested NFT assignment. Methods for increased wallet privacy may also operate through multiple associated wallets with varying capabilities. As can readily be appreciated, NFTs 106 that are implemented using smart contracts 108 having interfaces that comply with open standards are not limited to being stored within media wallets and can be stored in any of a variety of wallet applications as appropriate to the requirements of a given application. Furthermore, a number of embodiments of the invention support movement of NFTs 106 between different immutable ledgers. Processes for moving NFTs between multiple immutable ledgers in accordance with various embodiments of the invention are discussed further below.

In several embodiments, content creators 104 can incentivize users to grant access to media consumption data using offers including (but not limited to) offers of fungible tokens 118 and/or NFTs 106. In this way, the ability of the content creators to mint NFTs enables consumers to engage directly with the content creators and can be utilized to incentivize users to share with content creators' data concerning user interactions with additional content. The permissions granted by individual users may enable the content creators 104 to directly access data written to an immutable ledger. In many embodiments, the permissions granted by individual users enable authorized computing systems to access data within an immutable ledger and content creators 104 can query the authorized computing systems to obtain aggregated information. Numerous other example functions for content creators 104 are possible, some of which are discussed below.

NFT blockchains in accordance with various embodiments of the invention enable issuance of NFTs by verified users. In many embodiments, the verified users can be content creators that are vetted by an administrator of networks that may be responsible for deploying and maintaining the NFT blockchain. Once the NFTs are minted, users can obtain and conduct transactions with the NFTs. In several embodiments, the NFTs may be redeemable for items or services in the real world such as (but not limited to) admission to movie screenings, concerts, and/or merchandise.

As illustrated in FIG. 1, users can install the media wallet application 110 onto their devices and use the media wallet application 110 to purchase fungible tokens. The media wallet application could also be provided by a browser, or by a dedicated hardware unit executing instructions provided by a wallet manufacturer. The different types of wallets may have slightly different security profiles and may offer different features, but would all be able to be used to initiate the change of ownership of tokens, such as NFTs. In many embodiments, the fungible tokens can be fully converted into fiat currency and/or other cryptocurrency. In several embodiments, the fungible tokens are implemented using split blockchain models in which the fungible tokens can be issued to multiple blockchains (e.g. Ethereum). As can readily be appreciated, the fungible tokens and/or NFTs utilized within an NFT platform in accordance with various embodiments of the invention are largely dependent upon the requirements of a given application.

In several embodiments, the media wallet application is capable of accessing multiple blockchains by deriving accounts from each of the various immutable ledgers used within an NFT platform. For each of these blockchains, the media wallet application can automatically provide simplified views whereby fungible tokens and NFTs across multiple accounts and/or multiple blockchains can be rendered as single user profiles and/or wallets. In many embodiments, the single view can be achieved using deep-indexing of the relevant blockchains and API services that can rapidly provide information to media wallet applications in response to user interactions. In certain embodiments, the accounts across the multiple blockchains can be derived using BIP32 deterministic wallet key. In other embodiments, any of a variety of techniques can be utilized by the media wallet application to access one or more immutable ledgers as appropriate to the requirements of a given application.

NFTs can be purchased by way of exchanges 130 and/or from other users. In addition, content creators can directly issue NFTs to the media wallets of specific users (e.g. by way of push download or AirDrop). In many embodiments, the NFTs are digital collectibles such as celebrity NFTs 122, character NFTs from games 126, NFTs that are redeemable within games 126, and/or NFTs that contain and/or enable access to collectibles 124. It should be appreciated that a variety of NFTs are described throughout the discussion of the various embodiments described herein and can be utilized in any NFT platform and/or with any media wallet application.

While the NFTs are shown as static in the illustrated embodiment, content creators can utilize users' ownership of NFTs to engage in additional interactions with the user. In this way, the relationship between users and particular pieces of content and/or particular content creators can evolve over time around interactions driven by NFTs. In a number of embodiments, collection of NFTs can be gamified to enable unlocking of additional NFTs. In addition, leaderboards can be established with respect to particular content and/or franchises based upon users' aggregation of NFTs. As is discussed further below, NFTs and/or fungible tokens can also be utilized by content creators to incentivize users to share data.

NFTs minted in accordance with several embodiments of the invention may incorporate a series of instances of digital content elements in order to represent the evolution of the digital content over time. Each one of these digital elements can have multiple numbered copies, just like a lithograph, and each such version can have a serial number associated with it, and/or digital signatures authenticating its validity. The digital signature can associate the corresponding image to an identity, such as the identity of the artist. The evolution of digital content may correspond to the transition from one representation to another representation. This evolution may be triggered by the artist, by an event associated with the owner of the artwork, by an external event measured by platforms associated with the content, and/or by specific combinations or sequences of event triggers. Some such NFTs may also have corresponding series of physical embodiments. These may be physical and numbered images that are identical to the digital instances described above. They may also be physical representations of another type, e.g., clay figures or statues, whereas the digital representations may be drawings. The physical embodiments may further be of different aspects that relate to the digital series. Evolution in compliance with some embodiments may also be used to spawn additional content, for example, one NFT directly creating one or more secondary NFTs.

When the user wishes to purchase an NFT using fungible tokens, media wallet applications can request authentication of the NFT directly based upon the public key of the content creator and/or indirectly based upon transaction records within the NFT blockchain. As discussed above, minted NFTs can be signed by content creators and administrators of the NFT blockchain. In addition, users can verify the authenticity of particular NFTs without the assistance of entities that minted the NFT by verifying that the transaction records involving the NFT within the NFT blockchain are consistent with the various royalty payment transactions required to occur in conjunction with transfer of ownership of the NFT by the smart contract underlying the NFT.

Applications and methods in accordance with various embodiments of the invention are not limited to media wallet applications or use within NFT platforms. Accordingly, it should be appreciated that the data collection capabilities of any media wallet application described herein can also be implemented outside the context of an NFT platform and/or in a dedicated application and/or in an application unrelated to the storage of fungible tokens and/or NFTs. Various systems and methods for implementing NFT platforms and media wallet applications in accordance with various embodiments of the invention are discussed further below.

NFT Platform Network Architectures

NFT platforms in accordance with many embodiments of the invention utilize public blockchains and permissioned blockchains. In several embodiments, the public blockchain is decentralized and universally accessible. Additionally, in a number of embodiments, private/permissioned blockchains are closed systems that are limited to publicly inaccessible transactions. In many embodiments, the permissioned blockchain can be in the form of distributed ledgers, while the blockchain may alternatively be centralized in a single entity.

Figure 2:
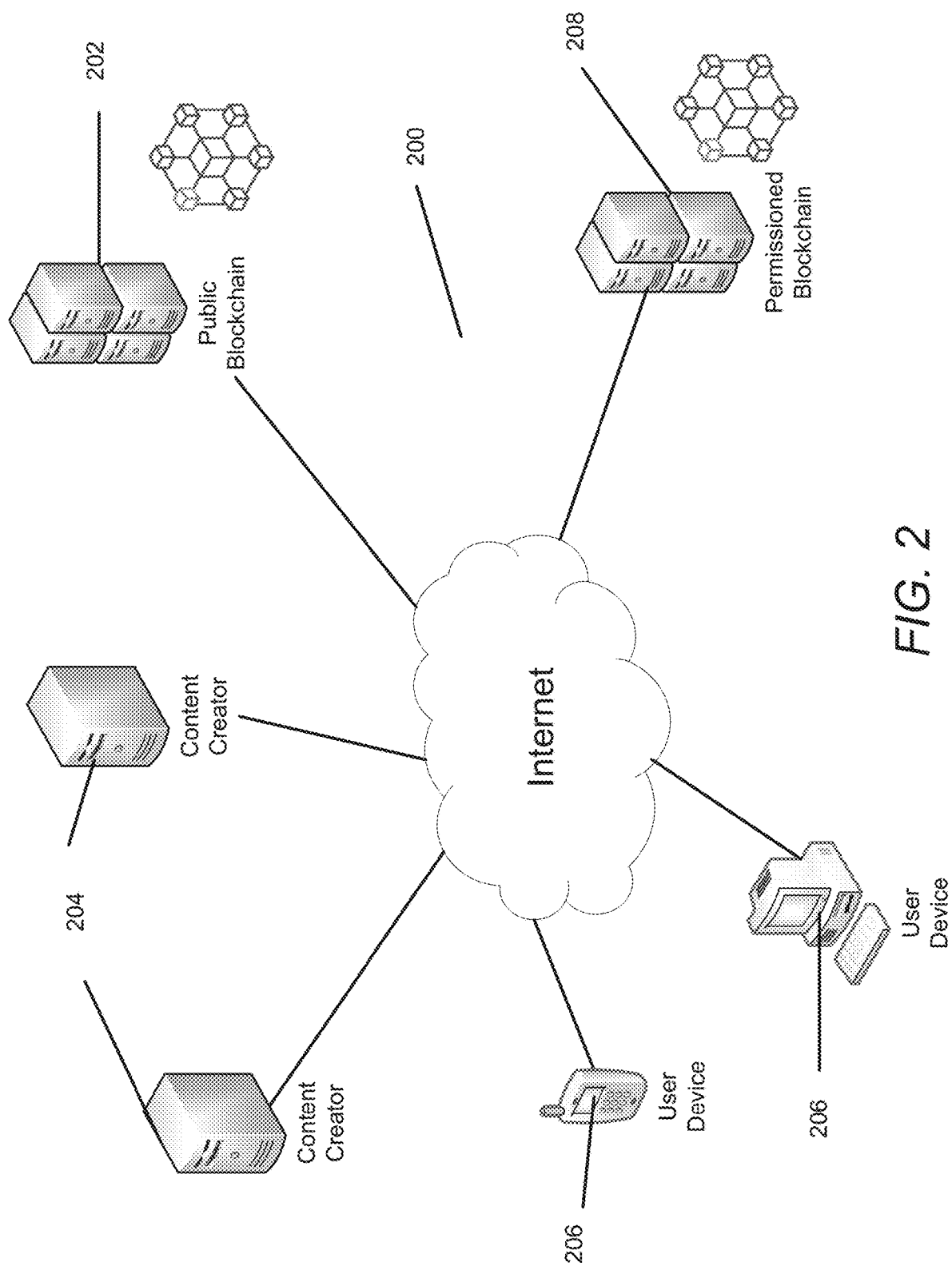
FIG. 2 is a network architecture diagram of an NFT platform in accordance with an embodiment of the invention.

An example of network architecture that can be utilized to implement an NFT platform including a public blockchain and a permissioned blockchain in accordance with several embodiments of the invention is illustrated in FIG. 2. The NFT platform 200 utilizes computer systems implementing a public blockchain 202 such as (but not limited to) Ethereum and Solana. A benefit of supporting interactions with public blockchains 202 is that the NFT platform 200 can support minting of standards based NFTs that can be utilized in an interchangeable manner with NFTs minted by sources outside of the NFT platform on the public blockchain. In this way, the NFT platform 200 and the NFTs minted within the NFT platform are not part of a walled garden, but are instead part of a broader blockchain-based ecosystem. The ability of holders of NFTs minted within the NFT platform 200 to transact via the public blockchain 202 increases the likelihood that individuals acquiring NFTs will become users of the NFT platform. Initial NFTs minted outside the NFT platform can also be developed through later minted NFTs, with the initial NFTs being used to further identify and interact with the user based upon their ownership of both NFTs. Various systems and methods for facilitating the relationships between NFTs, both outside and within the NFT platform are discussed further below.

Users can utilize user devices configured with appropriate applications including (but not limited to) media wallet applications to obtain NFTs. In many embodiments, media wallets are smart device enabled, front-end applications for fans and/or consumers, central to all user activity on an NFT platform. As is discussed in detail below, different embodiments of media wallet applications can provide any of a variety of functionality that can be determined as appropriate to the requirements of a given application. In the illustrated embodiment, the user devices 206 are shown as mobile phones and personal computers. As can readily be appreciated user devices can be implemented using any class of consumer electronics device including (but not limited to) tablet computers, laptop computers, televisions, game consoles, virtual reality headsets, mixed reality headsets, augmented reality headsets, media extenders, and/or set top boxes as appropriate to the requirements of a given application.

In many embodiments, NFT transaction data entries in the permissioned blockchain 208 are encrypted using users' public keys so that the NFT transaction data can be accessed by the media wallet application. In this way, users control access to entries in the permissioned blockchain 208 describing the user's NFT transaction. In several embodiments, users can authorize content creators 204 to access NFT transaction data recorded within the permissioned blockchain 208 using one of a number of appropriate mechanisms including (but not limited to) compound identities where the user is the owner of the data and the user can authorize other entities as guests that can also access the data. As can readily be appreciated, particular content creators' access to the data can be revoked by revoking their status as guests within the compound entity authorized to access the NFT transaction data within the permissioned blockchain 208. In certain embodiments, compound identities are implemented by writing authorized access records to the permissioned blockchain using the user's public key and the public keys of the other members of the compound entity.

When content creators wish to access particular pieces of data stored within the permissioned blockchain 208, they can make a request to a data access service. The data access service may grant access to data stored using the permissioned blockchain 208 when the content creators' public keys correspond to public keys of guests. In a number of embodiments, guests may be defined within a compound identity. The access record for the compound entity may also authorize the compound entity to access the particular piece of data. In this way, the user has complete control over access to their data at any time by admitting or revoking content creators to a compound entity, and/or modifying the access policies defined within the permissioned blockchain 208 for the compound entity. In several embodiments, the permissioned blockchain 208 supports access control lists and users can utilize a media wallet application to modify permissions granted by way of the access control list. In many embodiments, the manner in which access permissions are defined enables different restrictions to be placed on particular pieces of information within a particular NFT transaction data record within the permissioned blockchain 208. As can readily be appreciated, the manner in which NFT platforms and/or immutable ledgers provide fine-grained data access permissions largely depends upon the requirements of a given application.

In many embodiments, storage nodes within the permissioned blockchain 208 do not provide content creators with access to entire NFT transaction histories. Instead, the storage nodes simply provide access to encrypted records. In several embodiments, the hash of the collection of records from the permissioned blockchain is broadcast. Therefore, the record is verifiably immutable and each result includes the hash of the record and the previous/next hashes. As noted above, the use of compound identities and/or access control lists can enable users to grant permission to decrypt certain pieces of information or individual records within the permissioned blockchain. In several embodiments, the access to the data is determined by computer systems that implement permission-based data access services.

In many embodiments, the permissioned blockchain 208 can be implemented using any blockchain technology appropriate to the requirements of a given application. As noted above, the information and processes described herein are not limited to data written to permissioned blockchains 208, and NFT transaction data simply provides an example. Systems and methods in accordance with various embodiments of the invention can be utilized to enable applications to provide fine-grained permission to any of a variety of different types of data stored in an immutable ledger as appropriate to the requirements of a given application in accordance with various embodiments of the invention.

While various implementations of NFT platforms are described above with reference to FIG. 2, NFT platforms can be implemented using any number of immutable and pseudo-immutable ledgers as appropriate to the requirements of specific applications in accordance with various embodiments of the invention. Blockchain databases in accordance with various embodiments of the invention may be managed autonomously using peer-to-peer networks and distributed timestamping servers. In some embodiments, any of a variety of consensus mechanisms may be used by public blockchains, including but not limited to Proof of Space mechanisms, Proof of Work mechanisms, Proof of Stake mechanisms, and hybrid mechanisms.

NFT platforms in accordance with many embodiments of the invention may benefit from the oversight and increased security of private blockchains. As can readily be appreciated, a variety of approaches can be taken to the writing of data to permissioned blockchains and the particular approach is largely determined by the requirements of particular applications. As such, computer systems in accordance with various embodiments of the invention can have the capacity to create verified NFT entries written to permissioned blockchains.

Figure 3:
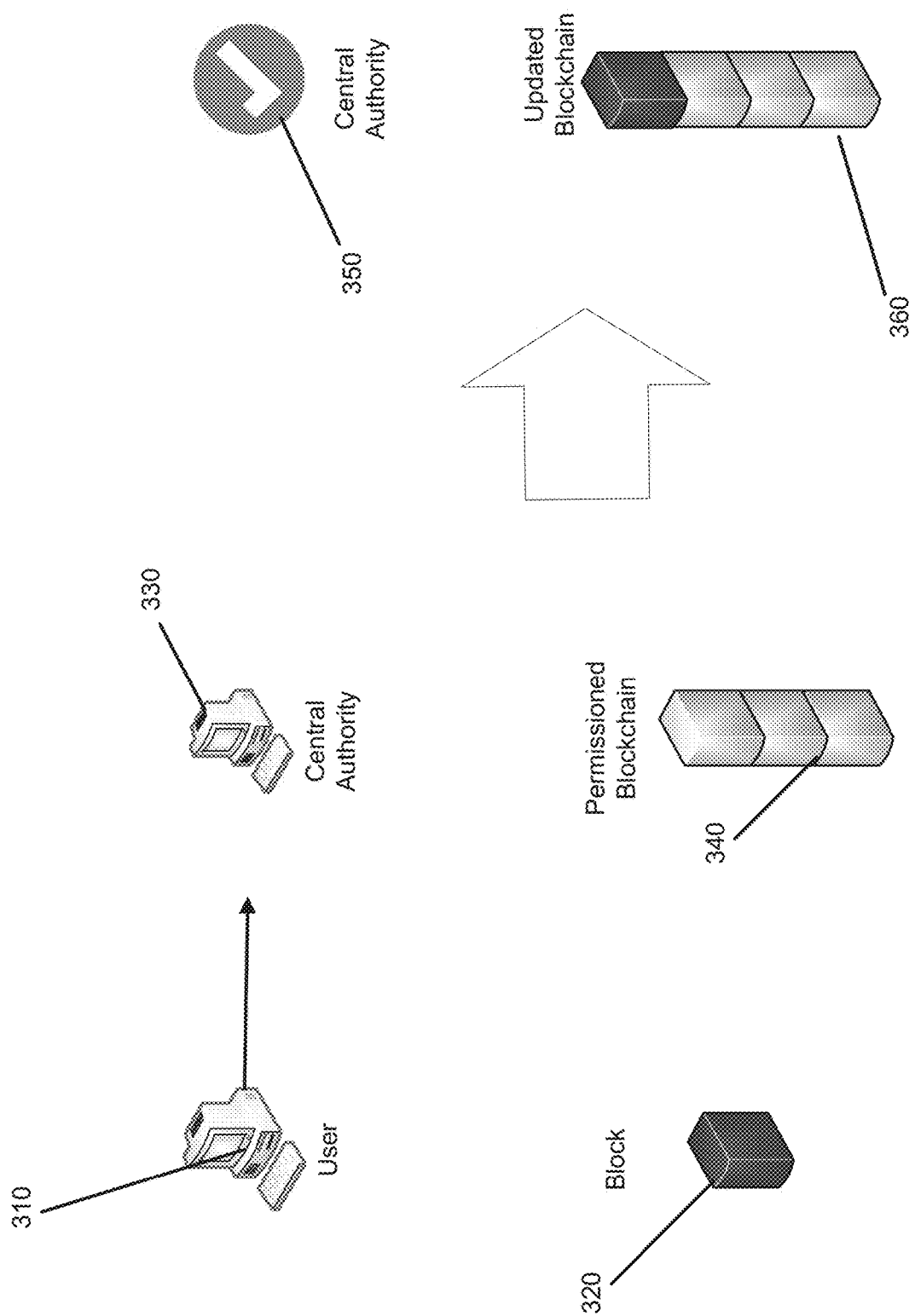
FIG. 3 is a conceptual diagram of a permissioned blockchain in accordance with an embodiment of the invention.

An implementation of permissioned (or private) blockchains in accordance with some embodiments of the invention is illustrated in FIG. 3. Permissioned blockchains 340 can typically function as closed computing systems in which each participant is well defined. In several embodiments, private blockchain networks may require invitations. In a number of embodiments, entries, or blocks 320, to private blockchains can be validated. In some embodiments, the validation may come from central authorities 330. Private blockchains can allow an organization or a consortium of organizations to efficiently exchange information and record transactions. Specifically, in a permissioned blockchain, a preapproved central authority 330 (which should be understood as potentially encompassing multiple distinct authorized authorities) can approve a change to the blockchain. In a number of embodiments, approval may come without the use of a consensus mechanism involving multiple authorities. As such, through a direct request from users 310 to the central authority 330, the determination of whether blocks 320 can be allowed access to the permissioned blockchain 340 can be determined. Blocks 320 needing to be added, eliminated, relocated, and/or prevented from access may be controlled through these means. In doing so the central authority 330 may manage accessing and controlling the network blocks incorporated into the permissioned blockchain 340. Upon the approval 350 of the central authority, the now updated blockchain 360 can reflect the added block 320.

NFT platforms in accordance with many embodiments of the invention may also benefit from the anonymity and accessibility of a public blockchain. Therefore, NFT platforms in accordance with many embodiments of the invention can have the capacity to create verified NFT entries written to a permissioned blockchain.

Figure 4:
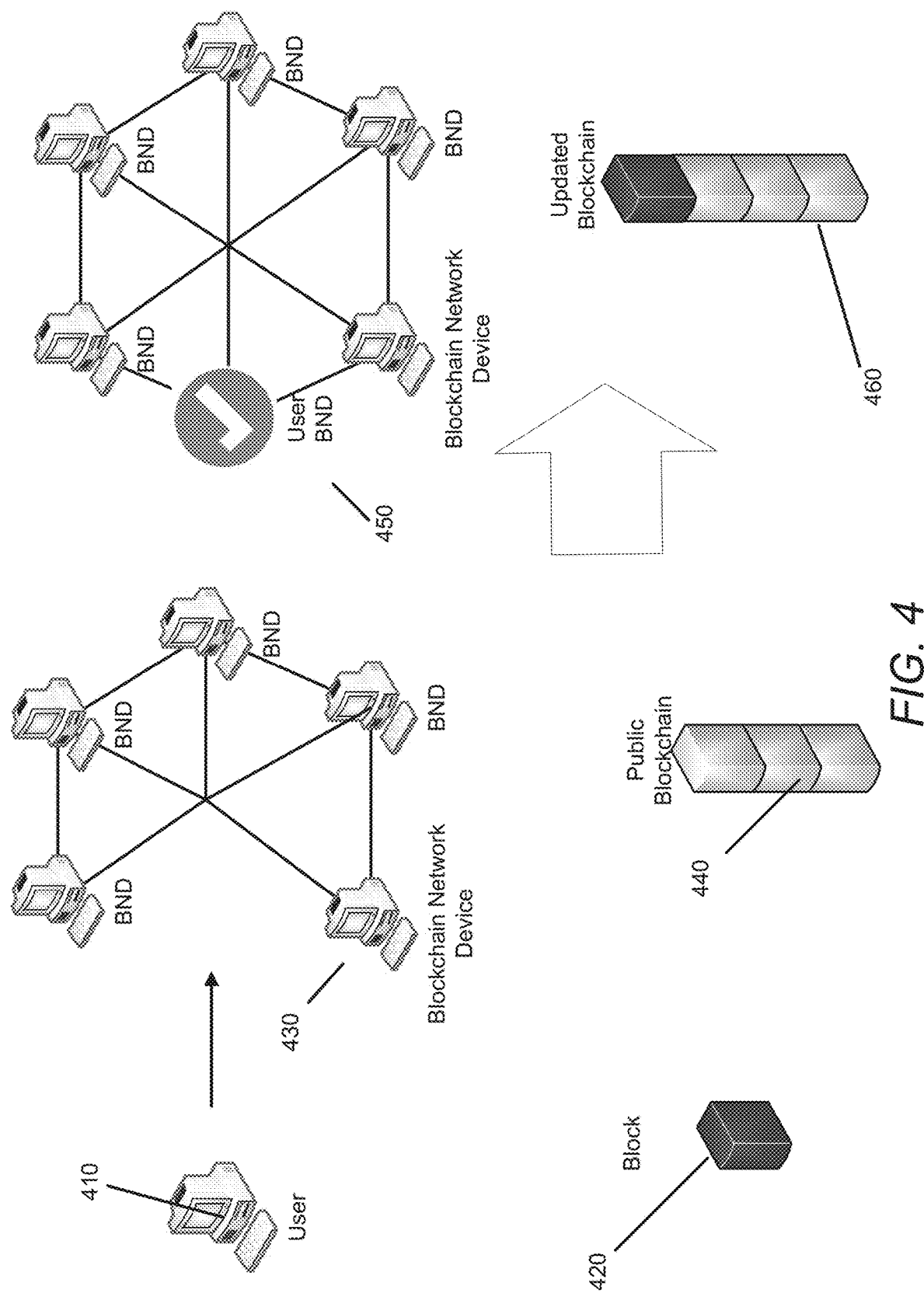
FIG. 4 is a conceptual diagram of a permissionless blockchain in accordance with an embodiment of the invention.

An implementation of a permissionless, decentralized, or public blockchain in accordance with an embodiment of the invention is illustrated in FIG. 4. In a permissionless blockchain, individual users 410 can directly participate in relevant networks and operate as blockchain network devices 430. As blockchain network devices 430, parties would have the capacity to participate in changes to the blockchain and participate in transaction verifications (via the mining mechanism). Transactions are broadcast over the computer network and data quality is maintained by massive database replication and computational trust. Despite being decentralized, an updated blockchain 460 cannot remove entries, even if anonymously made, making it immutable. In many decentralized blockchains, many blockchain network devices 430, in the decentralized system may have copies of the blockchain, allowing the ability to validate transactions. In many instances, the blockchain network device 430 can personally add transactions, in the form of blocks 420 appended to the public blockchain 440. To do so, the blockchain network device 430 would take steps to allow for the transactions to be validated 450 through various consensus mechanisms (Proof of Work, Proof of Stake, etc.). A number of consensus mechanisms in accordance with various embodiments of the invention are discussed further below.

Additionally, in the context of blockchain configurations, the term smart contract is often used to refer to software programs that run on blockchains. While a standard legal contract outlines the terms of a relationship (usually one enforceable by law), a smart contract enforces a set of rules using self-executing code within NFT platforms. As such, smart contracts may have the means to automatically enforce specific programmatic rules through platforms. Smart contracts are often developed as high-level programming abstractions that can be compiled down to bytecode. Said bytecode may be deployed to blockchains for execution by computer systems using any number of mechanisms deployed in conjunction with the blockchain. In many instances, smart contracts execute by leveraging the code of other smart contracts in a manner similar to calling upon a software library.

A number of existing decentralized blockchain technologies intentionally exclude or prevent rich media assets from existing within the blockchain, because they would need to address content that is not static (e.g., images, videos, music files). Therefore, NFT platforms in accordance with many embodiments of the invention may address this with blockchain mechanisms, that preclude general changes but account for updated content.

NFT platforms in accordance with many embodiments of the invention can therefore incorporate decentralized storage pseudo-immutable dual blockchains. In some embodiments, two or more blockchains may be interconnected such that traditional blockchain consensus algorithms support a first blockchain serving as an index to a second, or more, blockchains serving to contain and protect resources, such as the rich media content associated with NFTs.

In storing rich media using blockchain, several components may be utilized by an entity ("miner") adding transactions to said blockchain. References, such as URLs, may be stored in the blockchain to identify assets. Multiple URLs may also be stored when the asset is separated into pieces. An alternative or complementary option may be the use of APIs to return either the asset or a URL for the asset. In accordance with many embodiments of the invention, references can be stored by adding a ledger entry incorporating the reference enabling the entry to be timestamped. In doing so, the URL, which typically accounts for domain names, can be resolved to IP addresses. However, when only files of certain types are located on particular resources, or where small portions of individual assets are stored at different locations, users may require methods to locate assets stored on highly-splintered decentralized storage systems. To do so, systems may identify at least primary asset destinations and update those primary asset destinations as necessary when storage resources change. The mechanisms used to identify primary asset destinations may take a variety of forms including, but not limited to, smart contracts.

Figure 5A:
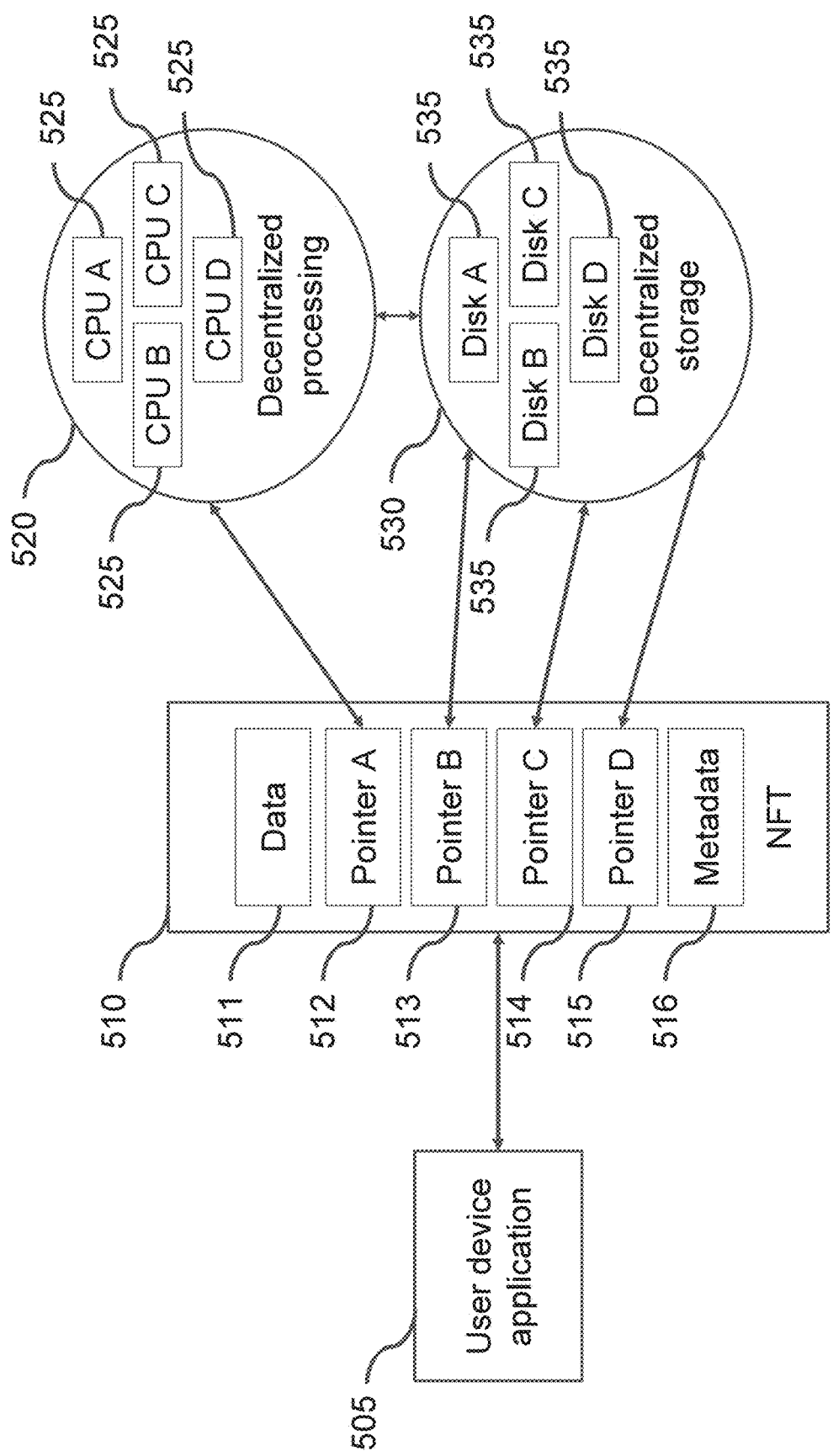
FIGS. 5A-5B are diagrams of a dual blockchain in accordance with a number of embodiments of the invention.

A dual blockchain, including decentralized processing 520 and decentralized storage 530 blockchains, in accordance with some embodiments of the invention is illustrated in FIG. 5A. Application running on devices 505, may interact with or make a request related to NFTs 510 interacting with such a blockchain. An NFT 510 in accordance with several embodiments of the invention may include many values including generalized data 511 (e.g. URLs), and pointers such as pointer A 512, pointer B 513, pointer C 514, and pointer D 515. In accordance with many embodiments of the invention, the generalized data 511 may be used to access corresponding rich media through the NFT 510. The NFT 510 may additionally have associated metadata 516.

Pointers within the NFT 510 may direct an inquiry toward a variety of on or off-ledger resources. In some embodiments of the invention, as illustrated FIG. 5A, pointer A 512 can direct the need for processing to the decentralized processing network 520. Processing systems are illustrated as CPU A, CPU B, CPU C, and CPU D 525. The CPUs 525 may be personal computers, server computers, mobile devices, edge IoT devices, etc. Pointer A may select one or more processors at random to perform the execution of a given smart contract. The code may be secure or nonsecure and the CPU may be a trusted execution environment (TEE), depending upon the needs of the request. In the example reflected in FIG. 5A, pointer B 513, pointer C 514, and pointer D 515 all point to a decentralized storage network 530 including remote off-ledger resources including storage systems illustrated as Disks A, B, C, and D 535.

The decentralized storage system may co-mingle with the decentralized processing system as the individual storage systems utilize CPU resources and connectivity to perform their function. From a functional perspective, the two decentralized systems may also be separate. Pointer B 513 may point to one or more decentralized storage networks 530 for the purposes of maintaining an off-chain log file of token activity and requests. Pointer C 514 may point to executable code within one or more decentralized storage networks 530. And Pointer D 515 may point to rights management data, security keys, and/or configuration data within one or more decentralized storage networks 530.

Figure 5B:
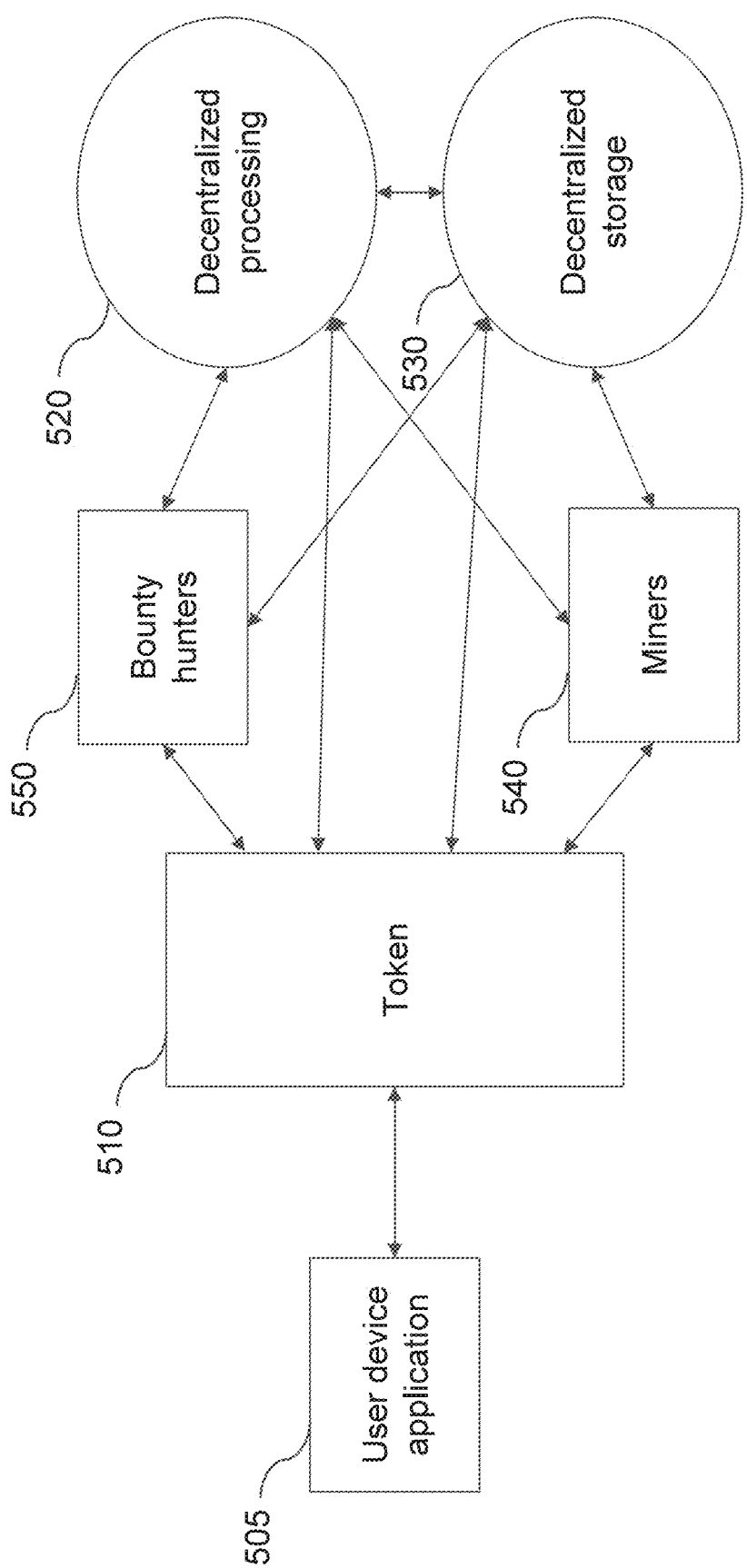

Dual blockchains may additionally incorporate methods for detection of abuse, essentially operating as a "bounty hunter" 550. FIG. 5B illustrates the inclusion of bounty hunters 550 within dual blockchain structures implemented in accordance with an embodiment of the invention. Bounty hunters 550 allow NFTs 510, which can point to networks that may include decentralized processing 520 and/or storage networks 530, to be monitored. The bounty hunter's 550 objective may be to locate incorrectly listed or missing data and executable code within the NFT 510 or associated networks. Additionally, the miner 540 can have the capacity to perform all necessary minting processes or any process within the architecture that involves a consensus mechanism.

Bounty hunters 550 may also choose to verify each step of a computation, and if they find an error, submit evidence of this in return for some reward. This can have the effect of invalidating the incorrect ledger entry and, potentially based on policies, all subsequent ledger entries. Such evidence can be submitted in a manner that is associated with a public key, in which the bounty hunter 550 proves knowledge of the error, thereby assigning value (namely the bounty) with the public key.

Assertions made by bounty hunters 550 may be provided directly to miners 540 by broadcasting the assertion. Assertions may be broadcast in a manner including, but not limited to posting it to a bulletin board. In some embodiments of the invention, assertions may be posted to ledgers of blockchains, for instance, the blockchain on which the miners 540 operate. If the evidence in question has not been submitted before, this can automatically invalidate the ledger entry that is proven wrong and provide the bounty hunter 550 with some benefit.

Applications and methods in accordance with various embodiments of the invention are not limited to use within NFT platforms. Accordingly, it should be appreciated that the capabilities of any blockchain configuration described herein can also be implemented outside the context of an NFT platform network architecture unrelated to the storage of fungible tokens and/or NFTs. A variety of components, mechanisms, and blockchain configurations that can be utilized within NFT platforms are discussed further below. Moreover, any of the blockchain configurations described herein with reference to FIGS. 3-5B (including permissioned, permissionless, and/or hybrid mechanisms) can be utilized within any of the networks implemented within the NFT platforms described above.

NFT Platform Consensus Mechanisms

NFT platforms in accordance with many embodiments of the invention can depend on consensus mechanisms to achieve agreement on network state, through proof resolution, to validate transactions. In accordance with many embodiments of the invention, Proof of Work (PoW) mechanisms may be used as a means of demonstrating non-trivial allocations of processing power. Proof of Space (PoS) mechanisms may be used as a means of demonstrating non-trivial allocations of memory or disk space. As a third possible approach, Proof of Stake mechanisms may be used as a means of demonstrating non-trivial allocations of fungible tokens and/or NFTs as a form of collateral. Numerous consensus mechanisms are possible in accordance with various embodiments of the invention, some of which are expounded on below.

Traditional mining schemes, such as Bitcoin, are based on Proof of Work, based on performing the aforementioned large computational tasks. The cost of such tasks may not only be computational effort, but also energy expenditure, a significant environmental concern. To address this problem, mining methods operating in accordance with many embodiments of the invention may instead operate using Proof of Space mechanisms to accomplish network consensus, wherein the distinguishing factor can be memory rather than processing power. Specifically, Proof of Space mechanisms can perform this through network optimization challenges. In several embodiments the network optimization challenge may be selected from any of a number of different challenges appropriate to the requirements of specific applications including graph pebbling. In some embodiments, graph pebbling may refer to a resource allocation game played on discrete mathematics graphs, ending with a labeled graph disclosing how a player might get at least one pebble to every vertex of the graph.

Figure 6:
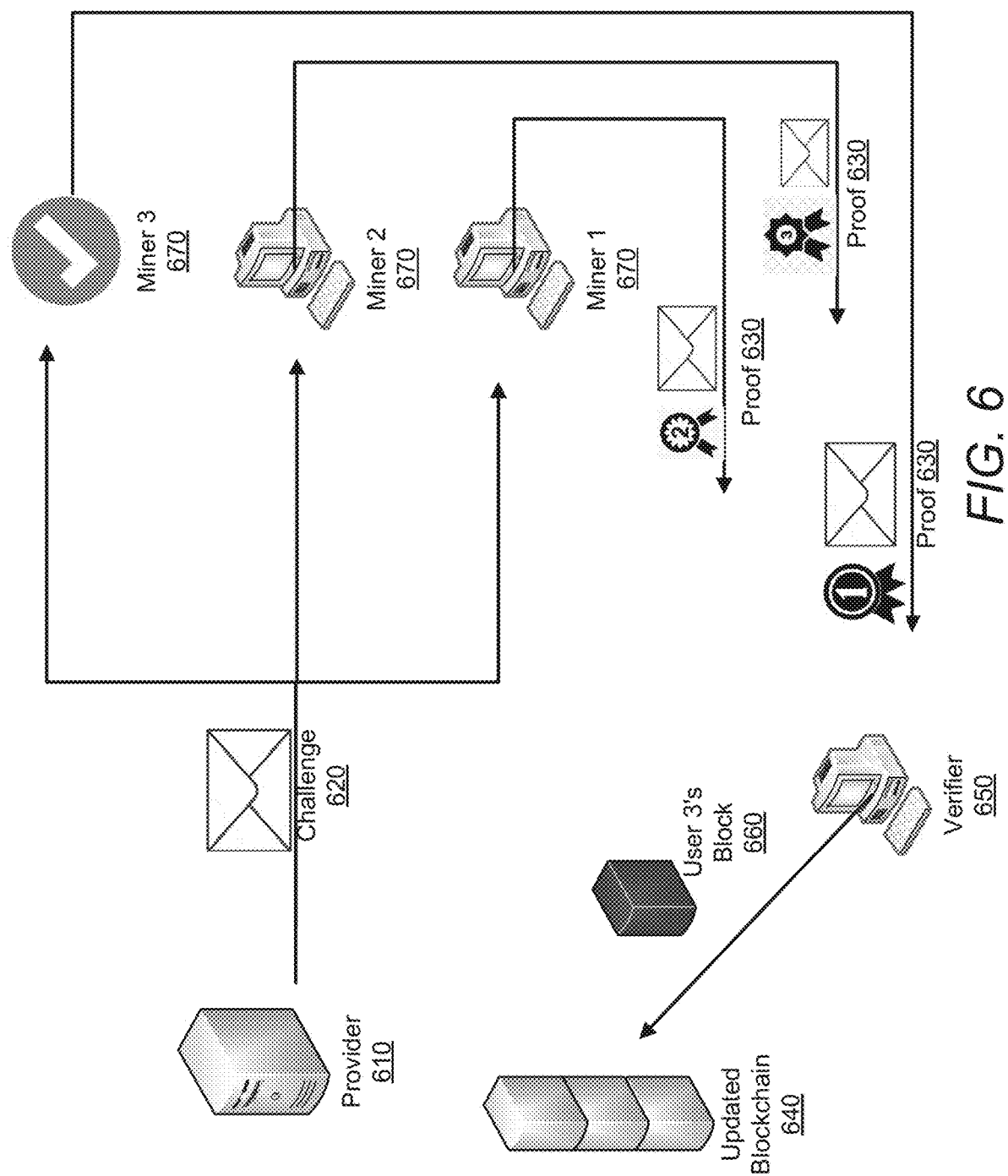
FIG. 6 conceptually illustrates a process followed by a Proof of Work consensus mechanism in accordance with an embodiment of the invention.

An example of Proof of Work consensus mechanisms that may be implemented in decentralized blockchains, in accordance with a number of embodiments of the invention, is conceptually illustrated in FIG. 6. The example disclosed in this figure is a challenge-response authentication, a protocol classification in which one party presents a complex problem ("challenge") 610 and another party must broadcast a valid answer ("proof") 620 to have clearance to add a block to the decentralized ledger that makes up the blockchain 630. As a number of miners may be competing to have this ability, there may be a need for determining factors for the addition to be added first, which in this case is processing power. Once an output is produced, verifiers 640 in the network can verify the proof, something which typically requires much less processing power, to determine the first device that would have the right to add the winning block 650 to the blockchain 630. As such, under a Proof of Work consensus mechanism, each miner involved can have a success probability proportional to the computational effort expended.

Figure 7:
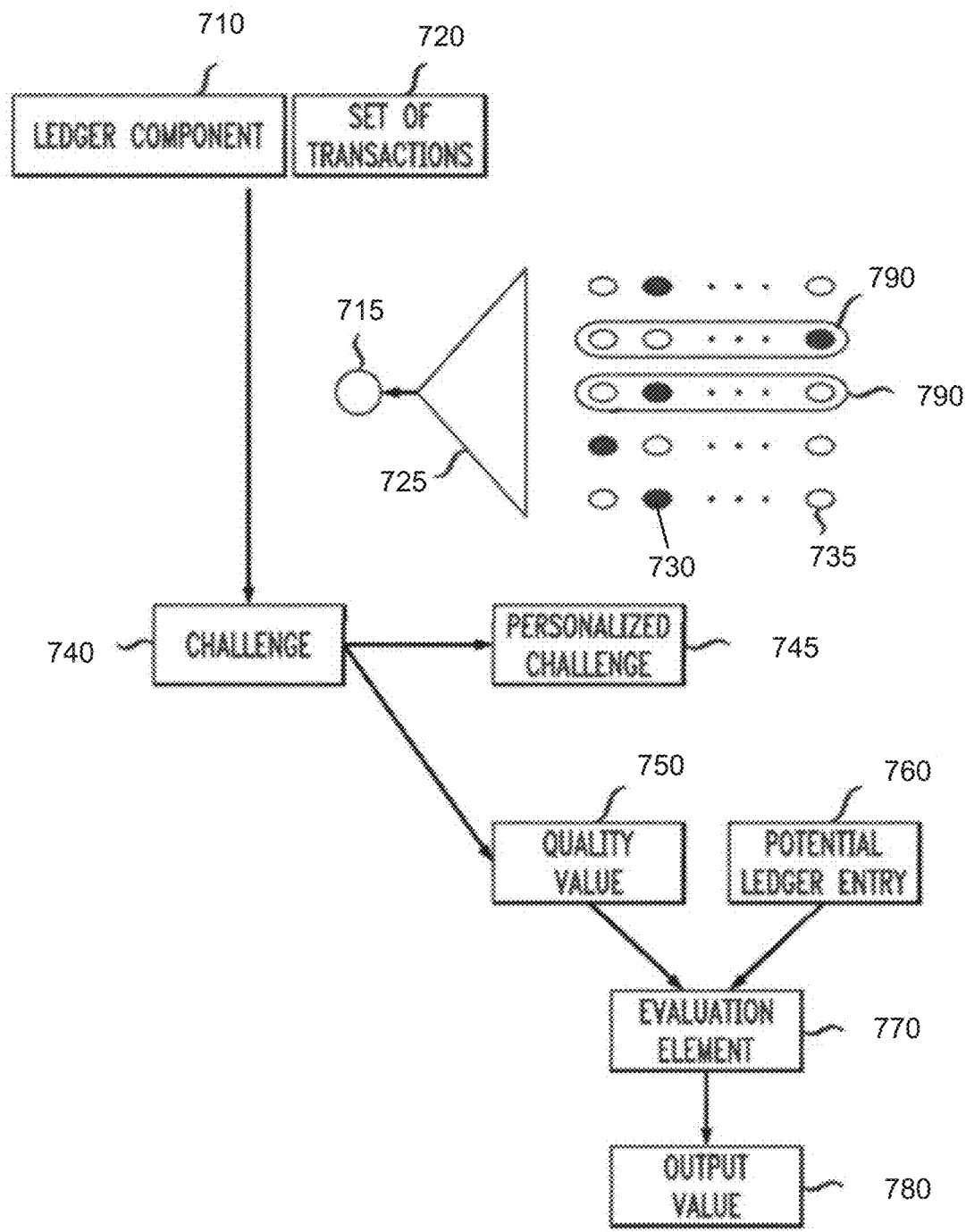
FIG. 7 conceptually illustrates a process followed by a Proof of Space consensus mechanism in accordance with an embodiment of the invention.

An example of Proof of Space implementations on devices in accordance with some embodiments of the invention is conceptually illustrated in FIG. 7. The implementation includes a ledger component 710, a set of transactions

720, and a challenge 740 computed from a portion of the ledger component 710. A representation 715 of a miner's state may also be recorded in the ledger component 710 and be publicly available.

In some embodiments, the material stored on the memory of the device includes a collection of nodes 730, 735, where nodes that depend on other nodes have values that are functions of the values of the associated nodes on which they depend. For example, functions may be one-way functions, such as cryptographic hash functions. In several embodiments the cryptographic hash function may be selected from any of a number of different cryptographic hash functions appropriate to the requirements of specific applications including (but not limited to) the SHA1 cryptographic hash function. In such an example, one node in the network may be a function of three other nodes. Moreover, the node may be computed by concatenating the values associated with these three nodes and applying the cryptographic hash function, assigning the result of the computation to the node depending on these three parent nodes. In this example, the nodes are arranged in rows, where two rows 790 are shown. The nodes are stored by the miner, and can be used to compute values at a setup time. This can be done using Merkle tree hash-based data structures 725, or another structure such as a compression function and/or a hash function.

Challenges 740 may be processed by the miner to obtain personalized challenges 745, made to the device according to the miner's storage capacity. The personalized challenge 745 can be the same or have a negligible change, but could also undergo an adjustment to account for the storage space accessible by the miner, as represented by the nodes the miner stores. For example, when the miner does not have a large amount of storage available or designated for use with the Proof of Space system, a personalized challenge 745 may adjust challenges 740 to take this into consideration, thereby making a personalized challenge 745 suitable for the miner's memory configuration.

In some embodiments, the personalized challenge 745 can indicate a selection of nodes 730, denoted in FIG. 7 by filled-in circles. In the FIG. 7 example specifically, the personalized challenge corresponds to one node per row. The collection of nodes selected as a result of computing the personalized challenge 745 can correspond to a valid potential ledger entry 760. However, here a quality value 750 (also referred to herein as a qualifying function value) can also be computed from the challenge 740, or from other public information that is preferably not under the control of any one miner.

A miner may perform matching evaluations 770 to determine whether the set of selected nodes 730 matches the quality value 750. This process can take into consideration what the memory constraints of the miner are, causing the evaluation 770 to succeed with a greater frequency for larger memory configurations than for smaller memory configurations. This can simultaneously level the playing field to make the likelihood of the evaluation 770 succeeding roughly proportional to the size of the memory used to store the nodes used by the miner. In some embodiments, non-proportional relationships may be created by modifying the function used to compute the quality value 750. When the evaluation 770 results in success, then the output value 780 may be used to confirm the suitability of the memory configuration and validate the corresponding transaction.

In many embodiments, nodes 730 and 735 can also correspond to public keys. The miner may submit valid ledger entries, corresponding to a challenge-response pair including one of these nodes. In that case, public key values can become associated with the obtained NFT. As such, miners can use a corresponding secret/private key to sign transaction requests, such as purchases. Additionally, any type of digital signature can be used in this context, such as RSA signatures, Merkle signatures, DSS signatures, etc. Further, the nodes 730 and 735 may correspond to different public keys or to the same public key, the latter preferably augmented with a counter and/or other location indicator such as a matrix position indicator, as described above. Location indicators in accordance with many embodiments of the invention may be applied to point to locations within a given ledger. In accordance with some embodiments of the invention, numerous Proof of Space consensus configurations are possible, some of which are discussed below.

Hybrid methods of evaluating Proof of Space problems can also be implemented in accordance with many embodiments of the invention. In many embodiments, hybrid methods can be utilized that conceptually correspond to modifications of Proof of Space protocols in which extra effort is expanded to increase the probability of success, or to compress the amount of space that may be applied to the challenge. Both come at a cost of computational effort, thereby allowing miners to improve their odds of winning by spending greater computational effort. Accordingly, in many embodiments of the invention dual proof-based systems may be used to reduce said computational effort. Such systems may be applied to Proof of Work and Proof of Space schemes, as well as to any other type of mining-based scheme.

When utilizing dual proofs in accordance with various embodiments of the invention, the constituent proofs may have varying structures. For example, one may be based on Proof of Work, another on Proof of Space, and a third may be a system that relies on a trusted organization for controlling the operation, as opposed to relying on mining for the closing of ledgers. Yet other proof structures can be combined in this way. The result of the combination will inherit properties of its components. In many embodiments, the hybrid mechanism may incorporate a first and a second consensus mechanism. In several embodiments, the hybrid mechanism includes a first, a second, and a third consensus mechanisms. In a number of embodiments, the hybrid mechanism includes more than three consensus mechanisms. Any of these embodiments can utilize consensus mechanisms selected from the group including (but not limited to) Proof of Work, Proof of Space, and Proof of Stake without departing from the scope of the invention. Depending on how each component system is parametrized, different aspects of the inherited properties will dominate over other aspects.

Figure 8:
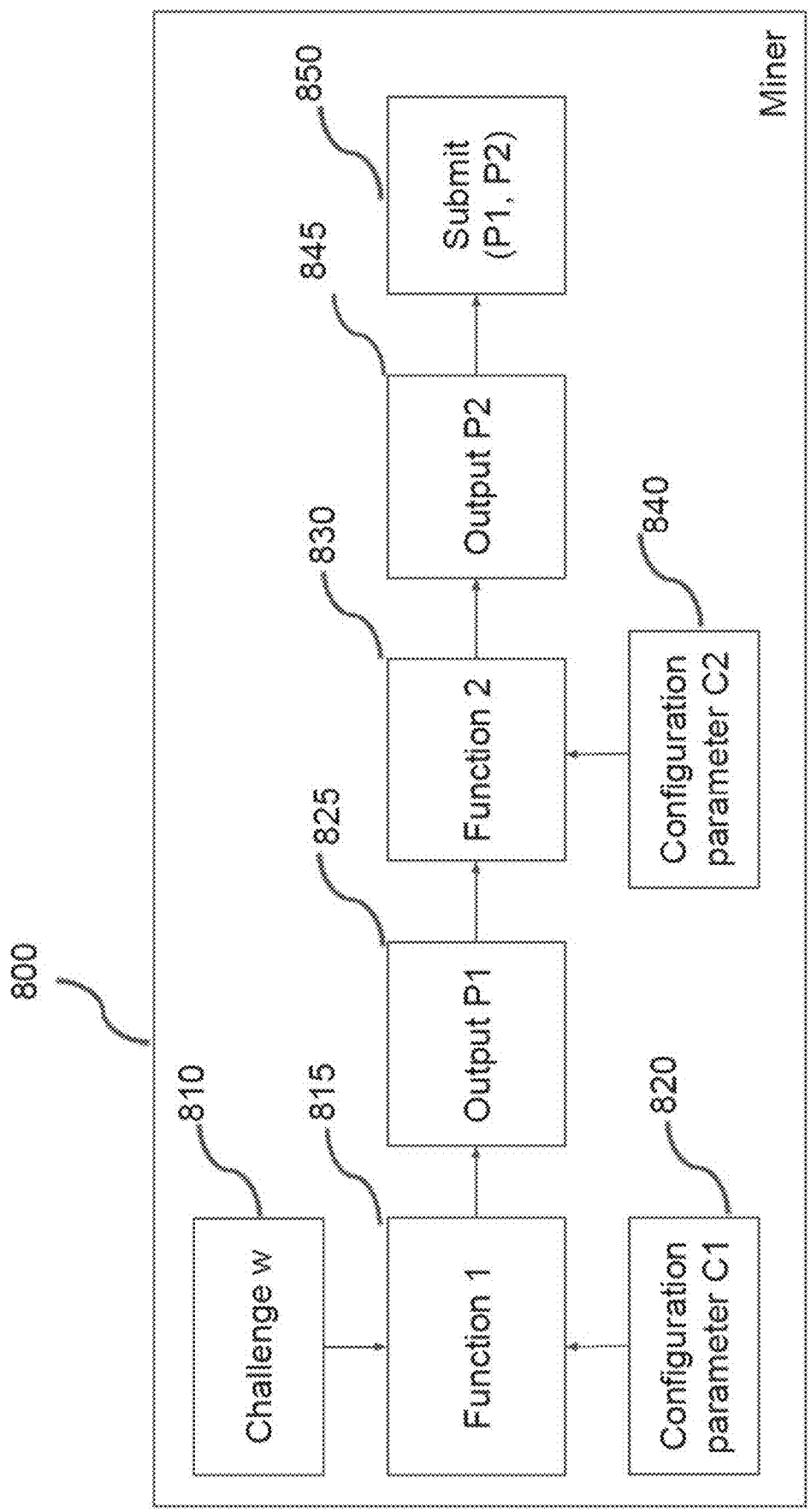
FIG. 8 illustrates a dual proof consensus mechanism configuration in accordance with an embodiment of the invention.

Dual proof configurations in accordance with a number of embodiments of the invention is illustrated in FIG. 8. A proof configuration in accordance with some embodiments of the invention may tend to use the notion of quality functions for tie-breaking among multiple competing correct proofs relative to a given challenge (w) 810. This classification of proof can be described as a qualitative proof, inclusive of proofs of work and proofs of space. In the example reflected in FIG. 8, proofs P1 and P2 are each one of a Proof of Work, Proof of Space, Proof of Stake, and/or any other proof related to a constrained resource, wherein P2 may be of a different type than P1, or may be of the same type.

Systems in accordance with many embodiments of the invention may introduce the notion of a qualifying proof, which, unlike qualitative proofs, are either valid or not valid, using no tie-breaking mechanism. Said systems may include a combination of one or more qualitative proofs and one or more qualifying proofs. For example, it may use one qualitative proof that is combined with one qualifying proof, where the qualifying proof is performed conditional on the successful creation of a qualitative proof. FIG. 8 illustrates challenge w 810, as described above, with a function 1 815, which is a qualitative function, and function 2 830, which is a qualifying function.

To stop miners from expending effort after a certain amount of effort has been spent, thereby reducing the environmental impact of mining, systems in accordance with a number of embodiments of the invention can constrain the search space for the mining effort. This can be done using a configuration parameter that controls the range of random or pseudo-random numbers that can be used in a proof. Upon challenge w 810 being issued to one or more miners 800, it can be input to Function 1 815 along with configuration parameter C1 820. Function 1 815 may output proof P1 825, in this example the qualifying proof to Function 2 830. Function 2 830 is also provided with configuration parameter C2 840 and computes qualifying proof P2 845. The miner 800 can then submit the combination of proofs (P1, P2) 850 to a verifier, in order to validate a ledger associated with challenge w 810. In some embodiments, miner 800 can also submit the proofs (P1, P2) 850 to be accessed by a 3rd-party verifier.

NFT platforms in accordance with many embodiments of the invention may additionally benefit from alternative energy-efficient consensus mechanisms. Therefore, computer systems in accordance with several embodiments of the invention may instead use consensus-based methods alongside or in place of proof-of-space and proof-of-space based mining. In particular, consensus mechanisms based instead on the existence of a Trusted Execution Environment (TEE), such as ARM TrustZone™ or Intel SGX™ may provide assurances exist of integrity by virtue of incorporating private/isolated processing environments.

Figure 9:
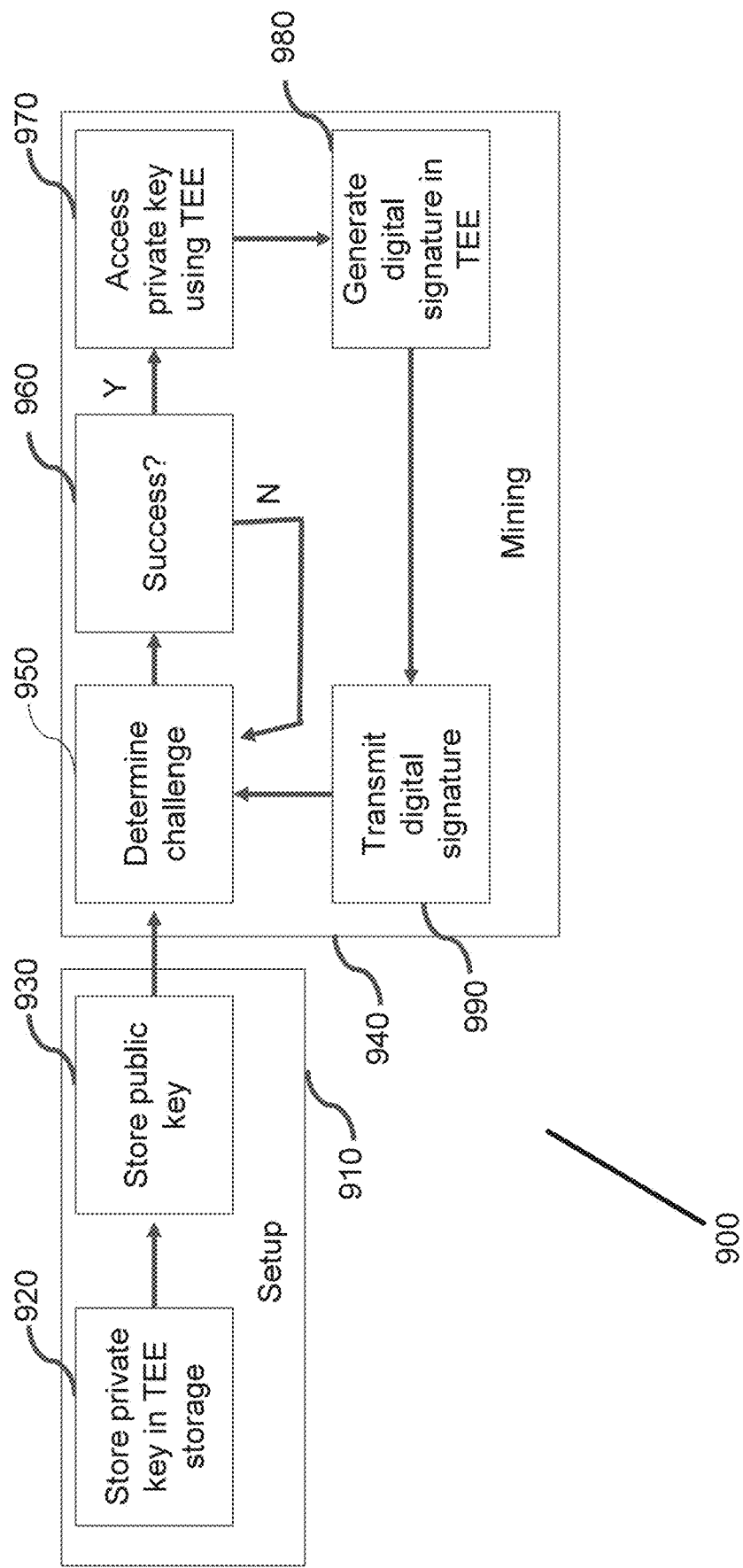
FIG. 9 illustrates a process followed by a Trusted Execution Environment-based consensus mechanism in accordance with some embodiments of the invention.

An illustration of sample process 900 undergone by TEE-based consensus mechanisms in accordance with some embodiments of the invention is depicted in FIG. 9. In some such configurations, a setup 910 may be performed by an original equipment manufacturer (OEM) or a party performing configurations of equipment provided by an OEM. Once a private key/public key pair is generated in the secure environment, process 900 may store (920) the private key in TEE storage (i.e. storage associated with the Trusted Execution Environment). While storage may be accessible from the TEE, it can be shielded from applications running outside the TEE. Additionally, processes can store (930) the public key associated with the TEE in any storage associated with the device containing the TEE. Unlike the private key, the public key may also be accessible from applications outside the TEE. In a number of embodiments, the public key may also be certified. Certification may come from OEMs or trusted entities associated with the OEMs, wherein the certificate can be stored with the public key.

In many embodiments of the invention, mining-directed steps can also be influenced by the TEE. In the illustrated embodiment, the process 900 can determine (950) a challenge. For example, this may be by computing a hash of the contents of a ledger. In doing so, process 900 may also determine whether the challenge corresponds to success 960. In some embodiments of the invention, the determination of success may result from some pre-set portion of the challenge matching a pre-set portion of the public key, e.g. the last 20 bits of the two values matching. In several embodiments the success determination mechanism may be selected from any of a number of alternate approaches appropriate to the requirements of specific applications. The matching conditions may also be modified over time. For example, modification may result from an announcement from a trusted party or based on a determination of a number of participants having reached a threshold value.

When the challenge does not correspond to a success 960, process 900 can return to determine (950) a new challenge. In this context, process 900 can determine (950) a new challenge after the ledger contents have been updated and/or a time-based observation is performed. In several embodiments the determination of a new challenge may come from any of a number of approaches appropriate to the requirements of specific applications, including, but not limited to, the observation of as a second elapsing since the last challenge. If the challenge corresponds to a success 960, then the processing can continue on to access (970) the private key using the TEE.

When the private key is accessed, process can generate (980) a digital signature using the TEE. The digital signature may be on a message that includes the challenge and/or which otherwise references the ledger entry being closed. Process 900 can also transmit (980) the digital signature to other participants implementing the consensus mechanism. In cases where multiple digital signatures are received and found to be valid, a tie-breaking mechanism can be used to evaluate the consensus. For example, one possible tie-breaking mechanism may be to select the winner as the party with the digital signature that represents the smallest numerical value when interpreted as a number. In several embodiments the tie-breaking mechanism may be selected from any of a number of alternate tie-breaking mechanisms appropriate to the requirements of specific applications.

Applications and methods in accordance with various embodiments of the invention are not limited to use within NFT platforms. Accordingly, it should be appreciated that consensus mechanisms described herein can also be implemented outside the context of an NFT platform network architecture unrelated to the storage of fungible tokens and/or NFTs. Moreover, any of the consensus mechanisms described herein with reference to FIGS. 6-9 (including Proof of Work, Proof of Space, Proof of Stake, and/or hybrid mechanisms) can be utilized within any of the blockchains implemented within the NFT platforms described above with reference to FIGS. 3-5B. Various systems and methods for implementing NFT platforms and applications in accordance with numerous embodiments of the invention are discussed further below.

NFT Platform Constituent Devices and Applications

A variety of computer systems that can be utilized within NFT platforms and systems that utilize NFT blockchains in accordance with various embodiments of the invention are illustrated below. The computer systems in accordance with many embodiments of the invention may implement a processing system 1010, 1120, 1220 using one or more CPUs, GPUs, ASICs, FPGAs, and/or any of a variety of other devices and/or combinations of devices that are typically utilized to perform digital computations. As can readily be appreciated each of these computer systems can be implemented using one or more of any of a variety of classes of computing devices including (but not limited to) mobile phone handsets, tablet computers, laptop computers, personal computers, gaming consoles, televisions, set top boxes and/or other classes of computing device.

Figure 10:
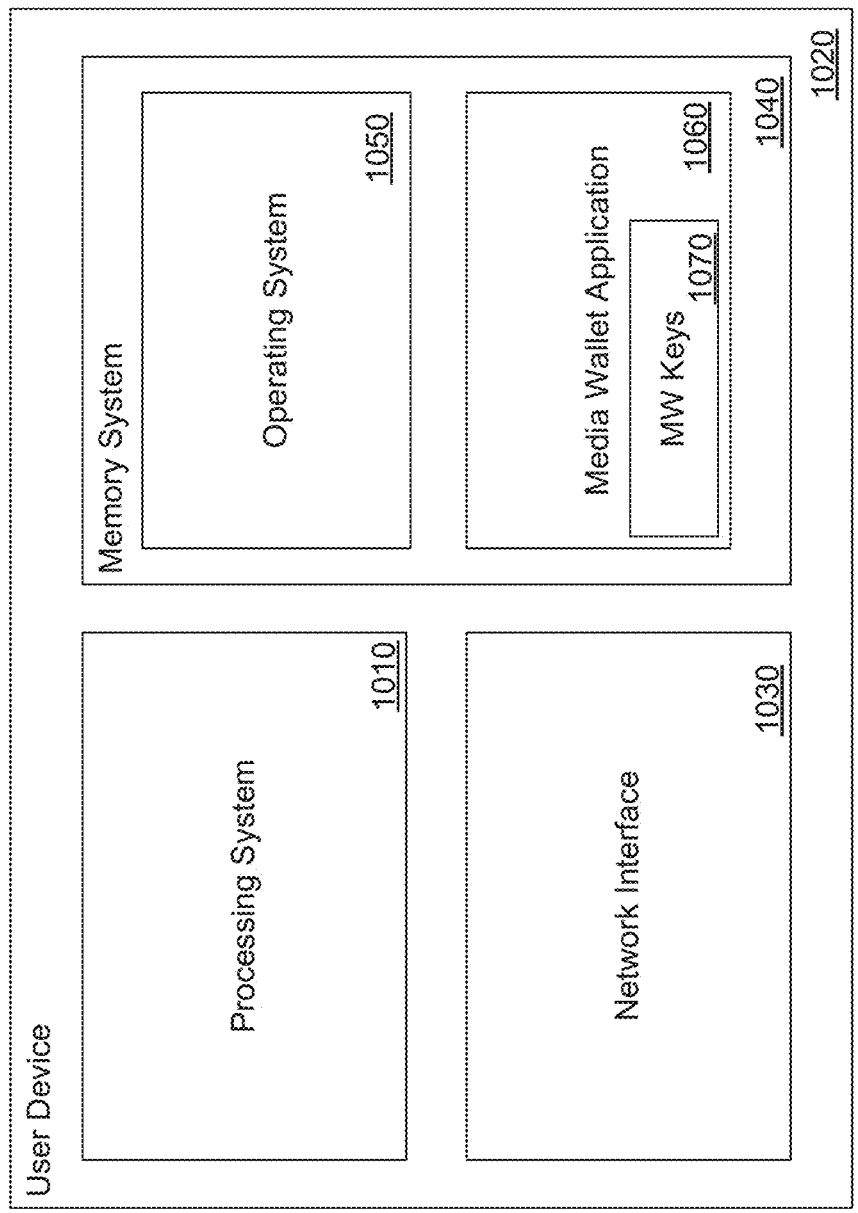
FIGS. 10-12 depicts various devices that can be utilized alongside an NFT platform in accordance with various embodiments of the invention.

A user device capable of communicating with an NFT platform in accordance with an embodiment of the invention is illustrated in FIG. 10. The memory system 1040 of particular user devices may include an operating system 1050 and media wallet applications 1060. Media wallet applications may include sets of media wallet (MW) keys 1070 that can include public key/private key pairs. The set of MW keys may be used by the media wallet application to perform a variety of actions including, but not limited to, encrypting and signing data. In many embodiments, the media wallet application enables the user device to obtain and conduct transactions with respect to NFTs by communicating with an NFT blockchain via the network interface 1030. In some embodiments, the media wallet applications are capable of enabling the purchase of NFTs using fungible tokens via at least one distributed exchange. User devices may implement some or all of the various functions described above with reference to media wallet applications as appropriate to the requirements of a given application in accordance with various embodiments of the invention.

Figure 11:
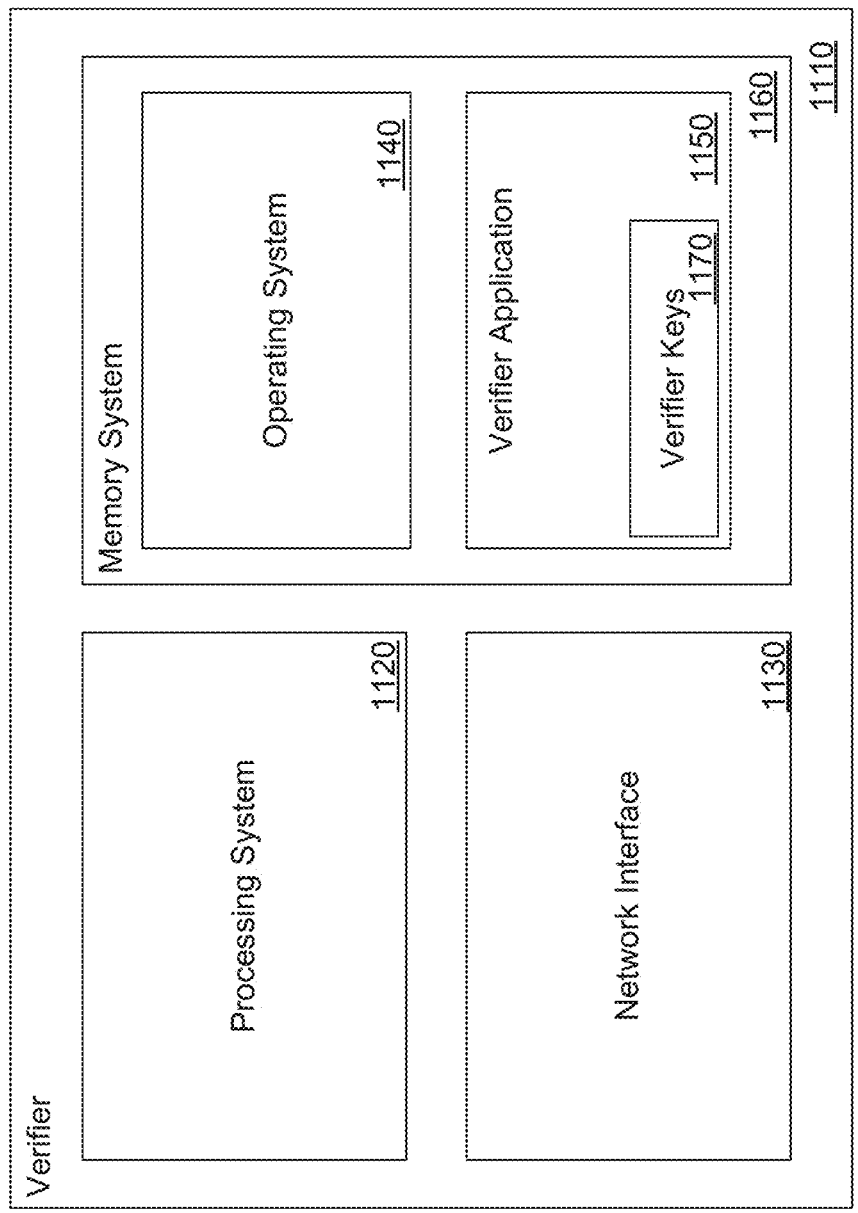

A verifier 1110 capable of verifying blockchain transactions in an NFT platform in accordance with many embodiments of the invention is illustrated in FIG. 11. The memory system 1160 of the verifier computer system includes an operating system 1140 and a verifier application 1150 that enables the verifier 1110 computer system to access a decentralized blockchain in accordance with various embodiments of the invention. Accordingly, the verifier application 1150 may utilize a set of verifier keys 1170 to affirm blockchain entries. When blockchain entries can be verified, the verifier application 1150 may transmit blocks to the corresponding blockchains. The verifier application 1150 can also implement some or all of the various functions described above with reference to verifiers as appropriate to the requirements of a given application in accordance with various embodiments of the invention.

Figure 12:
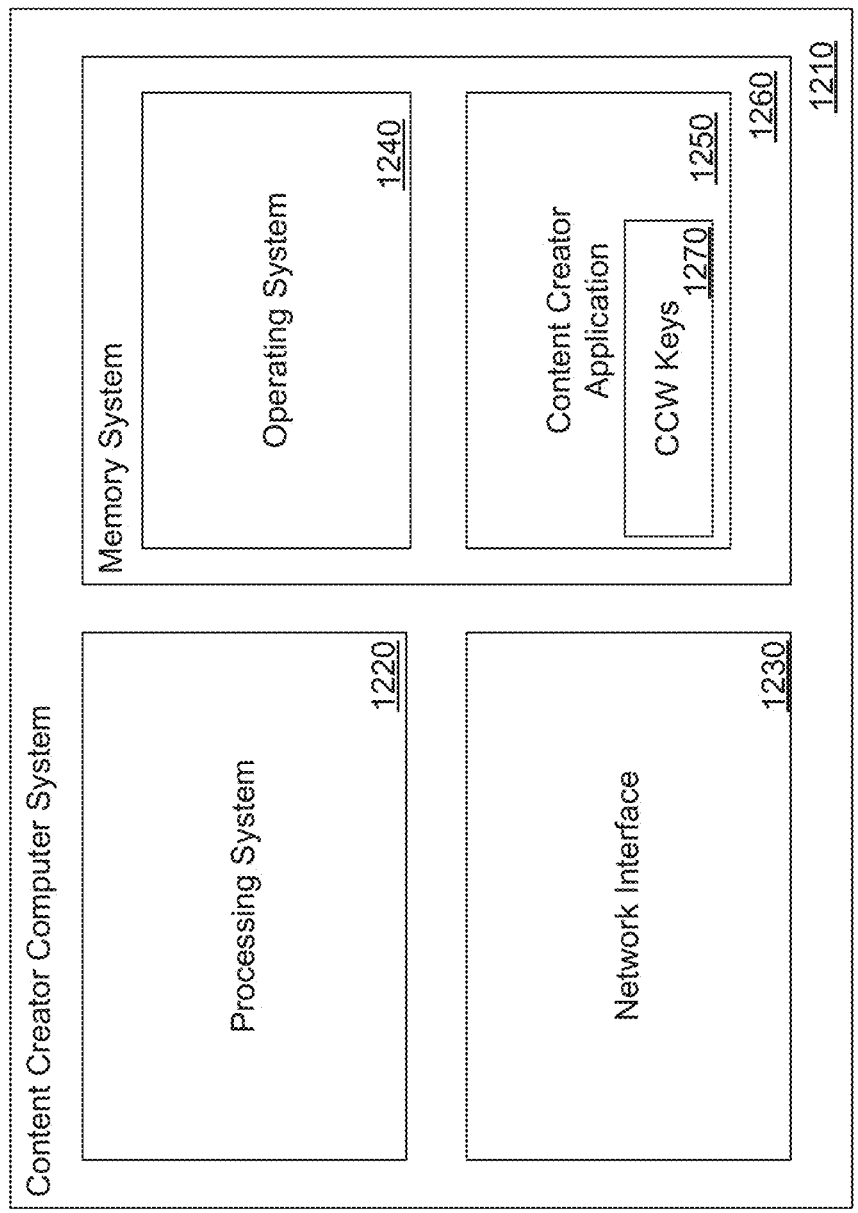

A content creator system 1210 capable of disseminating content in an NFT platform in accordance with an embodiment of the invention is illustrated in FIG. 12. The memory system 1260 of the content creator computer system may include an operating system 1240 and a content creator application 1250. The content creator application 1250 may enable the content creator computer system to mint NFTs by writing smart contracts to blockchains via the network interface 1230. The content creator application can include sets of content creator wallet (CCW) keys 1270 that can include a public key/private key pairs. Content creator applications may use these keys to sign NFTs minted by the content creator application. The content creator application can also implement some or all of the various functions described above with reference to content creators as appropriate to the requirements of a given application in accordance with various embodiments of the invention.

Computer systems in accordance with many embodiments of the invention incorporate digital wallets (herein also referred to as "wallets" or "media wallets") for NFT and/or fungible token storage. In several embodiments, the digital wallet may securely store rich media NFTs and/or other tokens. Additionally, in some embodiments, the digital wallet may display user interface through which user instructions concerning data access permissions can be received.

In a number of embodiments of the invention, digital wallets may be used to store at least one type of token-directed content. Example content types may include, but are not limited to crypto currencies of one or more sorts; non-fungible tokens; and user profile data.

Example user profile data may incorporate logs of user actions. In accordance with some embodiments of the invention, example anonymized user profile data may include redacted, encrypted, and/or otherwise obfuscated user data. User profile data in accordance with some embodiments may include, but are not limited to, information related to classifications of interests, determinations of a post-advertisement purchases, and/or characterizations of wallet contents.

Media wallets, when storing content, may store direct references to content. Media wallets may also reference content through keys to decrypt and/or access the content. Media wallets may use such keys to additionally access metadata associated with the content. Example metadata may include, but is not limited to, classifications of content. In a number of embodiments, the classification metadata may govern access rights of other parties related to the content.

Access governance rights may include, but are not limited to, whether a party can indicate their relationship with the wallet; whether they can read summary data associated with the content; whether they have access to peruse the content; whether they can place bids to purchase the content; whether they can borrow the content, and/or whether they are biometrically authenticated.

Figure 13:
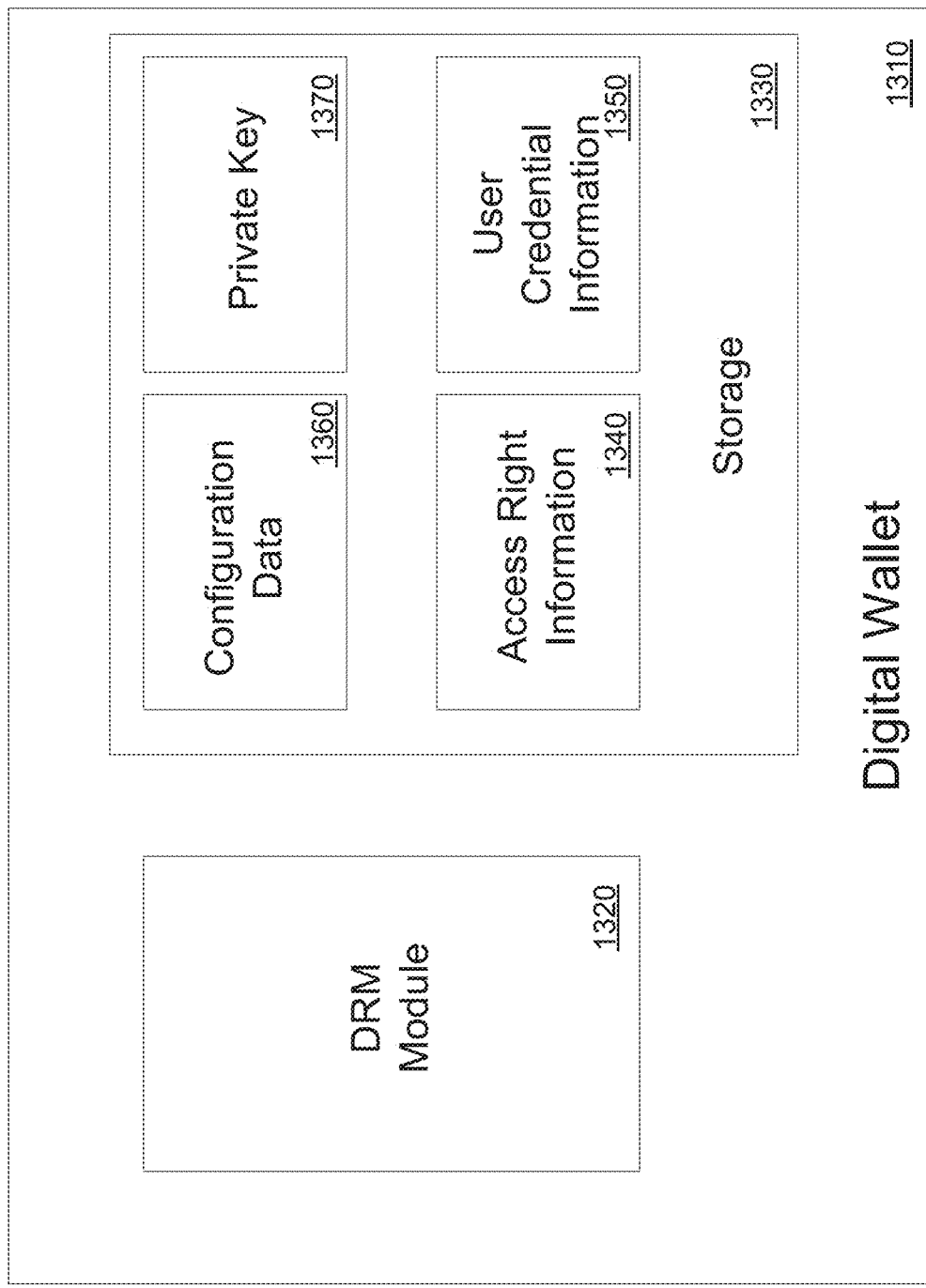
FIG. 13 depicts a media wallet application configuration in accordance with an embodiment of the invention.

An example of a media wallet 1310 capable of storing rich media NFTs in accordance with an embodiment of the invention is illustrated in FIG. 13. Media wallets 1310 may include a storage component 1330, including access right information 1340, user credential information 1350, token configuration data 1360, and/or at least one private key 1370. In accordance with many embodiments of the invention, a private key 1370 may be used to perform a plurality of actions on resources, including but not limited to decrypting NFT and/or fungible token content. Media wallets may also correspond to a public key, referred to as a wallet address. An action performed by private keys 1370 may be used to prove access rights to digital rights management modules. Additionally, private keys 1370 may be applied to initiating ownership transfers and granting NFT and/or fungible token access to alternate wallets. In accordance with some embodiments, access right information 1340 may include lists of elements that the wallet 1310 has access to. Access right information 1340 may also express the type of access provided to the wallet. Sample types of access include, but are not limited to, the right to transfer NFT and/or fungible ownership, the right to play rich media associated with a given NFT, and the right to use an NFT and/or fungible token. Different rights may be governed by different cryptographic keys. Additionally, the access right information 1340 associated with a given wallet 1310 may utilize user credential information 1350 from the party providing access.

In accordance with many embodiments of the invention, third parties initiating actions corresponding to requesting access to a given NFT may require user credential information 1350 of the party providing access to be verified. User credential information 1350 may be taken from the group including, but not limited to, a digital signature, hashed passwords, PINs, and biometric credentials. User credential information 1350 may be stored in a manner accessible only to approved devices. In accordance with some embodiments of the invention, user credential information 1350 may be encrypted using a decryption key held by trusted hardware, such as a trusted execution environment. Upon verification, user credential information 1350 may be used to authenticate wallet access.

Available access rights may be determined by digital rights management (DRM) modules 1320 of wallets 1310.

In the context of rich media, encryption may be used to secure content. As such, DRM systems may refer to technologies that control the distribution and use of keys required to decrypt and access content. DRM systems in accordance with many embodiments of the invention may require a trusted execution zone. Additionally, said systems may require one or more keys (typically a certificate containing a public key/private key pair) that can be used to communicate with and register with DRM servers. DRM modules 1320 in some embodiments may also use one or more keys to communicate with a DRM server. In several embodiments, the DRM modules 1320 may include code used for performing sensitive transactions for wallets including, but not limited to, content access. In accordance with a number of embodiments of the invention, the DRM module 1320 may execute in a Trusted Execution Environment. In a number of embodiments, the DRM may be facilitated by an Operating System (OS) that enables separation of processes and processing storage from other processes and their processing storage.

Figure 14B:
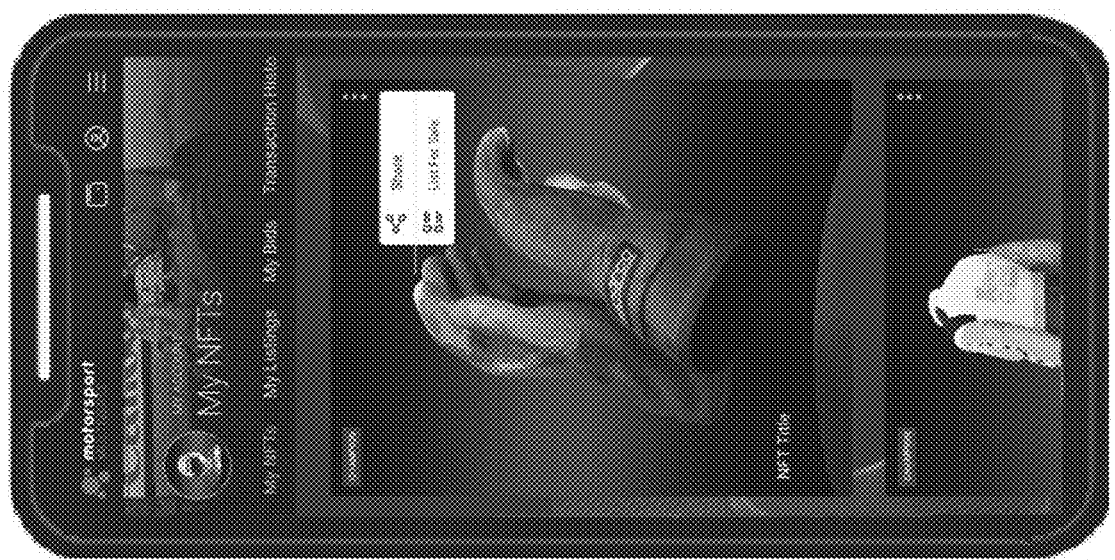
FIGS. 14A-14C depicts user interfaces of various media wallet applications in accordance with a number of embodiments of the invention.
Figure 14A:
Figure 14C:

Operation of media wallet applications implemented in accordance with some embodiments of the invention is conceptually illustrated by way of the user interfaces shown in FIGS. 14A-14C. In many embodiments, media wallet applications can refer to applications that are installed upon user devices such as (but not limited to) mobile phones and tablet computers running the iOS, Android and/or similar operating systems. Launching media wallet applications can provide a number of user interface contexts. In many embodiments, transitions between these user interface contexts can be initiated in response to gestures including (but not limited to) swipe gestures received via a touch user interface. As can readily be appreciated, the specific manner in which user interfaces operate through media wallet applications is largely dependent upon the user input capabilities of the underlying user device. In several embodiments, a first user interface context is a dashboard (see, FIGS. 14A, 14C) that can include a gallery view of NFTs owned by the user. In several embodiments, the NFT listings can be organized into category index cards. Category index cards may include, but are not limited to digital merchandise/collectibles, special event access/digital tickets, fan leaderboards. In certain embodiments, a second user interface context (see, for example, FIG. 14B) may display individual NFTs. In a number of embodiments, each NFT can be main-staged in said display with its status and relevant information shown. Users can swipe through each collectible and interacting with the user interface can launch a collectible user interface enabling greater interaction with a particular collectible in a manner that can be determined based upon the smart contract underlying the NFT.

A participant of an NFT platform may use a digital wallet to classify wallet content, including NFTs, fungible tokens, content that is not expressed as tokens such as content that has not yet been minted but for which the wallet can initiate minting, and other non-token content, including executable content, webpages, configuration data, history files and logs. This classification may be performed using a visual user interface. Users interface may enable users to create a visual partition of a space. In some embodiments of the invention, a visual partition may in turn be partitioned into sub-partitions. In some embodiments, a partition of content may separate wallet content into content that is not visible to the outside world ("invisible partition"), and content that is visible at least to some extent by the outside world ("visible partition"). Some of the wallet content may require the wallet use to have an access code such as a password or a biometric credential to access, view the existence of, or perform transactions on. A visible partition may be subdivided into two or more partitions, where the first one corresponds to content that can be seen by anybody, the second partition corresponds to content that can be seen by members of a first group, and/or the third partition corresponds to content that can be seen by members of a second group.

For example, the first group may be users with which the user has created a bond, and invited to be able to see content. The second group may be users who have a membership and/or ownership that may not be controlled by the user. An example membership may be users who own non-fungible tokens (NFTs) from a particular content creator. Content elements, through icons representing the elements, may be relocated into various partitions of the space representing the user wallet. By doing so, content elements may be associated with access rights governed by rules and policies of the given partition.

One additional type of visibility may be partial visibility. Partial visibility can correspond to a capability to access metadata associated with an item, such as an NFT and/or a quantity of crypto funds, but not carry the capacity to read the content, lend it out, or transfer ownership of it. As applied to a video NFT, an observer to a partition with partial visibility may not be able to render the video being encoded in the NFT but see a still image of it and a description indicating its source.

Similarly, a party may have access to a first anonymized profile which states that the user associated with the wallet is associated with a given demographic. The party with this access may also be able to determine that a second anonymized profile including additional data is available for purchase. This second anonymized profile may be kept in a sub-partition to which only people who pay a fee have access, thereby expressing a form of membership. Alternatively, only users that have agreed to share usage logs, aspects of usage logs or parts thereof may be allowed to access a given sub-partition. By agreeing to share usage log information with the wallet comprising the sub-partition, this wallet learns of the profiles of users accessing various forms of content, allowing the wallet to customize content, including by incorporating advertisements, and to determine what content to acquire to attract users of certain demographics.

Another type of membership may be held by advertisers who have sent promotional content to the user. These advertisers may be allowed to access a partition that stores advertisement data. Such advertisement data may be encoded in the form of anonymized profiles. In a number of embodiments, a given sub-partition may be accessible only to the advertiser to whom the advertisement data pertains. Elements describing advertisement data may be automatically placed in their associated partitions, after permission has been given by the user. This partition may either be visible to the user. Visibility may also depend on a direct request to see "system partitions." A first partition may correspond to material associated with a first set of public keys, a second partition to material associated with a second set of public keys not overlapping with the first set of public keys, wherein such material may comprise tokens such as crypto coins and NFTs. A third partition may correspond to usage data associated with the wallet user, and a fourth partition may correspond to demographic data and/or preference data associated with the wallet user. Yet other partitions may correspond to classifications of content, e.g., child-friendly vs. adult; classifications of whether associated items are for sale or not, etc.

The placing of content in a given partition may be performed by a drag-and-drop action performed on a visual interface. By selecting items and clusters and performing a drag-and-drop to another partition and/or to a sub-partition, the visual interface may allow movement including, but not limited to, one item, a cluster of items, and a multiplicity of items and clusters of items. The selection of items can be performed using a lasso approach in which items and partitions are circled as they are displayed. The selection of items may also be performed by alternative methods for selecting multiple items in a visual interface, as will be appreciated by a person of skill in the art.

Some content classifications may be automated in part or full. For example, when user place ten artifacts, such as NFTs describing in-game capabilities, in a particular partition, they may be asked if additional content that are also in-game capabilities should be automatically placed in the same partition as they are acquired and associated with the wallet. When "yes" is selected, then this placement may be automated in the future. When "yes, but confirm for each NFT" is selected, then users can be asked, for each automatically classified element, to confirm its placement. Before the user confirms, the element may remain in a queue that corresponds to not being visible to the outside world. When users decline given classifications, they may be asked whether alternative classifications should be automatically performed for such elements onwards. In some embodiments, the selection of alternative classifications may be based on manual user classification taking place subsequent to the refusal.

Automatic classification of elements may be used to perform associations with partitions and/or folders. The automatic classification may be based on machine learning (ML) techniques considering characteristics including, but not limited to, usage behaviors exhibited by the user relative to the content to be classified, labels associated with the content, usage statistics; and/or manual user classifications of related content.

Multiple views of wallets may also be accessible. One such view can correspond to the classifications described above, which indicates the actions and interactions others can perform relative to elements. Another view may correspond to a classification of content based on use, type, and/or users-specified criterion. For example, all game NFTs may be displayed in one collection view. The collection view may further subdivide the game NFTs into associations with different games or collections of games. Another collection may show all audio content, clustered based on genre. users-specified classification may be whether the content is for purposes of personal use, investment, or both. A content element may show up in multiple views. users can search the contents of his or her wallet by using search terms that result in potential matches.

Alternatively, the collection of content can be navigated based the described views of particular wallets, allowing access to content. Once a content element has been located, the content may be interacted with. For example, located content elements may be rendered. One view may be switched to another after a specific item is found. For example, this may occur through locating an item based on its genre and after the item is found, switching to the partitioned view described above. In some embodiments, wallet content may be rendered using two or more views in a simultaneous manner. They may also select items using one view.

Media wallet applications in accordance with various embodiments of the invention are not limited to use within NFT platforms. Accordingly, it should be appreciated that applications described herein can also be implemented outside the context of an NFT platform network architecture unrelated to the storage of fungible tokens and/or NFTs. Moreover, any of the computer systems described herein with reference to FIGS. 10-14C can be utilized within any of the NFT platforms described above.

NFT Platform NFT Interactions

NFT platforms in accordance with many embodiments of the invention may incorporate a wide variety of rich media NFT configurations. The term "Rich Media Non-Fungible Tokens" can be used to refer to blockchain-based cryptographic tokens created with respect to a specific piece of rich media content and which incorporate programmatically defined digital rights management. In some embodiments of the invention, each NFT may have a unique serial number and be associated with a smart contract defining an interface that enables the NFT to be managed, owned and/or traded.

Under a rich media blockchain in accordance with many embodiments of the invention, a wide variety of NFT configurations may be implemented. Some NFTs may be referred to as anchored NFTs (or anchored tokens), used to tie some element, such as a physical entity, to an identifier. Of this classification, one sub-category may be used to tie users' real-world identities and/or identifiers to a system identifier, such as a public key. In this disclosure, this type of NFT applied to identifying users, may be called a social NFT, identity NFT, identity token, and a social token. In accordance with many embodiments of the invention, an individual's personally identifiable characteristics may be contained, maintained, and managed throughout their lifetime so as to connect new information and/or NFTs to the individual's identity. A social NFT's information may include, but are not limited to, personally identifiable characteristics such as name, place and date of birth, and/or biometrics.

An example social NFT may assign a DNA print to a newborn's identity. In accordance with a number of embodiments of the invention, this first social NFT might then be used in the assignment process of a social security number NFT from the federal government. In some embodiments, the first social NFT may then be associated with some rights and capabilities, which may be expressed in other NFTs. Additional rights and capabilities may also be directly encoded in a policy of the social security number NFT.

Figure 15:
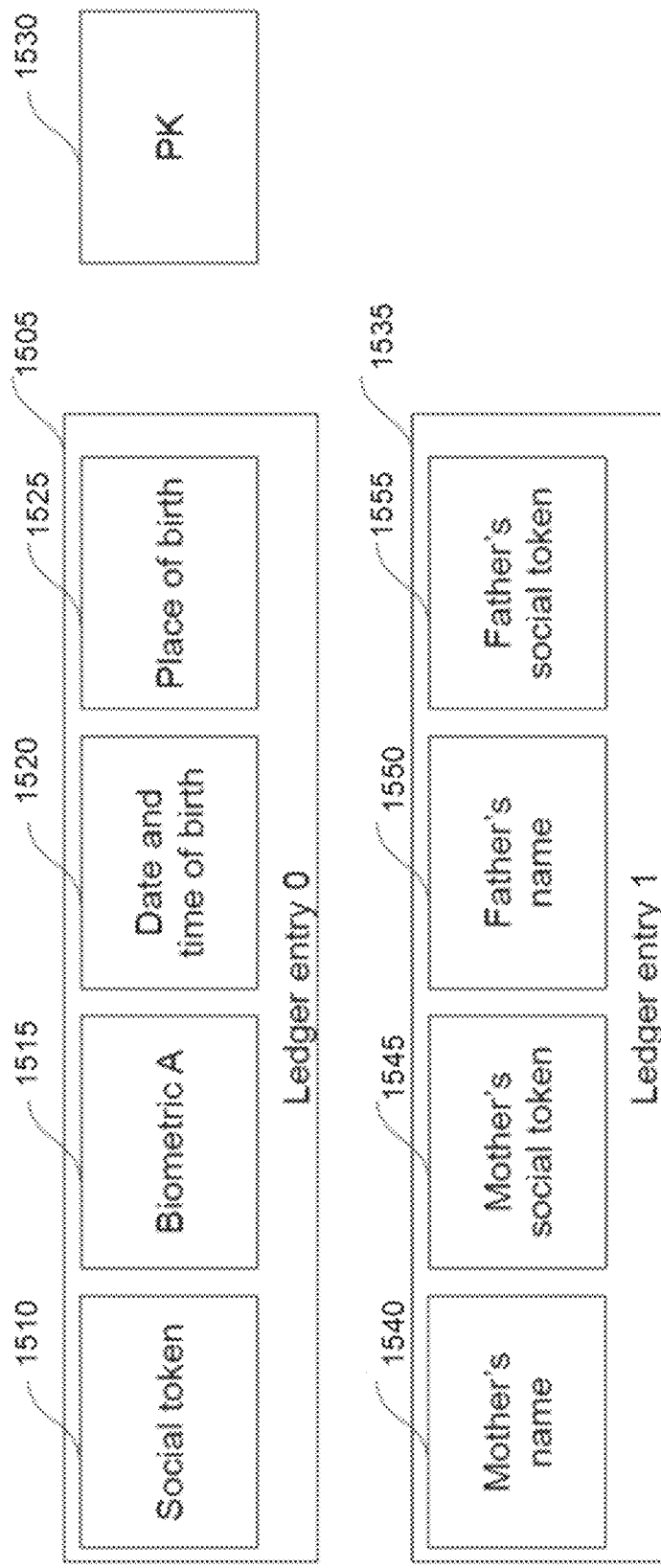
FIG. 15 illustrates an NFT ledger entry corresponding to an NFT identifier.

A social NFT may exist on a personalized branch of a centralized and/or decentralized blockchain. Ledger entries related to an individual's social NFT in accordance with several embodiments of the invention are depicted in FIG. 15. Ledger entries of this type may be used to build an immutable identity foundation whereby biometrics, birth and parental information are associated with an NFT. As such, this information may also be protected with encryption using a private key 1530. The initial entry in a ledger, "ledger entry 0" 1505, may represent a social token 1510 assignment to an individual with a biometric "A" 1515. In this embodiment, the biometric may include but is not limited to a footprint, a DNA print, and a fingerprint. The greater record may also include the individual's date and time of birth 1520 and place of birth 1525. A subsequent ledger entry 1 1535 may append parental information including but not limited to mothers' name 1540, mother's social token 1545, father's name 1550, and father's social token 1555.

In a number of embodiments, the various components that make up a social NFT may vary from situation to situation. In a number of embodiments, biometrics and/or parental information may be unavailable in a given situation and/or period of time. Other information including, but not limited to, race gender, and governmental number assignments such as social security numbers, may be desirable to include in the ledger. In a blockchain, future NFT creation may create a life-long ledger record of an individual's public and private activities. In accordance with some embodiments, the record may be associated with information including, but not limited to, identity, purchases, health and medical records, access NFTs, family records such as future offspring, marriages, familial history, photographs, videos, tax filings, and/or patent filings. The management and/or maintenance of an individual's biometrics throughout the individual's life may be immutably connected to the first social NFT given the use of a decentralized blockchain ledger.

In some embodiments, a certifying third party may generate an NFT associated with certain rights upon the occurrence of a specific event. In one such embodiment, the DMV may be the certifying party and generate an NFT associated with the right to drive a car upon issuing a traditional driver's license. In another embodiment, the certifying third party may be a bank that verifies a person's identity papers and generates an NFT in response to a successful verification. In a third embodiment, the certifying party may be a car manufacturer, who generates an NFT and associates it with the purchase and/or lease of a car.

In many embodiments, a rule may specify what types of policies the certifying party may associate with the NFT. Additionally, a non-certified entity may also generate an NFT and assert its validity. This may require putting up some form of security. In one example, security may come in the form of a conditional payment associated with the NFT generated by the non-certified entity. In this case, the conditional payment may be exchangeable for funds if abuse can be detected by a bounty hunter and/or some alternate entity. Non-certified entities may also relate to a publicly accessible reputation record describing the non-certified entity's reputability.

Anchored NFTs may additionally be applied to automatic enforcement of programming rules in resource transfers. NFTs of this type may be referred to as promise NFTs. A promise NFT may include an agreement expressed in a machine-readable form and/or in a human-accessible form. In a number of embodiments, the machine-readable and human-readable elements can be generated one from the other. In some embodiments, an agreement in a machine-readable form may include, but is not limited to, a policy and/or an executable script. In some embodiments, an agreement in a human-readable form may include, but is not limited to, a text and/or voice-based statement of the promise.

In some embodiments, regardless of whether the machine-readable and human-readable elements are generated from each other, one can be verified based on the other. Smart contracts including both machine-readable statements and human-accessible statements may also be used outside the implementation of promise NFTs. Moreover, promise NFTs may be used outside actions taken by individual NFTs and/or NFT-owners. In some embodiments, promise NFTs may relate to general conditions, and may be used as part of a marketplace.

In one such example, horse betting may be performed through generating a first promise NFT that offers a payment of $10 if a horse does not win. Payment may occur under the condition that the first promise NFT is matched with a second promise NFT that causes a transfer of funds to a public key specified with the first promise NFT if horse X wins.

A promise NFT may be associated with actions that cause the execution of a policy and/or rule indicated by the promise NFT. In some embodiments of the invention, a promise of paying a charity may be associated with the sharing of an NFT. In this embodiment, the associated promise NFT may identify a situation that satisfies the rule associated with the promise NFT, thereby causing the transfer of funds when the condition is satisfied (as described above). One method of implementation may be embedding in and/or associating a conditional payment with the promise NFT. A conditional payment NFT may induce a contract causing the transfer of funds by performing a match. In some such methods, the match may be between the promise NFT and inputs that identify that the conditions are satisfied, where said input can take the form of another NFT. In a number of embodiments, one or more NFTs may also relate to investment opportunities.

For example, a first NFT may represent a deed to a first building, and a second NFT a deed to a second building. Moreover, the deed represented by the first NFT may indicate that a first party owns the first property. The deed represented by the second NFT may indicate that a second party owns the second property. A third NFT may represent one or more valuations of the first building. The third NFT may in turn be associated with a fourth NFT that may represent credentials of a party performing such a valuation. A fifth NFT may represent one or more valuations of the second building. A sixth may represent the credentials of one of the parties performing a valuation. The fourth and sixth NFTs may be associated with one or more insurance policies, asserting that if the parties performing the valuation are mistaken beyond a specified error tolerance, then the insurer would pay up to a specified amount.

A seventh NFT may then represent a contract that relates to the planned acquisition of the second building by the first party, from the second party, at a specified price. The seventh NFT may make the contract conditional provided a sufficient investment and/or verification by a third party. A third party may evaluate the contract of the seventh NFT, and determine whether the terms are reasonable. After the evaluation, the third party may then verify the other NFTs to ensure that the terms stated in the contract of the seventh NFT agree. If the third party determines that the contract exceeds a threshold in terms of value to risk, as assessed in the seventh NFT, then executable elements of the seventh NFT may cause transfers of funds to an escrow party specified in the contract of the sixth NFT.

Alternatively, the first party may initiate the commitment of funds, conditional on the remaining funds being raised within a specified time interval. The commitment of funds may occur through posting the commitment to a ledger. Committing funds may produce smart contracts that are conditional on other events, namely the payments needed to complete the real estate transaction. The smart contract also may have one or more additional conditions associated with it. For example, an additional condition may be the reversal of the payment if, after a specified amount of time, the other funds have not been raised. Another condition may be related to the satisfactory completion of an inspection and/or additional valuation.

NFTs may also be used to assert ownership of virtual property. Virtual property in this instance may include, but is not limited to, rights associated with an NFT, rights associated with patents, and rights associated with pending patents. In a number of embodiments, the entities involved in property ownership may be engaged in fractional ownership. In some such embodiments, two parties may wish to purchase an expensive work of digital artwork represented by an NFT. The parties can enter into smart contracts to fund and purchase valuable works. After a purchase, an additional NFT may represent each party's contribution to the purchase and equivalent fractional share of ownership.

Another type of NFTs that may relate to anchored NFTs may be called "relative NFTs." This may refer to NFTs that relate two or more NFTs to each other. Relative NFTs associated with social NFTs may include digital signatures that is verified using a public key of a specific social NFT. In some embodiments, an example of a relative NFT may be an assertion of presence in a specific location, by a person corresponding to the social NFT. This type of relative NFT may also be referred to as a location NFT and a presence NFT. Conversely, a signature verified using a public key embedded in a location NFT may be used as proof that an entity sensed by the location NFT is present. Relative NFTs are derived from other NFTs, namely those they relate to, and therefore may also be referred to as derived NFTs. An anchored NFT may tie to another NFT, which may make it both anchored and relative. An example of such may be called pseudonym NFTs.

Pseudonym NFTs may be a kind of relative NFT acting as a pseudonym identifier associated with a given social NFT. In some embodiments, pseudonym NFTs may, after a limited time and/or a limited number of transactions, be replaced by a newly derived NFTs expressing new pseudonym identifiers. This may disassociate users from a series of recorded events, each one of which may be associated with different pseudonym identifiers. A pseudonym NFT may include an identifier that is accessible to biometric verification NFTs. Biometric verification NFTs may be associated with a TEE and/or DRM which is associated with one or more biometric sensors. Pseudonym NFTs may be output by social NFTs and/or pseudonym NFTs.

Inheritance NFTs may be another form of relative NFTs, that transfers rights associated with a first NFT to a second NFT. For example, computers, represented by an anchored NFT that is related to a physical entity (the hardware), may have access rights to WiFi networks. When computers are replaced with newer models, users may want to maintain all old relationships, for the new computer. For example, users may want to retain WiFi hotspots. For this to be facilitated, a new computer can be represented by an inheritance NFT, inheriting rights from the anchored NFT related to the old computer. An inheritance NFT may acquire some or all pre-existing rights associated with the NFT of the old computer, and associate those with the NFT associated with the new computer.

More generally, multiple inheritance NFTs can be used to selectively transfer rights associated with one NFT to one or more NFTs, where such NFTs may correspond to users, devices, and/or other entities, when such assignments of rights are applicable. Inheritance NFTs can also be used to transfer property. One way to implement the transfer of property can be to create digital signatures using private keys. These private keys may be associated with NFTs associated with the rights. In accordance with a number of embodiments, transfer information may include the assignment of included rights, under what conditions the transfer may happen, and to what NFT(s) the transfer may happen. In this transfer, the assigned NFTs may be represented by identifies unique to these, such as public keys. The digital signature and message may then be in the form of an inheritance NFT, or part of an inheritance NFT. As rights are assigned, they may be transferred away from previous owners to new owners through respective NFTs. Access to financial resources is one such example.

However, sometimes rights may be assigned to new parties without taking the same rights away from the party (i.e., NFT) from which the rights come. One example of this may be the right to listen to a song, when a license to the song is sold by the artist to consumers. However, if the seller sells exclusive rights, this causes the seller not to have the rights anymore.

In accordance with many embodiments of the invention, multiple alternative NFT configurations may be implemented. One classification of NFT may be an employee NFT or employee token. Employee NFTs may be used by entities including, but not limited to, business employees, students, and organization members. Employee NFTs may operate in a manner analogous to key card photo identifications. In a number of embodiments, employee NFTs may reference information including, but not limited to, company information, employee identity information and/or individual identity NFTs.

Additionally, employee NFTs may include associated access NFT information including but not limited to, what portions of a building employees may access, and what computer system employees may utilize. In several embodiments, employee NFTs may incorporate their owner's biometrics, such as a face image. In a number of embodiments, employee NFTs may operate as a form of promise NFT. In some embodiments, employee NFT may comprise policies or rules of employing organization. In a number of embodiments, the employee NFT may reference a collection of other NFTs.

Another type of NFT may be referred to as the promotional NFT or promotional token. Promotional NFTs may be used to provide verification that promoters provide promotion winners with promised goods. In some embodiments, promotional NFTs may operate through decentralized applications for which access restricted to those using an identity NFT. The use of a smart contract with a promotional NFT may be used to allow for a verifiable release of winnings. These winnings may include, but are not limited to, cryptocurrency, money, and gift card NFTs useful to purchase specified goods. Smart contracts used alongside promotional NFTs may be constructed for winners selected through random number generation.

Another type of NFT may be called the script NFT or script token. Script tokens may incorporate script elements including, but not limited to, story scripts, plotlines, scene details, image elements, avatar models, sound profiles, and voice data for avatars. Script tokens may also utilize rules and policies that describe how script elements are combined. Script tokens may also include rightsholder information, including but not limited to, licensing and copyright information. Executable elements of script tokens may include instructions for how to process inputs; how to configure other elements associated with the script tokens; and how to process information from other tokens used in combination with script tokens.

Script tokens may be applied to generate presentations of information. In accordance with some embodiments, these presentations may be developed on devices including but not limited to traditional computers, mobile computers, and virtual reality display devices. Script tokens may be used to provide the content for game avatars, digital assistant avatars, and/or instructor avatars. Script tokens may comprise audio-visual information describing how input text is presented, along with the input text that provides the material to be presented. It may also comprise what may be thought of as the personality of the avatar, including how the avatar may react to various types of input from an associated user.

In some embodiments, script NFTs may be applied to govern behavior within an organization. For example, this may be done through digital signatures asserting the provenance of the scripts. Script NFTs may also, in full and/or in part, be generated by freelancers. For example, a text script related to a movie, an interactive experience, a tutorial, and/or other material, may be created by an individual content creator. This information may then be combined with a voice model or avatar model created by an established content producer. The information may then be combined with a background created by additional parties. Various content producers can generate parts of the content, allowing for large-scale content collaboration.

Features of other NFTs can be incorporated in a new NFT using techniques related to inheritance NFTs, and/or by making references to other NFTs. As script NFTs may consist of multiple elements, creators with special skills related to one particular element may generate and combine elements. This may be used to democratize not only the writing of storylines for content, but also outsourcing for content production. For each such element, an identifier establishing the origin or provenance of the element may be included. Policy elements can also be incorporated that identify the conditions under which a given script element may be used. Conditions may be related to, but are not limited to execution environments, trusts, licenses, logging, financial terms for use, and various requirements for the script NFTs. Requirements may concern, but are not limited to, what other types of elements the given element are compatible with, what is allowed to be combined with according the terms of service, and/or local copyright laws that must be obeyed.

Evaluation units may be used with various NFT classifications to collect information on their use. Evaluation units may take a graph representing subsets of existing NFTs and make inferences from the observed graph component. From this, valuable insights into NFT value may be derived. For example, evaluation units may be used to identify NFTs whose popularity is increasing or waning. In that context, popularity may be expressed as, but not limited to, the number of derivations of the NFT that are made; the number of renderings, executions or other uses are made; and the total revenue that is generated to one or more parties based on renderings, executions or other uses.

Evaluation units may make their determination through specific windows of time and/or specific collections of end-users associated with the consumption of NFT data in the NFTs. Evaluation units may limit assessments to specific NFTs (e.g. script NFTs). This may be applied to identify NFTs that are likely to be of interest to various users. In addition, the system may use rule-based approaches to identify NFTs of importance, wherein importance may be ascribed to, but is not limited to, the origination of the NFTs, the use of the NFTs, the velocity of content creation of identified clusters or classes, the actions taken by consumers of NFT, including reuse of NFTs, the lack of reuse of NFTs, and the increased or decreased use of NFTs in selected social networks.

Evaluations may be repurposed through recommendation mechanisms for individual content consumers and/or as content originators. Another example may address the identification of potential combination opportunities, by allowing ranking based on compatibility. Accordingly, content creators such as artists, musicians and programmers can identify how to make their content more desirable to intended target groups.

The generation of evaluations can be supported by methods including, but not limited to machine learning (ML) methods, artificial intelligence (AI) methods, and/or statistical methods. Anomaly detection methods developed to identify fraud can be repurposed to identify outliers. This can be done to flag abuse risks or to improve the evaluation effort.

Multiple competing evaluation units can make competing predictions using alternative and proprietary algorithms. Thus, different evaluation units may be created to identify different types of events to different types of subscribers, monetizing their insights related to the data they access.

In a number of embodiments, evaluation units may be a form of NFTs that derive insights from massive amounts of input data. Input data may correspond, but is not limited to the graph component being analyzed. Such NFTs may be referred to as evaluation unit NFTs.

The minting of NFTs may associate rights with first owners and/or with an optional one or more policies and protection modes. An example policy and/or protection mode directed to financial information may express royalty requirements. An example policy and/or protection mode directed to non-financial requirements may express restrictions on access and/or reproduction. An example policy directed to data collection may express listings of user information that may be collected and disseminated to other participants of the NFT platform.

Figure 16A:
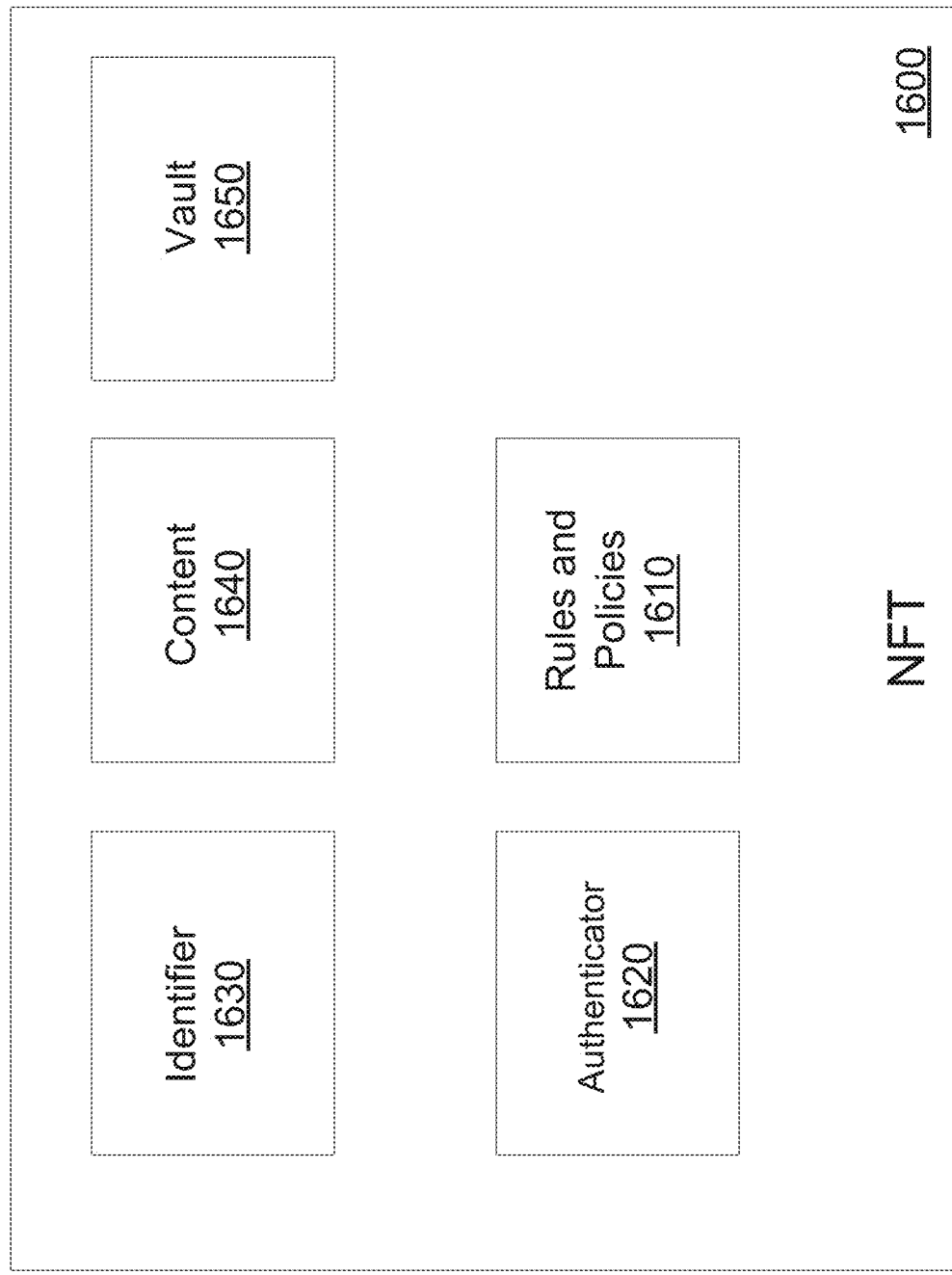
FIGS. 16A-16B illustrate an NFT arrangement relationship with corresponding physical content in accordance with an embodiment of the invention.
Figure 16B:
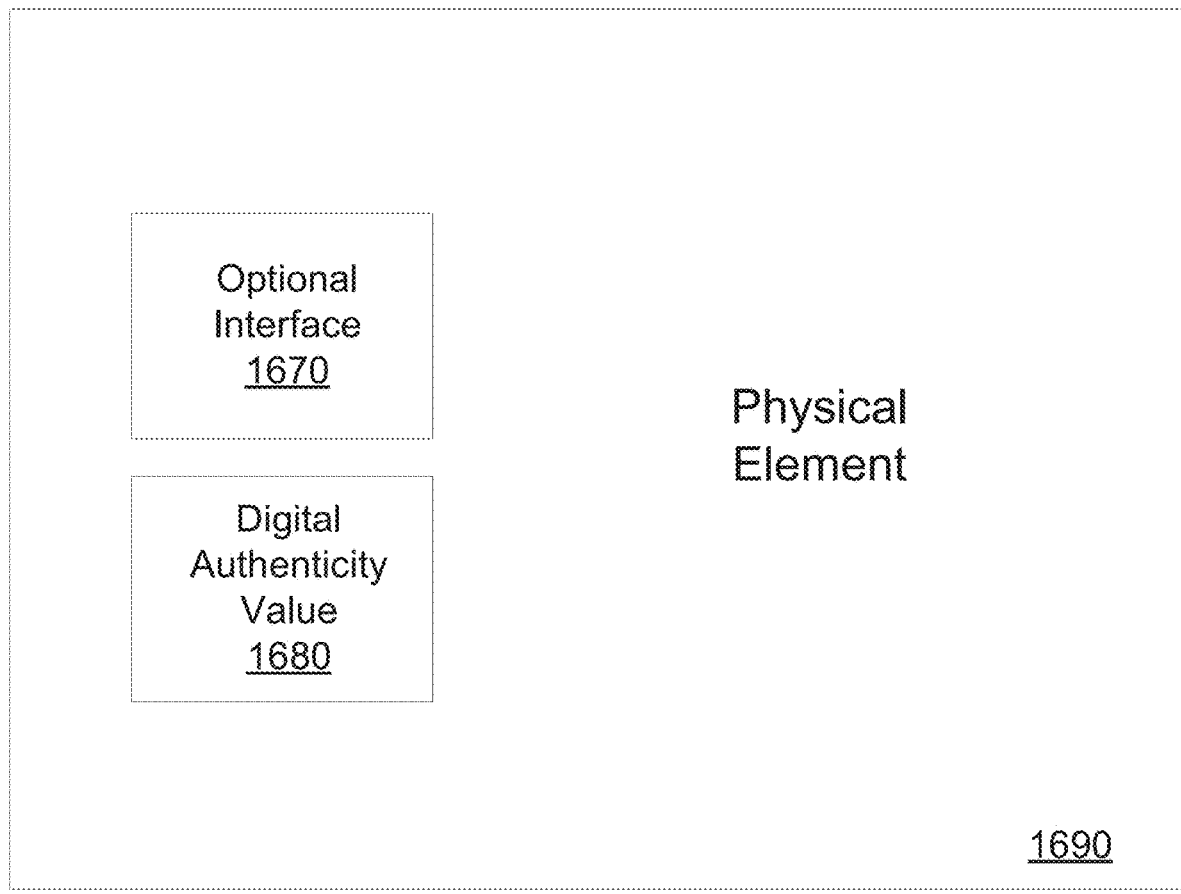

An example NFT which may be associated with specific content in accordance with several embodiments of the invention is illustrated in FIG. 16. In some embodiments, an NFT 1600 may utilize a vault 1650, which may control access to external data storage areas. Methods of controlling access may include, but are not limited to, user credential information 1350. In accordance with a number of embodiments of the invention, control access may be managed through encrypting content 1640. As such, NFTs 1600 can incorporate content 1640, which may be encrypted, not encrypted, yet otherwise accessible, or encrypted in part. In accordance with some embodiments, an NFT 1600 may be associated with one or more content 1640 elements, which may be contained in or referenced by the NFT. A content 1640 element may include, but is not limited to, an image, an audio file, a script, a biometric user identifier, and/or data derived from an alternative source. An example alternative source may be a hash of biometric information). An NFT 1600 may also include an authenticator 1620 capable of affirming that specific NFTs are valid.

In accordance with many embodiments of the invention, NFTs may include a number of rules and policies 1610. Rules and policies 1610 may include, but are not limited to access rights information 1340. In some embodiments, rules and policies 1610 may also state terms of usage, royalty requirements, and/or transfer restrictions. An NFT 1600 may also include an identifier 1630 to affirm ownership status. In accordance with many embodiments of the invention, ownership status may be expressed by linking the identifier 1630 to an address associated with a blockchain entry.

In accordance with a number of embodiments of the invention, NFTs may represent static creative content. NFTs may also be representative of dynamic creative content, which changes over time. In accordance with many examples of the invention, the content associated with an NFT may be a digital content element.

One example of a digital content element in accordance with some embodiments may be a set of five images of a mouse. In this example, the first image may be an image of the mouse being alive. The second may be an image of the mouse eating poison. The third may be an image of the mouse not feeling well. The fourth image may be of the mouse, dead. The fifth image may be of a decaying mouse.

The user credential information 1350 of an NFT may associate each image to an identity, such as of the artist. In accordance with a number of embodiments of the invention, NFT digital content can correspond to transitions from one representation (e.g., an image of the mouse, being alive) to another representation (e.g., of the mouse eating poison). In this disclosure, digital content transitioning from one representation to another may be referred to as a state change and/or an evolution. In a number of embodiments, an evolution may be triggered by the artist, by an event associated with the owner of the artwork, randomly, and/or by an external event.

When NFTs representing digital content are acquired in accordance with some embodiments of the invention, they may also be associated with the transfer of corresponding physical artwork, and/or the rights to said artwork. The first ownership records for NFTs may correspond to when the NFT was minted, at which time its ownership can be assigned to the content creator. Additionally, in the case of "lazy" minting, rights may be directly assigned to a buyer.

In some embodiments, as a piece of digital content evolves, it may also change its representation. The change in NFTs may also send a signal to an owner after it has evolved. In doing so, a signal may indicate that the owner has the right to acquire the physical content corresponding to the new state of the digital content. Under an earlier example, buying a live mouse artwork, as an NFT, may also carry the corresponding painting, and/or the rights to it. A physical embodiment of an artwork that corresponds to that same NFT may also be able to replace the physical artwork when the digital content of the NFT evolves. For example, should the live mouse artwork NFT change states to a decaying mouse, an exchange may be performed of the corresponding painting for a painting of a decaying mouse.

The validity of one of the elements, such as the physical element, can be governed by conditions related to an item with which it is associated. For example, a physical painting may have a digital authenticity value that attests to the identity of the content creator associated with the physical painting.

An example of a physical element 1690 corresponding to an NFT, in accordance with some embodiments of the invention is illustrated in FIG. 16. A physical element 1690 may be a physical artwork including, but not limited to, a drawing, a statue, and/or another physical representation of art. In a number of embodiments, physical representations of the content (which may correspond to a series of paintings) may each be embedded with a digital authenticity value (or a validator value) value. In accordance with many embodiments of the invention, a digital authenticity value (DAV) 1680 may be therefore be associated with a physical element 1690 and a digital element. A digital authenticity value may be a value that includes an identifier and a digital signature on the identifier. In some embodiments the identifier may specify information related to the creation of the content. This information may include the name of the artist, the identifier 1630 of the digital element corresponding to the physical content, a serial number, information such as when it was created, and/or a reference to a database in which sales data for the content is maintained. A digital signature element affirming the physical element may be made by the content creator and/or by an authority associating the content with the content creator.

In some embodiments, the digital authenticity value 1680 of the physical element 1690 can be expressed using a visible representation. The visible representation may be an optional physical interface 1670 taken from a group including, but not limited to, a barcode and a quick response (QR) code encoding the digital authenticity value. In some embodiments, the encoded value may also be represented in an authenticity database. Moreover, the physical interface 1670 may be physically associated with the physical element. One example of such may be a QR tag being glued to or printed on the back of a canvas. In some embodiments of the invention, the physical interface 1670 may be possible to physically disassociate from the physical item it is attached to. However, if a DAV 1680 is used to express authenticity of two or more physical items, the authenticity database may detect and block a new entry during the registration of the second of the two physical items. For example, if a very believable forgery is made of a painting the forged painting may not be considered authentic without the QR code associated with the digital element.

In a number of embodiments, the verification of the validity of a physical item, such as a piece of artwork, may be determined by scanning the DAV. In some embodiments, scanning the DAV may be used to determine whether ownership has already been assigned. Using techniques like this, each physical item can be associated with a control that prevents forgeries to be registered as legitimate, and therefore, makes them not valid. In the context of a content creator receiving a physical element from an owner, the content creator can deregister the physical element 1690 by causing its representation to be erased from the authenticity database used to track ownership. Alternatively, in the case of an immutable blockchain record, the ownership blockchain may be appended with new information. Additionally, in instances where the owner returns a physical element, such as a painting, to a content creator in order for the content creator to replace it with an "evolved" version, the owner may be required to transfer the ownership of the initial physical element to the content creator, and/or place the physical element in a stage of being evolved.

Figure 17:
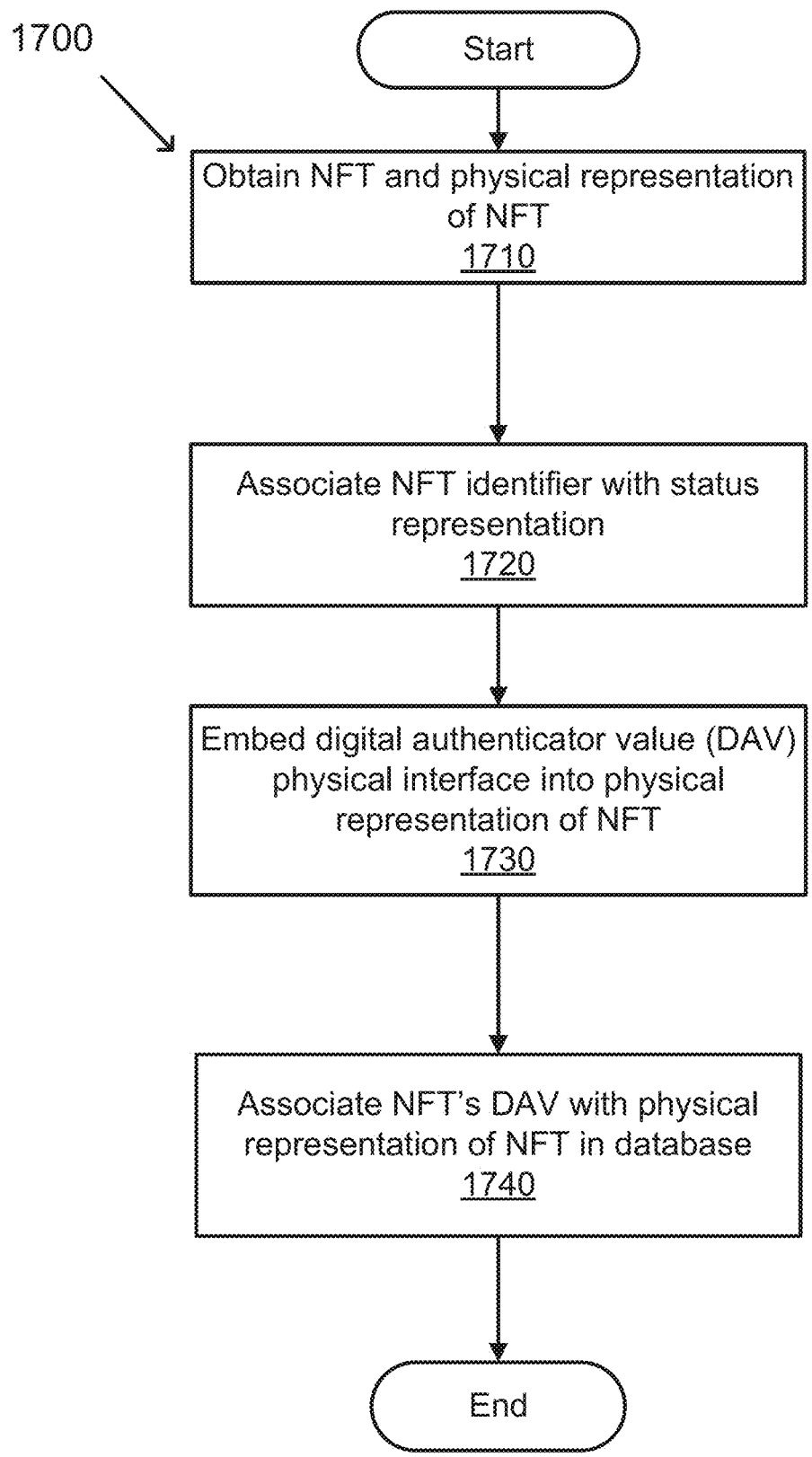
FIG. 17 illustrates a process for establishing a relationship between an NFT and corresponding physical content.

An example of a process for connecting an NFT digital element to physical content in accordance with some embodiments of the invention is illustrated in FIG. 17. Process 1700 may obtain (1710) an NFT and a physical representation of the NFT in connection with an NFT transaction. Under the earlier example, this may be a painting of a living mouse and an NFT of a living mouse. By virtue of establishing ownership of the NFT, the process 1700 may associate (1720) an NFT identifier with a status representation of the NFT. The NFT identifier may specify attributes including, but not limited to, the creator of the mouse painting and NFT ("Artist"), the blockchain the NFT is on ("NFT-Chain"), and an identifying value for the digital element ("no. 0001"). Meanwhile, the status representation may clarify the present state of the NFT ("alive mouse"). Process 1700 may also embed (1730) a DAV physical interface into the physical representation of the NFT. In a number of embodiments of the invention, this may be done by implanting a QR code into the back of the mouse painting. In affirming the connection between the NFT and painting, Process 1700 can associate (1740) the NFT's DAV with the physical representation of the NFT in a database. In some embodiments, the association can be performed through making note of the transaction and clarifying that it encapsulates both the mouse painting and the mouse NFT.

While specific processes are described above with reference to FIGS. 15-17, NFTs can be implemented in any of a number of different ways to enable as appropriate to the requirements of specific applications in accordance with various embodiments of the invention. Additionally, the specific manner in which NFTs can be utilized within NFT platforms in accordance with various embodiments of the invention is largely dependent upon the requirements of a given application.

Artifact Origination Tokens and Content Origin Determination

Figure 18:
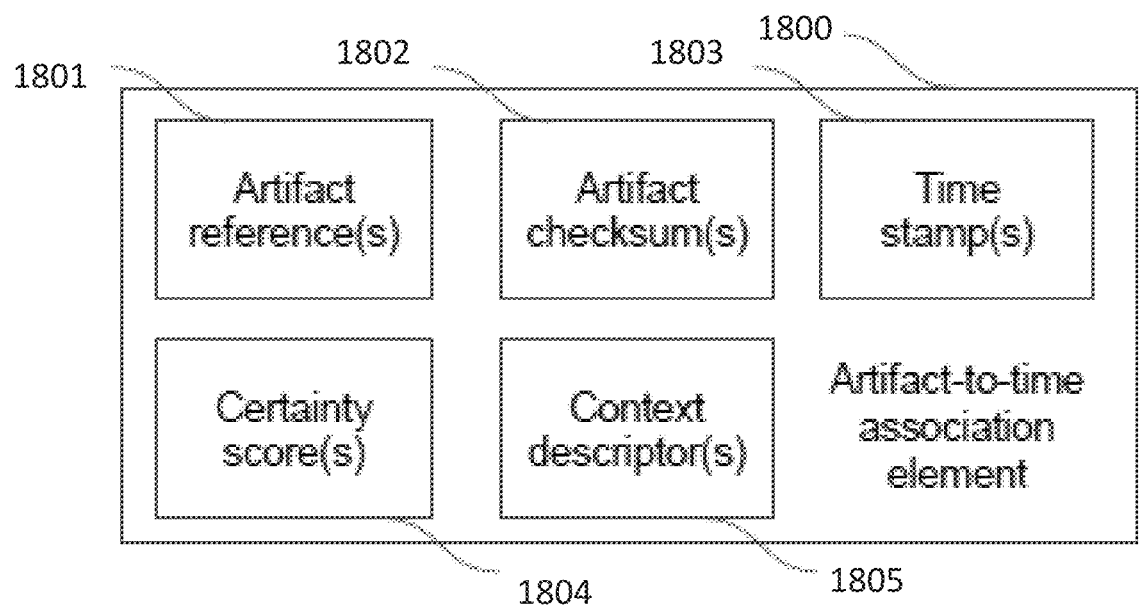
FIG. 18 conceptually illustrates an example artifact-to-time association element.

In various embodiments, timestamps are integral to establishing origination information of a token. Timestamps can be included in artifact-to-time association elements. Artifact-to-time association elements can be included in artifact origination tokens. In various embodiments, artifact-to-time association elements are included in artifact origination tokens. An example artifact-to-time association element is conceptually illustrated in FIG. 18. The artifact-to-time association element 1800 can include one or more artifact reference(s) 1801. In several embodiments, artifact references can be URLs to where artifacts are stored, a descriptors of artifacts, or representations of artifacts. In some embodiments, artifact-to-time association elements include artifact checksums. Artifact-to-time association element 1800 includes an optional artifact checksum 1802. Artifact checksums can be cryptographic hashes of artifacts and/or cryptographic hashes of artifact representations. The artifact-to-time association element 1800 can include one or more timestamps 1803. Timestamps in accordance with many embodiments of the invention can include references to blockchains and/or assertions by trusted parties. The artifact-to-time association element 1800 can include one or more certainty scores 1804. Certainty scores can describe a degree of certainty of timestamps according to pre-defined measures. The artifact-to-time association element 1800 can include one or more context descriptors 1805. Context descriptors can be descriptions of how the timestamps were performed, what types of mappings were used to represent the artifact, and/or other information.

In several embodiments, artifacts include content that is created using an online tool (e.g., Google Documents™). Users can provide input to service providers on the users' computers, and one or more cloud servers store the content and intermediate versions of it. In many embodiments, a proof of origination of an artifact (e.g., a text document) can be produced from one or more (e.g., two) components. In some embodiments, proofs of origination can be produced based on origination evidence. Origination evidence can be related to timestamped versions of the document and are further discussed herein. Timestamped versions of the document can correspond to version of the document generated while the document is being created. In various embodiments, proofs of origination can be produced based on assurances that the document did not exist prior to an origination timestamp of the document.

In a simple example case, the document was created, in its entirety, on a creation date (e.g., Jul. 8, 2021), and was not made public until a publication date (e.g., Aug. 8, 2021). In various embodiments, origination evidence can include a timestamp of the document, associating the document with a creation date of (e.g., Jul. 8, 2021). In several embodiments origination evidence can include a series of timestamps associated with a series of versions of a document. Origination evidence can be obtained, from the service provider associated with the creation of the document, from a separate entity to whom the document, or a hash thereof, was provided by the originator. A proof of origination can be based on origination evidence. A portion of the proof of origination can be generated when a timestamp was created on the origination date (e.g., Jul. 8, 2021), and a token can be associated with the timestamp and the token is associated with the originator. In numerous embodiments, associating the token with the with a timestamp and an originator can include linking a token with a date-stamp of the document to an identity token or alias token associated with the originator.

In some embodiments, dates of origination can be determined retroactively. In several embodiments, when a user utilizes a trusted service (e.g., a cloud service) for content creation, the trusted service can determine, retroactively, when the content was created. For example, when a user creates an artifact on a creation date (e.g., Jul. 8, 2021), and on a later date, requests to have the document timestamped, then the trusted service can determine that the artifact was created on the creation date (e.g., Jul. 8, 2021). The trusted service can generate an assertion to the creation date. In a number of embodiments, trusted services can maintain time-stamping of artifacts during creation of the artifacts. In several embodiments, timestamping can use public time-stamping services. Public timestamping services can include blockchains, or modification logs maintained by trusted service providers. Modification logs in accordance with certain embodiments of the invention can be periodically timestamped using public timestamping services, blockchains, and/or by the trusted service providers. Timestamps can be audited by a trusted party.

In several embodiments, timestamps can be creation created retroactively by trusted platforms. Trusted platforms can include trusted execution environments (TEE) and/or digital rights management (DRM) platforms. Trusted platforms can require verifications that users do not modify system clocks. Verifications system clocks have not been modified can be established using public timestamps. Public timestamps can include timestamps generated using a blockchain, timestamps generated at the time the user requests an origin proof, and/or timestamps generated using trust-based back-dating based logs kept locally in trusted platforms.

In various embodiments, artifacts are created over the course of a creation time period (e.g., days, weeks or years). Artifacts can be gradually completed over the creation time period. For example, an author may write ten pages a day for some period of time, then take a few days break, then continue writing ten pages a day until a 300 page novel is written over the course of weeks, months or years. In several embodiments, timestamps associated with artifacts can represent the time when the artifact was completed. In some embodiments, artifacts can be associated with two timestamps. An initiation timestamp can indicate when the creation of an artifact was initiated. A completion timestamp can indicate when an artifact was completed.

In many embodiments, a series of timestamps can be recorded. In various embodiments, timestamps can be recorded periodically, according to a function, and/or in response to inputs received from a user or a system (e.g., a blockchain, a trusted service, etc.). For example, timestamps can be recorded at the end of each day, from the beginning of the artifact creation until the generation of an artifact origination token. In several embodiments, artifact origination tokens can be generated before the artifact is complete. In various embodiments, artifact origination tokens correspond to portions and/or updates of artifacts. Continuing the novel example, an artifact origination token can correspond to the text as it stands at the end of each day and/or with each saved version. Updates entered in artifact origination tokens may not take place linearly, and updates can include erasures or re-orderings. In many embodiments, artifact origination tokens can include one or more timestamps that the artifacts correspond to. In several embodiments, an artifact origination token can include references to multiple versions of an artifact. Multiple versions of artifacts may each correspond to timestamps. In many embodiments, mappings between versions and timestamps can be determined, (e.g., by the originator or a party trusted by the originator). In several embodiments, timestamps and mappings to artifact versions can be encrypted and stored, encrypted and referenced, and/or encrypted and incorporated in artifact origination tokens. Based on the mappings of timestamps to artifact versions, origination dates can be evaluated on per-update version basis. Comparisons between artifact origination tokens can be made. In various embodiments, comparisons can be based on at least artifact origination tokens and/or auxiliary evidence of creation. Auxiliary evidence of creation can include publicly posted elements, by the claimed originator or others.

In various embodiments, timestamps can be generated based on public posts. Public posts can be publicly available on networks. For example, an author writes a chapter of a novel and publishes the chapter on the Internet (e.g., posting a tweet or other social media announcement referencing the posted chapter). The author later decides to turn the posted chapter into a complete book. The posting of the first chapter can initiate an automatic timestamping of the associated content. In several embodiments, records of public postings can be assessed and used as timestamps and/or used to generate timestamps. In some embodiments, public postings can be used to generate verifications. Verifications can verify that later observed content do not appear to be a modified versions of previously posted content. If the later observed content is determined not to be a modified version of an earlier observed content, the later observed content can correspond to an artifact (or a part thereof) and the timestamp can be based on the associated posting.

In several embodiments, different time assertions can be associated with different certainty scores. Blockchain based timestamps can be deemed more reliable than public posting-based timestamps. Public posting based timestamps can be deemed more reliable than DRM-based assertions of local timestamps. Artifacts can be associated with one or more timestamps and associated certainty scores. In a number of embodiments, retroactively establishing timestamps of the creation of artifacts can generate two timestamps with associated certainty scores and/or for each artifact. A request timestamp can correspond to a time of a request to create one or more timestamps. Request timestamps can be associated with a high certainty score. Request timestamps can use the highest-quality timestamping assertion available. In some embodiments, request timestamps can be blockchain based timestamps. A record timestamp can be associated with a time before a time of a request timestamp. Record timestamps in accordance with certain embodiments of the invention can correspond to determinations of artifact age. Determinations of artifact age can be based on records such as Internet archives, local logs, upload logs, tweets, and/or other records. Record timestamps can be associated with low certainty scores. Low certainty scores can correspond to perceived fraud risks associated with the various techniques relied on. Moreover, as described elsewhere, different aspects, parts and/or versions of an artifact can correspond to one or more timestamps, and associated certainty scores. In several embodiments, certainty scores are based on a perceived trustworthiness of an entity generating a record timestamp. Record timestamps can be public posting-based timestamps.

While specific systems and components for artifact-to-time association elements are described above, any of a variety of systems and components can be utilized for artifact-to-time association elements as appropriate to the requirements of specific applications. In certain embodiments components can be arranged in any order or sequence not limited to the order and sequence shown and described. In a number of embodiments, some of the above components may executed or perform processes substantially simultaneously where appropriate or in parallel to reduce latency and processing times. In some embodiments, one or more of the above components may be omitted. Although the above embodiments of the invention are described in reference to artifact-to-time association elements the techniques disclosed herein may be used in any of the rich media systems, permissioned blockchains, cryptographic systems, tokenization of content, and artifact origination assessments, artifact origination tokens, and other systems and processes discussed herein.

Figure 19:
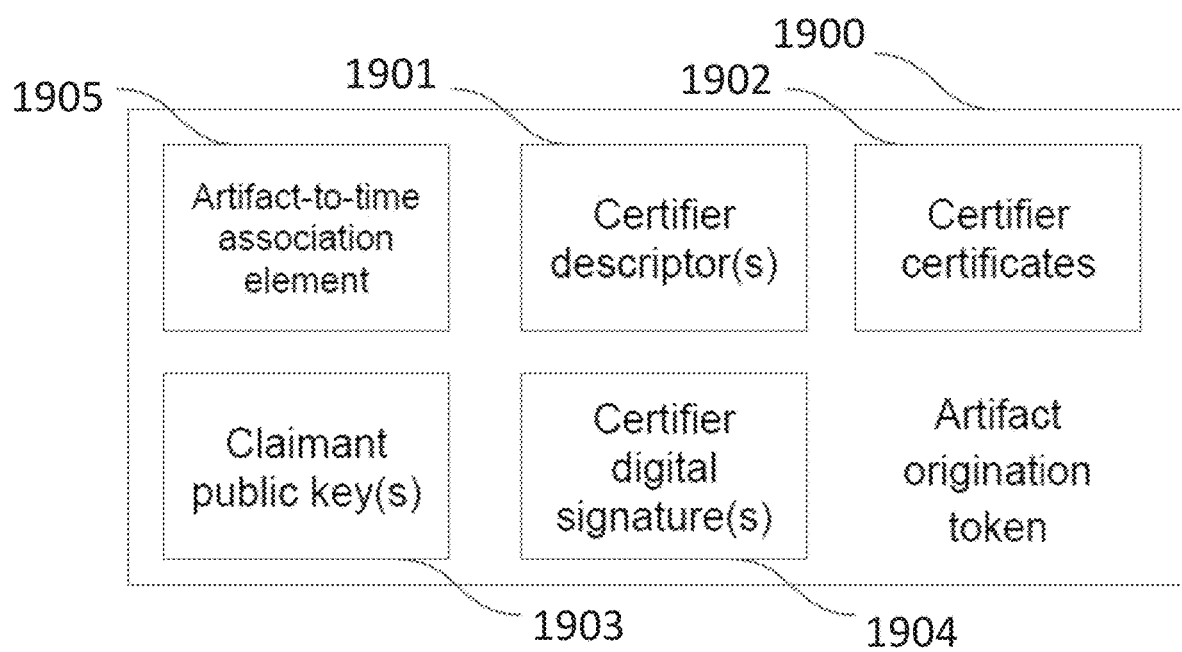
FIG. 19 conceptually illustrates an example of an artifact origination token.

Artifact-to-time association elements can be integrated into artifact origination tokens. An example of an artifact origination token is conceptually illustrated in FIG. 19. An artifact origination token 1900, can include an artifact-to-time association element 1800, one or more certifier descriptors 1901, one or more certifier certificates 1902, one or more claimant public keys 1903, and one or more certifier digital signatures 1904. In several embodiments, certifier descriptors indicate a type of certifier. Types of certifiers can include descriptions of operator entity, bonded status, and/or whether the entity is linked to a reward for bounty hunters. Indications of certifier type can specify public keys of certifiers. In many embodiments, certifier certificates can include certificates for each public key indicated in certifier descriptors. In a number of embodiments, claimants can be originators or owners making requests to create artifact origination tokens, or on whose behalf requests are made. In certain embodiments, artifacts can be composite artifacts. Composite artifacts can include multiple elements. Each element can have different claimants (e.g., originators or owners). Composite artifacts can be associated with one or more artifact origination tokens. In multiple embodiments, one or more claimant public keys can be associated with one or more claimants. In some embodiments, each claimant can be associated with one claimant public key. In various embodiments, certifier digital signatures can include digital signatures for each unique certifier associated with certifier certificates and associated certifier public keys.

In many embodiments, certifier digital signatures can be relative to artifact origination messages including artifact-to-time association elements, certifier descriptors certifier certificates and/or claimant public keys. In several embodiments, digital signatures can be verified based on artifact origination messages using public keys associated with certifiers. Certifier certificates can be verified based on artifact origination messages, which can result in the evaluation of a certification token mesh. Evaluation of certification mesh tokens is disclosed in co-pending U.S. patent application Ser. No. 17/810,741 filed Jul. 5, 2022, titled "Systems and Method for Providing Security Against Deception and Abuse in Distributed and Tokenized Environments", which is incorporated by reference in its entirety.

In several embodiments, artifact origination tokens include evidence of origination. Evidence of origination can be associated with when associated artifacts were first documented. The first documented time can be associated with a date of origination. In various embodiments, artifact origination tokens can include origination assertions that associated artifacts were not known to exist prior to the date of origination. In many embodiments, certification authorities can provide origination assertions. Origination assertions can include a description of techniques used to determine an absence of evidence of prior existence. In various embodiments, artifact origination tokens can, explicitly or implicitly, include bounty hunter challenges. Bounty hunter challenges can correspond to offers of a bounty (e.g., a transaction involving a token transfer) to bounty hunters providing evidence of the prior existence of the artifact. Such a challenge, when not successfully addressed, can provide additional evidence that the artifact did not exist prior to the claimed time associated with the timestamp. Technology for managing bounty hunters is disclosed in co-pending U.S. patent application Ser. No. 17/806,065 filed Jun. 8, 2022, titled "Systems and Methods for Maintenance of NFT Assets" by Markus Jakobsson, Stephen C. Gerber, and Guy Stewart, which is incorporated by reference in its entirety.

In several embodiments, artifact origination tokens include origination evidence. Origination evidence can support that approximate versions of the artifact did not exist prior to a given origination time. Origination evidence can support that the artifact was in the possession of a given entity at an origination time. Origination time and origination date can be used interchangeably. The origination evidence can be references to the artifact, references to or inclusions of timestamps associated with the artifact, and/or inclusions of assertions that the artifact, as well as approximate versions of it, were not known to the certifying entity at the time of the timestamp. In many embodiments, the origination evidence can be included on a token (e.g., an artifact origination token). In certain embodiments, tokens (e.g., artifact origination tokens) can include descriptions of policies, or references to policies. The policies can describe the meaning of "approximate" in the context of an assertion. For example, when the artifact is a photo, a policy describing the meaning of approximate may correspond to various transformations that are commonly applied on photos (e.g., rotations, truncations, changes of size, and/or others). Artifact transformations can be described as mathematical mappings of the artifact data. The implementations to detect the transformations may be referenced in the abstract in the policy. In various embodiments, policies may state, whether in human-readable terms, machine-readable terms, or both, that the types of transformations that were scanned for were "traditional image reformatting algorithms," which may be understood to comprise techniques such as compression, image sharpening, truncation, etc. Policies in accordance with a number of embodiments of the invention may indicate that an expert user, who may be named or otherwise indicated, had verified the artifact and believes it to be an original. As discussed herein, such assertions can be combined with bounties.

In several embodiments, another evidence portion part, which may in some instances be implicit, can correspond to evidence that the content was not already associated with another party at the time of the timestamp, or more commonly, a lack of evidence that the document already existed. In various embodiments, the evidence can include an assertion by a trusted entity that the trusted entity is not aware of the existence of the document prior to the date of the timestamp. The assertion can be supported by a performance of automated searches for the document or portions thereof. In many embodiments, searches can be verbatim searches for the document. In several embodiments, searches can be conducted among previously timestamped documents or already public documents. Searches can be performed using traditional search engine technologies, and/or can use artifact databases in which artifacts and artifact portions are recorded.

In various embodiments, machine learning (ML) and/or artificial intelligence (AI) systems can be used to detect duplicate and similar content. In various embodiments, an assessment of similarity of two items is generated based on statistical methods that use weights selected using ML methods. The weights may be used in AI assessments of originality, where the assessment generates one or more scores, such scores including cumulative trust scores related to similarities between two or more sources. In several embodiments, methods can use writing style recognition to determine the author when two pieces of content are similar; but claimed to be from two different creators. Similar techniques involving generative adversarial network (GAN) can be used to compare two audio streams. Comparing two audio streams using generative adversarial networks is described in the co-pending U.S. Provisional Patent Application No. 63/220,641 filed Jul. 12, 2021, titled "Tokenization and Quantification of Creative Content Elements" by Ajay Kapur, Madhu Vijayan, Markus Jakobsson and Stephen C. Gerber, which is incorporated by reference in its entirety. Machine learning tools can be used to provide an objective approach to determining levels of similarity between two pieces of content. Using machine learning tools to provide an objective approach to determining levels of similarity between two pieces of content is disclosed in the 2017 publication titled "Determining Song Similarity using Deep Unsupervised Learning" by Brad Ross and Prasanna Ramakrishnan, which is incorporated by reference in its entirety. While the examples above focus on music, the methods are understood to apply to all types of content including paintings, podcasts, novels, articles, etc.

In many embodiments, users can create artifact origination tokens for legacy content. Legacy content can correspond to paintings, compositions, books, software and/or other content. Legacy content can include artifacts that have been made public without any collection of timing information (e.g., an artifact created before deployment of a system for collection of timing information). In several embodiments, a claimant can assert ownership of an artifact based on assertions. In some embodiments, ownership of an artifact can be ownership of a physical artifact and/or a digital representation of the artifact. In several embodiments, the assertions can be generated by one or more verifiers. The verifiers can generate certification tokens. The certification tokens and/or the assertions can describe when the assertions were created, the process of ownership determination, trust credentials of the verifiers, and/or associated public keys controlled by the verifiers. In a number of embodiments, the public keys can be certified by a certification authority. Certifier certificates can be generated when verifier public keys are certified by certification authorities. In several embodiments, verifiers can use private keys associated with public keys to generate digital signatures on at least portions of assertions. In certain embodiments, digitally signed assertions and associated certifier certificates can make up artifact origination tokens. Artifact origination tokens can include multiple assertions and associated data. In many embodiments, artifact origination tokens can include conditional rewards for any bounty hunter that is successful in proving one or more assertions of the artifact origination tokens are wrong.

In many embodiments, when artifact origination tokens are generated, associated data can be compared to artifact databases. Comparing artifact origination tokens to artifact databases can be a verification of origination times associated with the artifact origination tokens. The artifact databases can include data associated with previously recorded artifact origination tokens, artifacts associated with previously recorded artifact origination tokens, and/or known artifacts not associated with artifact origination tokens. Artifact databases can be distributed (e.g., maintained as distributed storage, a blockchain, or a combination thereof), and/or privately maintained, (e.g., by the entity generating the artifact origination token). When no match is found an no match indicator can be specified in an artifact origination token. When a partial match is found, the partial match can be further investigated by using an algorithm to determine whether an artifact is a derived work. When further investigation results in an artifact being determined to be original, data relating to the further investigation and/or its results can be specified in an artifact origination token.

In multiple embodiments, processes can determine matches and perform investigations based on a dispute. Disputes can be initiated by entities. In some embodiments, dispute-driven verifications can be performed in addition to, or instead of, verifications automatically performed as part of the generation of an artifact origination token (e.g., as described above). In several embodiments, an initial verification is performed as part of the generation of an artifact origination token. In many embodiments, dispute-driven verifications can be performed in response to a dispute. Dispute-driven verifications can be performed differently than initial verifications.

In various embodiments, initial verifications can be fully automated or use only limited human input for the assessment of originality artifacts. Dispute-driven verifications can include greater human involvement (as compared to initial verifications) in the assessment of originality of artifacts.

In certain embodiments, verifications can include comparing first certainty scores and first timestamps associated with first artifact origination tokens to second certainty scores and second timestamps associated with second artifact origination tokens. Verifications can be performed based on a set of tie-breaking configuration data. For example, one tie-breaking situation may involve an older timestamp with a very low certainty score and a later timestamp with a very high certainty score, tie-breaking configuration data can specify when to give priority to one over the other using a mathematical formula based on the times of the timestamps and the certainty scores. In several embodiments, human-adjudicated determinations can determine whether an environment is likely to have been compromised (e.g., using malware) resulting in forged timestamps.

In several embodiments, the validity of a timestamps can be determined based on a process Determining the validity of a timestamp can be based on types of operating systems, types of gateways, types of other software, types of TEE or DRM support, and/or ease of intentional timestamp spoofing for timestamps associated with entities generating timestamps, origination assertions, or other of artifact origination token parts. Determining the validity of a timestamp can be based on information about vulnerabilities associated with types of operating systems, types of gateways, types of other software, types of TEE or DRM support at the time of the timestamping. Determining the validity of a timestamp can be based on communication logs associated with the device performing contested timestamps, indications that the device was compromised, and/or anti-virus update logs indicating whether the device had adequate protection at the time. In several embodiments, analysis can be performed on timestamping systems to determine if timestamps were compromised by malware, or otherwise.

In several embodiments, entities operating on data can be represented by tokens. Representing entities by tokens is disclosed in co-pending U.S. patent application Ser. No. 17/808,264 filed Jun. 22, 2022, titled "Systems and Methods for Token Creation and Management" by Markus Jakobsson and Stephen C. Gerber, which is incorporated by reference in its entirety. In various embodiments, entities can be represented by traditional service providers and associated servers, client-side applications, and networks.

In many embodiments, origination times and/or ownership assertions can be associated with artifacts (e.g., using an artifact origination token). Artifacts can be images or videos associated with NFTs. In several embodiments, artifacts can correspond to various types of content. Artifacts corresponding to various types of content are disclosed in U.S. Provisional Patent Application No. 63/219,864 filed Jul. 9, 2021, titled "Using Tokens in Augmented and Virtual Environments" by Markus Jakobsson and Stephen C. Gerber, which is incorporated by reference in its entirety. Artifacts can be associated with artifact origination tokens during the creation of the artifact. Methods of associating content as it is being created with ownership assertions is disclosed in U.S. Provisional Patent Application No. 63/220,641 filed Jul. 12, 2021, titled "Tokenization and Quantification of Creative Content Elements" by Ajay Kapur, Madhu Vijayan, Markus Jakobsson, and Stephen C. Gerber, which is incorporated by reference in its entirety.

In several embodiments, supporting information (e.g., evidence) can be used by certifier authorities to provide high-performance guarantees related to origin determination. Supporting information can be tokenized into an immutable ledger. The supporting information can be stored in an evidence token. The immutable ledger can be public or private. Supporting information can be stored in an encrypted format. The encryption can allow access by the certifier authority and/or the claimant. In numerous embodiments, claimants can transfer tokens to activate a contract for maintenance of the evidence token. The contract for maintaining the evidence token can have various terms, such as a length of storage term (e.g., perpetuity, 20 years).

In several embodiments, when bounty hunters find errors in assertions, or otherwise it is determined that artifact origination tokens were issued in error, then retracting entities can modify the artifact origination tokens. The retracting entities can include the claimant, the certifier authority and/or other entities. Modifications to artifact origination tokens can include retracting the artifact origination tokens, reducing the coverage of the artifact origination tokens, or retroactively modifying assertions associated with the artifact origination tokens. Announcing revocation of artifact origination tokens can be analogous to certificate revocation lists (CRLs) for traditional certificates. Revocation of artifact origination tokens can include marking up a recorded token. Methods for marking up recorded tokens are disclosed in co-pending U.S. patent application Ser. No. 17/810,085 filed Jun. 30, 2022, titled "Distributed Ledgers with Ledger Entries Containing Redactable Payloads", which is incorporated by reference in its entirety. Revocation of artifact origination tokens can include issuing an updated artifact origination token.

In various embodiments, artifact origination tokens can have a limited lifetime, after which they expire. In several embodiments the lifetime or an artifact origination token can be extended. In some embodiments, retraction of artifact origination tokens can be made by not extending the lifetime of the token. In various embodiments, the lifetime of tokens can be gradually extended, (e.g., every day), by having a hash preimage from a hash chain published each day. Methods for using a hash preimage from a hash chain is disclosed, for example, in the 2020 paper titled "Verified Security of BLT Signature Scheme" by Denis Firsov, Ahto Buldas, Ahto Truu and Risto Laanoja, which is incorporated by reference.

While specific systems and components for artifact origination tokens are described above, any of a variety of systems and components can be utilized for artifact origination tokens as appropriate to the requirements of specific applications. In certain embodiments components can be arranged in any order or sequence not limited to the order and sequence shown and described. In a number of embodiments, some of the above components may executed or perform processes substantially simultaneously where appropriate or in parallel to reduce latency and processing times. In some embodiments, one or more of the above components may be omitted. Although the above embodiments of the invention are described in reference to artifact origination tokens the techniques disclosed herein may be used in any of the rich media systems, permissioned blockchains, cryptographic systems, tokenization of content, and artifact origination assessments, artifact origination tokens, and other systems and processes discussed herein.

Figure 20:
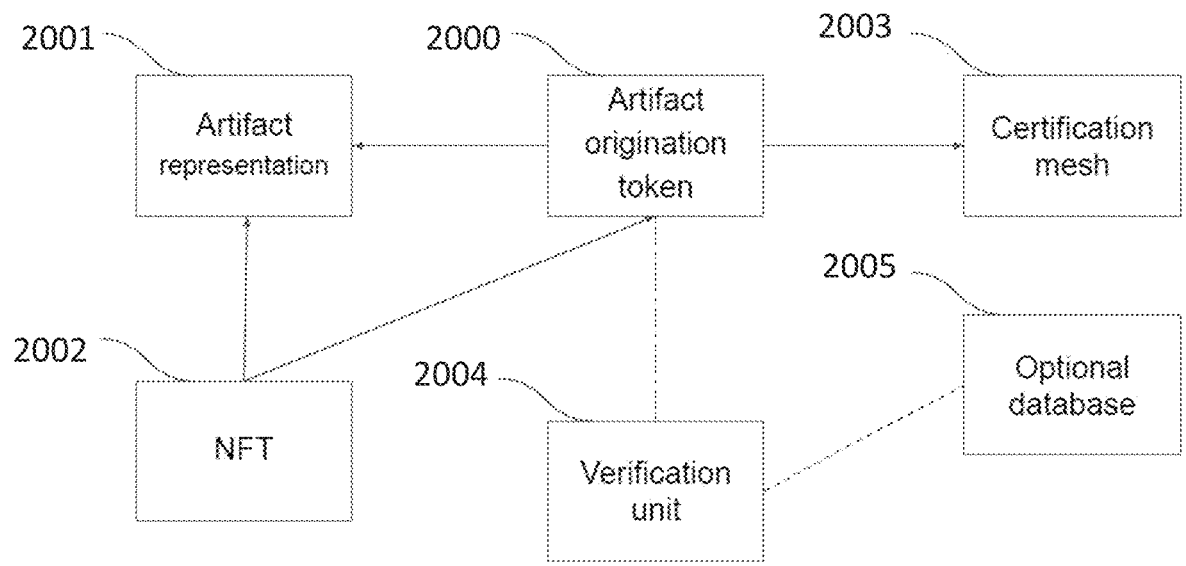
FIG. 20 conceptually illustrates a system for using an artifact origination token to assert the origination and/or ownership of an associated artifact.

In various embodiments, artifact origination tokens can be used to assert the origination and/or ownership of an associated artifact. A system for using an artifact origination token to assert the origination and/or ownership of an associated artifact is conceptually illustrated in FIG. 20. An artifact origination token 2000 can be used to assert the origination and/or ownership, of an associated artifact, the associated artifact indicated by an artifact representation 2001. An NFT 2002 can refer to at least one of artifact representation 2001 and/or artifact origination token 1900. The artifact origination token 1900 can refer to the artifact representation 2001. The artifact origination token 1900 can be supported by certification mesh 2003. Artifact origination token 1900 can be verified by verification unit 2004. Verification unit 2004 can access artifact database 2005. Artifact databases can include artifacts, artifact origination tokens and other data helpful to perform verifications.

While specific systems and components for using an artifact origination token to assert the origination and/or ownership of an associated artifact are described above, any of a variety of systems and components can be utilized for using an artifact origination token to assert the origination and/or ownership of an associated artifact as appropriate to the requirements of specific applications. In certain embodiments components can be arranged in any order or sequence not limited to the order and sequence shown and described. In a number of embodiments, some of the above components may executed or perform processes substantially simultaneously where appropriate or in parallel to reduce latency and processing times. In some embodiments, one or more of the above components may be omitted. Although the above embodiments of the invention are described in reference to using an artifact origination token to assert the origination and/or ownership of an associated artifact the techniques disclosed herein may be used in any of the rich media systems, permissioned blockchains, cryptographic systems, tokenization of content, and artifact origination assessments, artifact origination tokens, and other systems and processes discussed herein.

Figure 21:
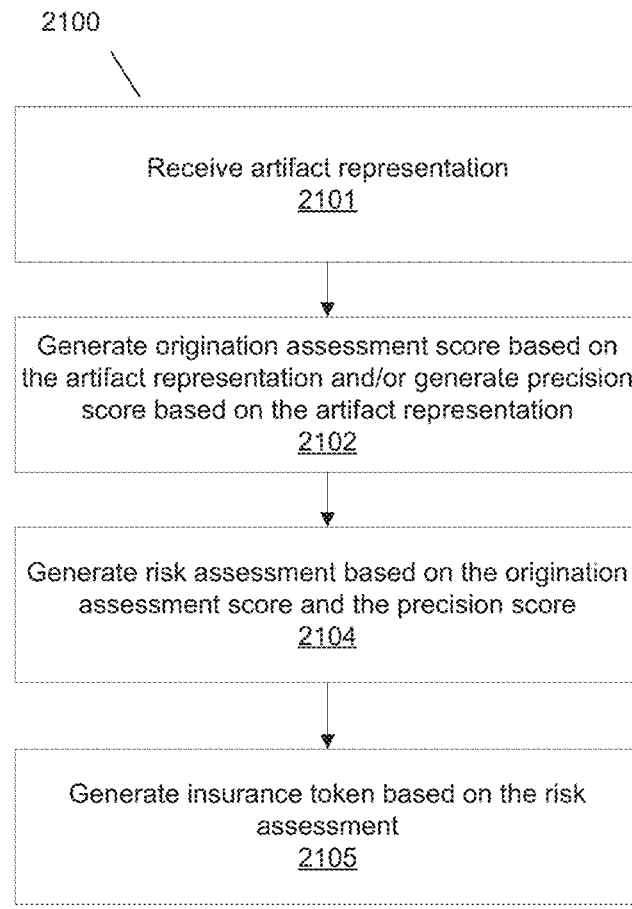
FIG. 21 conceptually illustrates an example process for generating an insurance token based on a received artifact representation.

In several embodiment, processes can be used to generate insurance tokens based on a received artifact representation. An example process for generating an insurance token based on a received artifact representation is conceptually illustrated in FIG. 21. In various embodiments, process for generating insurance tokens based on received artifact representations can be executed by an authority (e.g., a certifier authority). The process 2100 can receive (2101) an artifact representation. The artifact representation can be claimed as an original work by the submitted and can be accompanied by an origination timestamp. Process 2100 generates (2102) an origination assessment score and a precision score based on the artifact representation. Based on the origination assessment score and the precision score, the process 2100 generates (2104) a risk assessment. Based on the risk assessment, process 2100 generates (2105) an insurance token. In various embodiments, based on an evaluation of a risk assessment an insurance token can be withheld. Artifact representations can include a content file, submitting entity credentials (e.g., public key), and/or descriptive information associated with the content file. In various embodiments, artifact representations can include image files (e.g., .jpg image files). The issuance of the insurance token can coincide with a generation of an artifact origination token. An insurance cost can be included in a fee required to mint an artifact origination token. In several embodiments, an artifact origination token may be created when the origination assessment score and/or the precision scores exceed a threshold.

Origination assessment scores in accordance with numerous embodiments of the invention can be generated based on a content file, metadata associated with a content file, and/or other relevant data (e.g., information about systems used for generating a content file). An origination assessment score can be a score out of 100. In some embodiments, the origination assessment score can be based on a reputation associated with a received public key associated with the artifact representation.

In several embodiments, precision scores can be generated. Precision scores can indicate a likelihood that content associated with an artifact representation is a forgery. Generating precisions scores can include searching public records for an exact match to the content, and/or detecting manipulations of the content.

In many embodiments, risk assessments can determine the risk of a fraudulent artifact representation based upon the origination assessment score and the precision score. Based on the risk assessment, an authority can issue an insurance token. The insurance token can be an authority's commitment to insure the artifact representation as being original. The insurance token can bind the authority to a bounty hunter fee in the event that the artifact representation is a forgery.

In several embodiments, an artifact may be a derivative work of one or more related artifacts. An example of a derivative work can be a collaborative creation of artifacts based on other artifacts. A technique for collaborative creation of artifacts is disclosed in the co-pending U.S. Provisional Patent Application No. 63/220,641 filed Jul. 12, 2021, titled "Tokenization and Quantification of Creative Content Elements," by Ajay Kapur, Madhu Vijayan, Markus Jakobsson and Stephen C. Gerber, which is incorporated by reference in its entirety, In various embodiments, each element of a composite artifact can be associated with element originators. The composite artifact can be associated with composite originators. Composite originators can be the union of the element originators or a subset of the element originators these. Originator can refer to all the entities that collaborated in the creation of an artifact and/or or all the entities with which ownership rights are associated. In several embodiments, ownership rights can be augmented using smart contracts. Smart contracts can be expressed by contract tokens associated with a given artifact. The artifact and/or contract tokens can be expressed as meta-data tokens and/or as content tokens.

In various embodiments, derivative works can be performed without mutual approval of the originators. In various embodiments, service providers can parse or otherwise scrutinize artifacts to determine at least one element that is an already owned artifact. Determining elements that are already owned artifacts can be based on matching aspects or segments of the artifact to records in an artifact database. Artifact databases can have records including signatures associated with known artifacts, along with identifiers of known artifact. In various embodiments, signature associated with artifacts can be text segments, FFTs of musical compositions, and/or templates used by machine learning components to match video sequences. Based on identifying components of an artifact, service providers can indicate the extent to which submitted artifacts overlap with identified known artifacts. The indication can be an assessed novelty score. In various embodiments, the assessed novelty score can be determined based on the entropy, within some frequency band, of the submitted artifact that is not attributed to one or more of the identified known artifacts from which the submitted artifact is derived.

In several embodiment, based on assessed novelty scores and/or on known policies associated with originators or owners of the identified known artifacts, a determination can be made. The determination can classify the submitted artifact into a categories such as "not original", "appears original", and "uncertain". In several embodiments, classifications can be based on known trends to copy content of the types (e.g., audio, video, image, text) that have been identified. When the classification is "appears original", a certification can be produced. When the classification is "not original", then a certification is rejected, a fee can be requested for further scrutiny, and/or more time is required for alternate originals to become public such as images or articles of a very recent event whose release may be imminent. When the classification is "uncertain", a more in-depth classification effort can be performed (e.g., by a human expert, by a second service provider, etc.). Based on the outcome of a second classification, a certification can be produced.

In various embodiments, novelty assessments can be near-instantaneous, such as when there is a clear match between an artifact and an item in a database. In some embodiments, novelty assessments can take a day or two, during which in-depth searches and algorithmic processing is performed. In instances where human expert review is necessary, the duration may be yet longer.

In several embodiments, tentative assessments can be issued. Tentative assessments can be associated with reduced precision scores, and/or setting of large awards for bounty hunters. In many embodiments, evaluation of artifact metadata, enables authorities to resolve situations where time to publish, or time to mint, is a critical factor. In various embodiments the system can use configuration parameters to adjust required levels of differences between content to avoid rejecting certification. In various embodiments, authorities can to delay issuance by a period of time. Delaying issuance can be beneficial in the event a 3rd-party has stolen the image and submitted the image for origin determination prior to the legitimate submission or legitimate public publication.

In various embodiments, classifications can be expressed as one or more scores. An origination assessment score can indicate a likelihood that the artifact origination is as asserted. For example, if an origination assessment score is 1000 out 1000 that can indicate an extremely high likelihood that the artifact origination is as asserted. An origination assessment score of 10 can indicate that the origination is likely not as asserted. A precision score can indicate the precision of the classification. For example, if the precision score is 100 out of 100, that indicates very low error expectation, while a second score of 15 suggests a greater possible error. In several embodiments, the precisions score corresponds to a precision of the origination assessment score. For example, when the origination assessment score is 150 and the precision score is 95, that is an assertion that the system has high precision to state that the origination claimed is not well supported. In another example, when the origination assessment score is 780 and the precision score is 68, that means that the origination is very likely as claimed but there is a larger error range for the assessment than where the precisions score was 95. In various embodiments, when the precision score is low, a more in-depth assessment can improve the precision score. The more in-depth assessment can include paying for an expert assessment as opposed to only using an automated assessment.

In several embodiments, artifact origination scores can be based on how an artifact was created. In several embodiments, it is recorded, on a per-action level, how an artifact was created. As an illustrative example, consider on one hand artifact A, which is a text. It was copied and pasted from another document, or uploaded to Google™ documents. On the other hand, consider artifact B, which is typed, character by character, sometimes with typos and misspellings, and with multiple revisions over time, the timing of each recorded. The speed and rhythm by which the keyboard keys were struck can be recorded or characterized. The biometric verifications used when a user comes back after a break to log in can be documented. (e.g., hashed or logs recorded), assessments from secure platforms such as the biometrics verification unit of a laptop can be incorporated into an assessment of how likely it is that the document creator is the corresponding person. Here, document B will receive a higher score than document A will regarding the proof of human creation. However, a copycat that retypes the content of an already published book, thereby generating artifact C, could exhibit a pattern that on the surface appears similar to that of artifact B. Machine learning methods are well suited for distinguishing these three generation patterns from each other, though, and to generate classifications and assessments. The manner in which an artifact is produced is therefore one potential component used or its assessment of origination. The aspects surrounding the capture of content are often considered metadata. The revision history of a Google™ document is effectively metadata. As is the data that coexists within the image file of a photograph captured by recent technology digital cameras. The metadata from a camera image is another example of data that an authority or service provider can utilize to determine likelihood of origin. An image with timestamp, date, GPS coordinates, camera settings, file name or number, and even camera serialization are all expert witnesses to back up the claims of the claimant. This same metadata is an effective tool for reducing risk of the authority or service provider making a mistake, which reduces costs for all those involved. Assessments can be made using rule-based components, machine learning components, artificial intelligence components, or combinations thereof.

In several embodiments, artifact origination tokens can be associated with insurance. The insurance associated with an artifact origination token can correspond to a cost of issuance of the artifact origination token. In several embodiments, costs of insurance can depend on origination assessment scores, precision scores, and the willingness of a claimant to post a bounty hunter reward. Insurance policies can vary based on the origination assessment scores, precision scores, and the willingness of a claimant to post a bounty hunter reward. In various embodiments, when a bounty hunter finds that an artifact origination token is wrong, within a set time, such as two weeks from issuance, this may result in the automated cancellation of the insurance. Potential buyer can assess the risks associated with acquiring a license, such as buying an NFT, based on the presence of an insurance and the terms associated with the insurance, as well as the origination assessment score and the precision score associated with the underlying artifact. The potential buyer can also determine risk based on the strength of certification meshes and recommendation meshes associated with the artifact. Determining risks based on the strength of certification meshes and recommendation meshes are disclosed in co-pending U.S. patent application Ser. No. 17/810,741 filed Jul. 5, 2022, titled "Systems and Method for Providing Security Against Deception and Abuse in Distributed and Tokenized Environments", which is incorporated by reference. In various embodiments, insurance can be purchased by an originator of an NFT, by a current owner of an NFT, and, as part of the acquisition process, by a party that is acquiring an NFT. The use of insurance is not limited to NFTs, but also apply to any type of artifact, independently of its licensing structure.

In various embodiments, assessing the novelty of an artifact can take the form of comparing the artifact with known, recorded objects. In multiple embodiments, assessing the novelty of an artifact can rely on receiving assertions from trusted entities about the novelty of an artifact. In some embodiments, an assertion of artifact novelty can take the form of an assurance that the artifact existed at a given point in time. In various embodiments, assertions can indicate whether artifacts are novel or not.

In several embodiments, determinations of novelty can take place at a time after the creation of the artifact origination token. In some embodiments, the determinations of novelty can be in the form of an adjudication performed later on. In a number of embodiments, bounty hunting attempts, successes, and/or partial successes can be associated with an artifact and/or an artifact origination token. In several embodiments, bounty hunters can be required to checkout material before receiving in-depth details about artifact backgrounds, where such details may be helpful to the bounty hunter. In many embodiments, resolving tiebreaking situations where two or more bounty hunters produce evidence within a very short time frame relative to each other can be performed based on assessing which bounty hunter performed the checkout first. In many embodiments, there can be limits of how many checkouts one bounty hunter may have at any time. This can avoid bounty hunters keeping all artifacts always checked out. In several embodiments, a bounty hunter finding a partial match or a partial solution to a challenge can be given partial credit (e.g., a portion of a posted bounty hunter reward). The partial solution can be made public for other bounty hunters to use. A partial solution is one example of an artifact-specific detail that is desirable to check out.

While specific processes for generating an insurance token based on a received artifact representation are described above, any of a variety of processes can be utilized for generating an insurance token based on a received artifact representation as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to generating an insurance token based on a received artifact representation the techniques disclosed herein may be used in any of the rich media systems, permissioned blockchains, cryptographic systems, tokenization of content, and artifact origination assessments, artifact origination tokens, and other systems and processes discussed herein.

Tokenization and Promotion of Authored Content

Systems and methods in accordance with some embodiments of the invention may be directed to actions including (but not limited to) generating digital content, minting content into NFTs, distributing and licensing the NFTs, consuming the content, storing the NFTs, advertising and recommending content, and/or communicating between the artists, fans, influencers, reviewers, and anyone involved in the market. Digital content may include, but is not limited to purely digital content such as mastered songs, podcasts, movies, and/or digital content based upon real-world content (e.g., painted portraits). For example, systems and methods in accordance with a number of embodiments of the invention may include platforms that allow musicians to record and/or upload melodies, chord structures, bass lines, musical licks, and/or sound effects (which this application may collectively refer to as "music memes"). Platforms may have, but are not limited to, the ability to selectively share recorded and/or uploaded content with one or more users (such as fans); obtain feedback (such as whether users rank it five stars). In several embodiments, platforms may additionally or alternatively obtain comparative metrics including (but not limited to) how many times various users play a music meme, for how many days they play it, whether the music meme was forwarded to anybody, how many people the music meme was forwarded to, and who the music meme was forwarded to.

Systems in accordance with various embodiments of the invention may tokenize moments of music, and/or any other digital content. Tokenization may include, but is not limited to, capturing data about the artist(s) that created a moment, time stamping, licensing terms, and/or other pertinent information in an effort to declare initial ownership of the content and to set the beginning of a provenance chain for the content. Ownership NFTs may form collections of data, including, but not limited to, content and data describing the content.

In accordance with some embodiments of the invention, data describing content may, include, but is not limited to, the conditions for subsequent tokenization and use. One example of such a condition may be that the content can be rendered (e.g., music content can be played) on devices of a pre-specified type (e.g., a speaker having some minimum certification level and/or security level, such as having a version not earlier than 4.0 of the Android operating system). In accordance with a number of embodiments of the invention, conditions may also include requirements to signal back, from the rendering device, metadata relating to the use of the token. Example metadata may include information on how many times the content is rendered and/or forwarded to others in a given day. Another example condition may be to restrict the content to personal use only and disallow commercial uses. Tokens can be derived from other NFTs, e.g., as described in co-pending application U.S. patent application Ser. No. 17/808,264, entitled "Systems and Methods for Token Creation and Management," filed Jun. 22, 2022, the disclosure of which is incorporated by reference herein in its entirety.

In accordance with certain embodiments of the invention, NFTs belonging to specific owners may form the basis for provenance tracking for the content. In doing so, the NFTs may generate further NFTs through public and private key combinations. In accordance with a number of embodiments, the owners' NFTs may present limits on the formation of subsequent NFTs, such as the inability to use the content in political gatherings, and/or in commercial environments. For example, musicians, artists, and general content creators may have full control to set what rights other users who view their music meme can do with it. Musicians may choose to allow users to collaborate with them, and add additional harmonic phrases to the music meme. Artists may subsequently license the music meme to record labels by minting new NFTs, based upon the NFT of the owner and also corresponding to the music meme. Once the new NFT is created, the new NFT may be equipped, with newly enabled rights that correspond to the record label. Methods of enabling new rights may depend upon the ability of the NFT minting individual, and/or organization, to prove possession of a secret key associated with the initially minted NFT.

Artists may license use of their content to broad fan bases, utilizing minted tokens, social media, and/or mobile applications. Artists may develop content such as, but not limited to, paintings, podcasts, audio and/or video files, songs, and collections of songs. The artists may mint NFTs from the developed content, and posts the NFT on accessible platforms, such as a distributed blockchain network. The NFT may include and/or reference the generated content and/or optional access right descriptions and other policies. The artists, seeking to advertise and/or monetize their new content, can release social media posts referencing the NFTs. Once, their followers see the post, the followers may agree to take the corresponding licenses. License fees may involve, but are not limited to, transactions with cryptocurrency by smart contracts. Followers might also post on social media allowing additional people to see the posts and agree to take the licenses (e.g., influencers). The artists may receive information about the interactions between the users and the content. In several embodiments, interactions may be metered by executable elements associated with and/or indicated by the NFTs. Example information may relate, but are not limited to, the number of times the content was played, at what equipment, at what volume, by what users (e.g., identified by handles, demographic profiles, age and gender, etc.). Additionally or alternatively, when followers post about the NFTs on social media over the mobile applications, the artists may receive feedback.

For example, Alice's music band may get together and develops a song, and decides to offer it online. The song may be offered online for free in the hopes of the song going viral and building their reputation. The song may alternatively be offered for personal use for a small fee (e.g., $1.00). with a minted NFT and subsequent availability on a blockchain and/or other networks. To advertise the song, they can post on social media as an organized band and individually as band members. Their followers may see the post and some agree to the license and/or license fee. The followers may listen to the music and either lose interest and/or post on social media. Bob, a friend and follower of Alice's, may happen to see the post and really like the song. Bob can post a strong preference for the music on his favorite social media app. Alice may then see his feedback. Bob's friend Carol may also see his post and also agree to the license and/or fee.

In various embodiments, artists may additionally or alternatively license the use of their content by incorporating integrated advertising and promotional outreach systems. Artists can develop content such as, but not limited to, paintings, podcasts, audio and/or video file, songs, and collections of songs. The artists may mint NFTs, and post them NFT on accessible platforms (e.g., a distributed blockchain network). The artists, seeking to monetize their new content, may advertise the content NFTs through integrated mobile applications. The mobile applications can also enable consumption of the content by the mobile device's owner. The owners of the mobile devices may view the advertisements and/or recommendations with the mobile application and accepts the NFTs in exchange for the fee. The device owners may freely consume the content. Owners may also choose to interact directly with the artists through direct messaging capabilities in the mobile applications and/or they may choose to post on integrated social media channels within the application. By direct message and/or through the integrated social media channel, the artists can get their feedback. The social media posts may also inspire other device owners to view and accept the NFT allowing for additional advertisement.

For example, Alice's music band may get together again, develop a new song, decide to offer it for personal use for $1.00 with a minted NFT, and subsequently make an NFT posting. The NFT posting may occur through a mobile application system within integrated NFT downloading, advertising, and/or promotion. Alice can advertise the song within the mobile application. Those utilizing the application may see the advertisement and some agree to the license fee.

In certain embodiments, content owners might produce free-to-use NFTs for content they wish to disseminate, but not directly monetize. An example might be a music meme, and/or a short clip of a song, to elicit feedback from a fan base and/or another artist. In this example, the artists may copyright their original content and time stamp the content in immutable public ledgers in order to prevent abuse. While access to the content may not require payment, access may require that the accessors agree to some terms of service (ToS). Agreement to ToS may be seen as corresponding to having a membership in a group and make access conditional on membership. This can be done using an access token, which in turn may use an access control list (ACL), as described in co-pending application U.S. patent application Ser. No. 17/808,264, entitled "Systems and Methods for Token Creation and Management," filed Jun. 22, 2022, the disclosure of which is incorporated by reference herein in its entirety. Membership may alternatively or additionally use a group signature. To represent a group, constructions such as those described in the 2004 publication "Signature Schemes and Anonymous Credentials from Bilinear Maps", by Camenisch and Lysyanskaya, can be used; this publication is incorporated by reference in its entirety.

Content owners may impose multiple requirements on how content may be used. For example, content owners may require that content be used only for rendering and not for integration in other content elements and/or NFTs; not for-profit; only to be rendered on a device that meets and/or exceeds some security standards, e.g., related to DRM use and/or TEE support. In some embodiments, content owners might produce generic personal-use content NFTs. Generic personal-use content NFTs in accordance with various embodiments of the invention may have licensees issued from NFT types that may enable fans to listen to enjoy content (e.g., songs) for license fees. In a number of embodiments, digital rights management keys may be present with NFTs and/or the content, in order to further protect the content from abuse as determined by the owner and the terms of use. Artists may choose to issue single keys, and/or mint NFTs for every licensee with different keys to prevent abuse. The ability for artists to directly publish content into their social media channels may enable the artists to collect token license revenue directly and/or indirectly from consumers, which may eliminate an intermediation need. In a similar manner, the artists, able to directly publish content to the social media channels may expand their early fan base without having to convince record label executives of their future worth. The ability for artists to be more self-sufficient may be enormously beneficial to young artists.

In various embodiments, artists may post content they wish other artists would adopt and incorporate into their content. Artists may develop content, mint NFTs, and posts the NFTs on accessible platforms (such as a distributed blockchain network). The artists may, seeking in this example to monetize their new content, still advertise the content NFT through the earlier mentioned integrated mobile application. The integrated mobile application may then enable consumption and adoption of the content by the other owners (collaborating artists). The collaborating artists may view the advertisements and/or recommendations with the mobile application. The collaborating artists may choose to accept the NFT in exchange for a fee. The fee may involve, but is not limited to pre-paid royalties and/or a commitment to provide royalties upon commercialization of the collaborating artists' content. The collaborating artists may then consume the content. The initial artists may also obtain feedback and/or royalties depending on whether there is an acceptance.

For example, David may be a professional drummer between gigs and/or looking for a new band. David can continue developing new beat mixes that feature his percussion talents. David may be the initial artist, with a new beat mix he wants to offer to other bands, songwriters, movie producers, and/or whomever would be interested in adopting his content for use. David can develop his beat mix, mint a corresponding NFT, and post the NFT within an integrated mobile application. In doing so, David can pay to have the content NFT advertised. Edward, the collaborating artist, may see the advertisement for a beat mix that he needs and accept the NFT. Edward can listen to the content and may adopt the beats mix into his own content 408. Edward can then release his own content. David may end up getting both feedback and a royalty percentage of David's release. Various aspects of this example may be rearranged in practice. For instance, David's advertisement might include the ability to listen to the beats mix without having to agree to the royalty license until Edward decides to adopt the content. Additionally, Edward's release of the content might be on the same platform, many platforms, and/or not this platform at all. The royalty payment obligation for Edward and the complete terms of the NFT license may still remain constant. Additionally or alternatively, Edward might have approached David with a request for a new beat mix, whereby David develops the mix, mints the NFT, and then directly enables Edward to accept the NFT and release his content.

In accordance with many embodiments of the invention, when users accept NFT terms for digital items such as, but not limited to, songs and/or anime character artworks, the licenses can be placed into personal user media wallets. Upon adding licenses to personal user media wallets, the corresponding content (i.e., the digital items) may then be available on the device with the wallet. In accordance with various embodiments, the digital items may be stored off-device and/or locally. Alternatively or additionally, content may be consumed utilizing other connected devices, such as a remote home audio speaker system for music. For example, Bob, who purchased an NFT of Alice's band may place the NFT license in a mobile wallet on his personal mobile phone, as disclosed in U.S. Pat. No. 11,348,099, entitled "Systems and Methods for Implementing Blockchain-Based Content Engagement Platforms Utilizing Media Wallets," issued May 31, 2022, the disclosure of which is incorporated by reference in its entirety. Bob's NFT may allow him to play the song an unlimited number of times on his personal device and also consume the content on a variety of his personal devices. In playing the song, Bob may still be subject to the agreement to not use the song for commercial purposes, such as background music for a radio commercial.

In accordance with numerous embodiments of the invention, integrated mobile applications may also include the ability to capture artwork created by artists. For instance, integrated mobile may have sketchpads for artists to draw creations including, but not limited to, caricatures and/or fictional characters. The integrated mobile applications may have image sensors with which to capture painted and photographed images. In accordance with some embodiments, integrated mobile applications may have cameras and/or microphones with which to capture video and sound. They may have audio recording capabilities and/or a connected capability with which to capture and master songs. Artists may interact with the integrated mobile applications by enabling content capture functions on personal devices. Once captured, content may be mixed, mastered, and/or edited by artists. Finished items may signify that the artists can mint NFTs for the developed content. For example, Alice's drummer Frank may have a new drum solo that he developed. Frank can set up his mobile phone with an integrated media wallet and prepare to capture the audio content. Once captured, Frank can edit the audio clip and develop the final content. Frank may also decide to offer the content to a movie producer by minting an NFT. Necessary steps of content creation and/or modification may be performed within one or more applications on the mobile devices.

Content owners may transfer ownership rights through NFTs. In several embodiments, content owners may produce contract NFTs, whereby owners may license sets of rights to third parties, such as a record label. For example, a musician might have a pre-existing contract with a record label, and the work they produce would be part of a larger collection of music that is advertised. The record label might sell the collection as a whole for streaming as a record-label-created NFT. In such a case, each artist may have a smart contract that reflects their ownership rights in the exploitation of their work in the broader record label ecosystem.

Alternatively or additionally, transactions may be performed through transfer NFTs. For instance, transfer NFTs may be used when artists agree to allow third parties (e.g., record labels) to promote, distribute, track, and provide royalty streams, and/or prepaid one-time royalty payment in exchange for some or all of the ownership rights to particular content. The ability to prove original ownership for particular content items and/or provide NFT provenance chains as evidence of license rights may help artists control their ownership options when market forces are being disintermediated.

In this application, musicians may be referred to as artists and record labels as promoters and distributors. however, systems in accordance with many embodiments of the invention can apply to distributors of all kinds and artists of all kinds, including, but not limited to actors, novelists, script authors, painters, tattoo artists, jewelry designers, graphic designers, graffiti artists, and/or other creative content creators.

In accordance with various embodiments of the invention, content owners may produce demonstration NFTs. Using demonstration NFTs, owners may license other artists to collaborate with given content. When licensees have permission to collaborate with specific music memes, a smart contract may be created. In several embodiments smart contracts can specify conditions of use. In some embodiments, conditions of use can include how the content elements may be incorporated with each other; how they content elements can be played back, and other conditions of use. In such case, agreement specifics may be recorded in ledgers and/or other data storage, as disclosed in U.S. patent application Ser. No. 17/806,728, entitled "Systems and Methods for Encrypting and Controlling Access to Encrypted Data Based Upon Immutable Ledgers," filed Jun. 13, 2022, the disclosure of which is incorporated by reference herein in its entirety.

When content is made available, the content's provenance may also be recorded, and accesses logged. Time-stamping methods, such as those disclosed in U.S. patent application Ser. No. 17/806,725, entitled "Grinding Resistant Cryptographic Systems and Cryptographic Systems Based on Certified Miners," filed Jun. 13, 2022, the disclosure of which is incorporated by reference herein in its entirety, may be used to determine when two and/or more potentially related content elements are made public. Using similarity-determining methods, the extent to which two or more content elements are similar may be determined. For example, if user A develops a song with a melody with a hip-hop beat, and user B has the same melody with a rock beat, the system can flag these two songs to determine if in fact user C had created that melody previously, and if ownership needs to be policed. The comparison of beats can be performed through methods including but not limited to FFT analysis, metadata analysis, and/or machine learning. For systems in accordance with many embodiments of the invention, when ownership conflicts occur between multiple parties claiming to have originated content, proof of exceeding a similarity threshold may be used to automatically adjudicate the conflicts and/or provide evidence used by third parties. Additionally or alternatively, the systems can provide evidence of whether one or more of the parties have and/or are likely to have been exposed to content from the other(s) prior to the claimed times of content creation. Exposure can be determined through applying audio fingerprinting technology, analyzing the key elements of the frequency domain over multiple windows of time, and storing these features in a hash table for quick look-ups for similarity comparison. In some instances, anti-abuse features can be combined with the privacy-enhancing features provided by the systems. In such cases, sensitive entries in personal access logs may not publicly accessible and only be accessed by trusted parties, and/or by permission from the associated users.

In accordance with a number of embodiments of the invention several systems and methods may be applied to determine levels of similarity between multiple pieces of content. For example, when evaluating two supposedly identical audio tracks, an inversion of one of the tracks followed by a mix and/or addition of the two tracks can result in a complete cancellation of all audio in the mixed track. Two identical tracks can then sum to no audio detected. Metadata may also help identify an exact copy, such as two photographs with the exact same timestamp and GPS location contained in image metadata.

Figure 22:
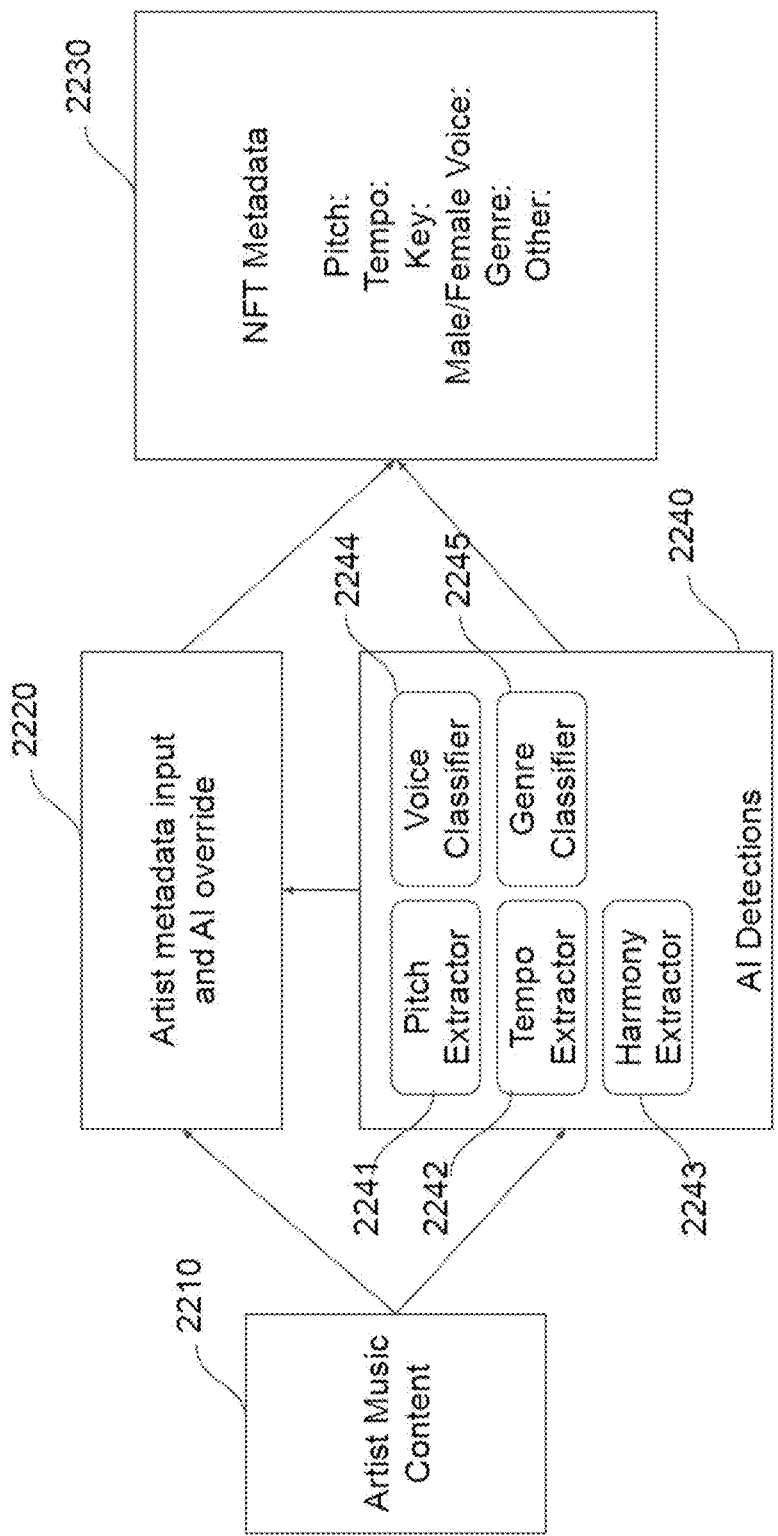
FIG. 22 conceptually illustrates a system for applying metadata to NFTs, within platforms.

An example of a system for applying metadata to NFTs within platforms operating in accordance with some embodiments of the invention, is illustrated in FIG. 22. New artist music content 2210, such as songs, may be made available to AI and/or machine learning systems that extract metadata automatically 2240. The systems may store the extracted information in an NFT 2230 and/or associated media cards and media wallets. Metadata elements might include, but are not limited to, tempo, pitch, scale, raga, gender of voice, genre, etc. Such elements may be extracted through various functions, including but not limited to a pitch extractor 2241, tempo extractor 2242, harmony extractor 2243, voice classifier 2244, and genre classifier 2245. In some embodiments, artists and/or authorized representatives can directly input metadata into the NFT and/or override the AI-produced metadata 2220. The existence of such metadata can be used for sorting, browsing and querying collections of rich media files on a platform. Using the metadata may allow creators, collectors, and users to easily find assets. For example, Bradley may have derived AI detections 2240 from the pitch extractor 2241, tempo extractor 2242, harmony extractor 2243, voice classifier 2244, and/or genre classifier 2245. Bradley may intend to apply the detections to Arthur's new song 2210. Arthur may allow Bradley's technology to deploy directly to the platform in the form of NFTs with AI-derived metadata 2230. Arthur would have no need to manually input and/or override any of the metadata elements 2220. Later, Charlie, a user of the platform, may be searching for a song with a fast tempo, a male voice like Arthur's, and a blues genre that fits well with the NFT metadata from Arthur's new song. In such cases, Charlie may be matched to Arthur's song.

An additional problem may come from music artists that reproduce lyrics, melodies, beats, even timing and volume in their own setting. The challenge in such cases may be in considering whether there is similarity between the two or more items, what the level of similarity is, and if the similarity was intentional. For example, an artist that listened to another artist a short time ago, might create a new lyric and/or melody based in part on what "stuck in their head" the day before. They may do so without even realizing they have adopted the melody in some manner. In another example, an artist might intentionally create a song with lyrics that are minimally changed from a top-ten hit.

In accordance with various embodiments of the invention, machine learning tools may provide objective approaches to determining levels of similarity between two pieces of content, such as what is disclosed in "Determining Song Similarity using Deep Unsupervised Learning" by Brad Ross and Prasanna Ramakrishnan, and which is incorporated by reference in its entirety. The examples above may focus on music; however, these methods may apply to fields including but not limited to, paintings, photos podcasts, etc. These evaluations may especially benefit from access to the provenance of items. Systems and methods in accordance with several embodiments of the invention can enable artists to create NFTs that may help provide evidence of content ownership. Evidence of ownership may be derived through public keys associated with the NFTs and/or timestamps associated with the content within the public ledger.

In accordance with some embodiments of the invention, determining high similarity between different objects, such as content expressed in NFTs, may be done through performing and comparing Fast Fourier Transforms (FFTs) of the objects. For example, applying FFTs to two songs can create frequency charts of the two songs, which can then be compared. Comparisons can be performed on a segmented-basis. In accordance with various embodiments, FFTs can also be transformed and/or normalized. For example, normalization may be used to determine when one song copies a segment from another song, but slowed down. Normalization of FFTs can be performed by scaling the songs to match principal components of the two FFTs, after which it is determined whether other frequency components are also aligned. FFTs and/or normalizations can be done rapidly for large quantities of songs. This process can also be used to compare visual elements as well as other forms of content. To compare text segments, the approach disclosed in "Self-Plagiarism in Computer Science" by Christian Collberg and Stephen G. Kobourov may be used, the disclosure for which is incorporated by reference in its entirety.

Methods in accordance with numerous embodiments of the invention may allow users to collaborate from within described systems, between social media and direct messaging applications, etc. Such collaboration techniques may enable advertising, promotion, influencer activity, likes, reviews, NFT sharing, content sharing, temporary loaning of content, and/or temporary loaning of portions of content for review. Techniques may additionally or alternatively be applied to tracking the monetization of influence through advertising and promotion with feedback to the interested parties (e.g., influencers and artists). Systems in accordance with multiple embodiments may utilize such methods while abiding by license terms, as disclosed in U.S. patent application Ser. No. 17/198,123, entitled "Managing Ownership and Access," filed Mar. 10, 2021, the disclosure of which is incorporated by reference herein in its entirety, which is incorporated by reference in its entirety.

For systems operating in accordance with several embodiments of the invention, collaboration efforts may include artist-to-artist communications, content editing, and/or content collaboration between artists working toward final product content. For example, media wallets may include applications on mobile devices capable of, but not limited to capturing, audio, video, mixing, minting NFTs, and sharing content widely and/or in a restricted manner. Artists might create, capture, and mint NFTs for new songs and then post the songs within the media wallet application to limited audiences of possible collaborators (e.g., music video producers). The artists might choose to rely upon their reputation to attract collaborators. Some artists might be willing to pay to advertise, and/or post their need for collaborators in decentralized marketplace environments, as disclosed in U.S. patent application Ser. No. 17/328,241, entitled "Privacy Preserving Matchmaking" filed May 24, 2021, the disclosure of which is incorporated by reference herein in its entirety.

In systems operating in accordance with some embodiments of the invention, a primary composer may create a music meme and multiple variants. They may upload the multiple variants, including the original, to a system and enable a selected set of users to access one or more variants. The users may be randomly assigned to one or more of the multiple versions. Alternatively or additionally, a subset of the select users may get access to all versions. All the selected users may be observed with respect to their behavior, including (but not limited to) whether they play the content, how many times, at what volume, whether they appeared to pay attention where applicable, and/or whether they forwarded content where this is allowed to by the terms associated with the uploaded content versions. Systems in accordance with various embodiments of the invention may determine preference scores for each of the selected users based on their reactions and actions. In a number of embodiments, systems may then associate the users (and their demographics, where available), with the applicable content based on the preference scores. Systems operating in accordance with certain embodiments may receive selections from the primary composers indicating how to filter preference scores (e.g., how to select and/or weigh scores based on demographics). Some of the selected users may show greater propensities to predict the preferences of the general population (e.g., by having a past response strongly correlated to the response of the public). The primary composers can select to weigh the scores of users based on this demonstrated propensity. A system in accordance with various embodiments may provide services to the primary composers based on subscriptions, membership, and/or a "per insight" charge. A number of systems may be composed of one or more NFTs with executable content, and/or other executable elements. The primary composers may modify some of the most highly ranked versions of the content (e.g., song variants) to be iteratively tested. Iterative testing may be performed with the same users and/or with other users. Systems operating in accordance with various embodiments, may receive multiple feedback indications from multiple users for multiple forms of content, and determine scores and weighted scores for these. After having selected one or more versions that are determined to be the most appreciated and/or deemed to be most appreciated by a target population, the primary composers may decide to proceed to involve collaborator composers, as described below.

Systems in accordance with various embodiments may use the data obtained from received feedback to train predictors to predict user preferences. Such systems can be used, in addition to and/or instead of the above user interactions and experiments. Systems may be applied to determine likely scores of user populations with respect to particular pieces of content and/or versions thereof. In some usage scenarios, built-in algorithmic capabilities may be used as a pre-screening of content to determine what content versions to test on live users. In a number of usage scenarios, the capabilities may be used for automated composition, where algorithms take the place of the primary composers.

When primary composers select one or more versions to use in compositions, they may associate one or more rules with the content of the one or more versions and/or enable access to the one or more versions by bidding prospective collaborator composers. The bidders may bid on collaboration and/or suggest complements to the content from the primary composers. The prospective collaborator composers can test their suggested complements analogously to how the primary composers tested their initial content and potential variants.

The one or more prospective collaborator composers can provide feedback to the primary composers. In accordance with some embodiments, feedback may include the complementing content, where the complementing content may be combined with the initial content. Additionally or alternatively, feedback may include scores and other indications of market acceptance generated by the system, as described above. In accordance with some embodiments, feedback may include suggested policies for how revenue can be shared between the providers of the feedback and the primary composer. The content included in the feedback may be protected by copyright and/or technical protection measures, just like the content from the primary composer.

In accordance with some embodiments, technical protection measures may include but are not limited to DRM policies, policies regarding execution in TEEs, encryption, and access control information as disclosed in U.S. patent application Ser. No. 17/808,264, entitled "Systems and Methods for Token Creation and Management," filed Jun. 22, 2022, the disclosure of which is incorporated by reference herein in its entirety. The primary composers can select the complementing content of one or more of the one or more prospective collaborator composers causing the original content of the primary composers to be incorporated with the selected complementing content. The incorporation can be repeated with additional prospective collaborator composers.

Once compositions have been concluded, they can be presented to one or more musicians, where the one or more musicians can perform one or more aspects of the composition and provide those, in the form of feedback as described above, to the primary composers. In many embodiments, the primary composers may remain in control of the production and/or hand over the control to another party, including but not limited to a second composer, a label, one or more artists, etc. When control is transferred, access rights may also be transferred as described in U.S. patent application Ser. No. 17/808,264, entitled "Systems and Methods for Token Creation and Management," filed Jun. 22, 2022, the disclosure of which is incorporated by reference herein in its entirety, and/or an alternative manner. The examples disclosed above may be applied to any collaborative artwork development.

For example, scriptwriters on platforms, operating in accordance with some embodiments, may develop portions of movie scripts. A scriptwriter name Alice, may have a great beginning and a stunning ending, but lack support in the middle (e.g., lacking a deep personal understanding of a given technical situation). They may upload the script, with some comments regarding the unresolved portions, and have the associated content tokenized. As scripts are tokenized, the scripts may get timestamped and the origins recorded. Upon tokenization, the scriptwriters may select one or more policies for distribution and/or access. Scriptwriters can select pre-established policies associated with NFTs. For example Alice may indicate that her script can be distributed freely, but that her pen name (which is an alias associated with the NFT including the script) must not be separated from the NFT with the content and the policies. In that example, Alice's requirement may imply that the content can only be accessed from DRM-protected environments. In several embodiments, scriptwriters can also incorporate policies stating that all access will be logged. In such cases, when anybody accesses the content, information about that person's identity and/or alias may be logged. Accordingly, only entities with certified identities and/or aliases may be allowed access, as this policy cannot otherwise be enforced. The scriptwriters may specify that content can only be accessed in this manner for a specific duration. For example, Alice may only allow access for the next three months, and/or until she updates the access policy. Scriptwriters may also require that access log information be reported on specific durations (e.g., a weekly basis).

Scriptwriters may also be able to indicate classifications and/or categories for their scripts. Scriptwriters may also indicate meta-classifications and/or meta-categories. For instance, Alice may select that her script is in the categories "suspense", "young adult", "romantic", "limited violence", "nudity optional", etc. For meta-classifications, Alice indicates the categories "not completed", "beginning complete", "ending complete", etc. She may determine who may access the content (e.g., anyone, only content producers with selected classifications and/or ratings, only those within a particular local jurisdiction where the policies might be more easily enforced, etc.). In accordance with some embodiments, preferences may be pre-set by scriptwriters for previous uploads and remain constant for later uploads.

After the uploading and configuration of policies are completed, the content can be accessible to other users. The content may be associated with scriptwriters' profiles, which may include, but is not limited to track record, ratings, and any information about previous conversions (from scripts to movies). Users accessing scripts may have access to subscribe to content of certain types, e.g., "young adult", "not completed", "romantic", and certain ranges of script writer ratings.

Based on matches between scriptwriter classifications and preference settings of other content producers (with subscriptions to content updates) one or more other prospective collaborator producers may be notified. Prospective collaborators may have access to each read abstracts provided by the scriptwriters who uploaded the content, along with corresponding classifications. Prospective collaborators may then decide whether to access the content. Their initial interest may be recorded. Alternatively or additionally aliases and/or identities may only get recorded after the prospective collaborators offer consent.

Certain scriptwriters may have suggestions for how to address issues with the content. When this occurs, the collaborators may write and tokenize the script additions as shown above with the primary scriptwriter. Upon tokenizing script additions, the NFTs with the script additions may become associated with the NFTs with the original script(s). As the NFTs with additions get uploaded, the original script writers may be notified, allowing them to determine whether to incorporate the additions. In certain embodiments, NFTs representing the combined scripts may be generated and associated with the multiple collaborating scriptwriters. In such cases, policies regarding ownership rights may get amended with policies describing the ownership rights of the writers of the script addition, their identities and/or aliases, and their selected policies.

After combined scripts are generated they may also be posted, allowing the community of users on the platform to review all the scripts, add comments, like, and dislike the stories shared. The platforms may build ranking methodologies scripts and/or individual comments, likes, and dislikes.

The above techniques may be applied to a wide variety of service providers for the script writers including story editors, dramaturgs, and character developers brought into the same ecosystem. As service providers contribute, their additions may be tracked as smart contracts. Such collaborative creation of alternative types of content can also be performed using analogous techniques as to what was described above, and which is disclosed herein.

In accordance with various embodiments, once scripts are complete, they may be moved to market preview parts of the platforms. Market previews may include searchable databases, allow users to select what scripts they would like to pursue. Market previews may also fully disclose ownership rights involved through the corresponding NFTs and/or smart contracts.

Methods in accordance with numerous embodiments of the invention may engage in advertising and recommending content within media wallets with integrated players and associated applications calling data from the wallet, as disclosed in U.S. patent application Ser. No. 17/806,728, entitled "Systems and Methods for Encrypting and Controlling Access to Encrypted Data Based Upon Immutable Ledgers," filed Jun. 13, 2022, the disclosure of which is incorporated by reference herein in its entirety. Media wallets may include physical and/or logical storage units associated with individuals, enterprises, collectives and/or other entities. Digital wallets may be associated with NFTs and other data to which the entities have access, and/or include descriptions of the types of access. Example types of access may include, but are not limited to ownership, the right to license out, ability to read an unlimited number of times, ability to read a limited number of times, ability to read a portion, ability to write, ability to use in a derived work, and combinations of these. Digital wallets, in accordance with some embodiments, can be associated with GUIs that can enable users to select content and associated actions. Example actions may include, but are not limited to rendering and/or playing content, returning borrowed content, erasing content, selling content, enabling others to use content, etc. The access to the wallet may be controlled using biometrics, passwords, PINs and/or other authentication technologies, and can be supported by the use of authentication NFTs, as disclosed in U.S. patent application Ser. No. 17/808,264, entitled "Systems and Methods for Token Creation and Management," filed Jun. 22, 2022, the disclosure of which is incorporated by reference herein in its entirety. Digital wallets can be associated, by authorized users, with one or more displays, speakers and/or other rendering units, which can be selected for playing material. Additional digital wallet uses may follow the techniques disclosed in U.S. Pat. No. 11,348,099, entitled "Systems and Methods for Implementing Blockchain-Based Content Engagement Platforms Utilizing Media Wallets," issued May 31, 2022, the disclosure of which is incorporated by reference in its entirety.

Systems and methods in accordance with some embodiments of the invention can include units that identify trends, make comparisons, and/or generate suggestions. Suggestions can indicate what types of content are most appreciated by surveyed end users, and/or indicate what types of modifications may be desirable. Methods for that identifying trends, making comparisons, and/or generating suggestions are disclosed in U.S. patent application Ser. No. 17/806,728, entitled "Systems and Methods for Encrypting and Controlling Access to Encrypted Data Based Upon Immutable Ledgers," filed Jun. 13, 2022, the disclosure of which is incorporated by reference herein in its entirety.

Systems and methods in accordance with several embodiments of the invention can be used to consume content. In various embodiments, media wallet systems can serve as repositories for individual and/or an organizations' licenses (e.g., rented, borrowed, owned, etc.). Methods for using media wallet systems as repositories for licenses are disclosed in U.S. Pat. No. 11,348,099, entitled "Systems and Methods for Implementing Blockchain-Based Content Engagement Platforms Utilizing Media Wallets," issued May 31, 2022, the disclosure of which is incorporated by reference in its entirety. In some embodiments, media wallet can include an integrated player that enables content management and/or consumption within the application and/or within other applications that are capable of calling the content from media wallets. Media wallets can enable consumption in a number of different applications, as described elsewhere herein. In certain embodiments, media wallets enable content and/or token consumption in a variety of environments such as (but not limited to) an application content player, a virtual environment, and/or an augmented environment. Using media wallets to enable content consumption in a variety of environments is disclosed in U.S. Provisional Patent Application No. 63/219,864 entitled "Using Tokens in Augmented and Virtual Environments" filed Jul. 9, 2021, which is incorporated by reference in its entirety.

Systems and methods in accordance with various embodiments of the invention can store, manage, transact, and/or consume the tokens within the media wallet. Systems and methods that can store, manage, transact, and/or consume the tokens within media wallets are disclosed in U.S. Pat. No. 11,348,099, entitled "Systems and Methods for Implementing Blockchain-Based Content Engagement Platforms Utilizing Media Wallets," issued May 31, 2022, the disclosure of which is incorporated by reference in its entirety. In a number of embodiments, media wallet applications can operate on different types of devices and/or various operating systems.

In accordance with certain embodiments of the invention, application systems can include (but are not limited to) functions such as: personal profiles that can include public and secret key creation, importation, and management; interactive marketplaces, and/or decentralized marketplaces, for browsing and/or licensing tokens in all directions including owning, renting, sharing, borrowing, etc.; inventory databases of licensed tokens, also known herein as media wallets; digital content players for displaying and sharing images, "collectible cards", videos, recordings, podcasts, movies, text documents, etc.; content creation environments that can include collaboration capabilities with other creators, optionally including layered authoring features, whereby multiple users stack on top of a work product, such as when one artist publishes a percussive mix and other vocals; digital rights management implementations; metadata management implementations; license and policy configuration systems and/or token minting interfaces; royalty management and collection capabilities; asset storage management functions including optional perpetual asset storage management capabilities; data parsing and aggregation tools for gathering and analyzing statistics on content usage; payment functions capable of working with a variety of cryptocoins, traditional currencies and/or credit facilities; integration with third-party applications such as TikTok™, Smule™, and Facebook™; social media feed capabilities; and/or direct messaging environments.

While specific systems and components for applying metadata to NFTs are described above, any of a variety of systems and components can be utilized for applying metadata to NFTs as appropriate to the requirements of specific applications. In certain embodiments, components can be arranged in any order or sequence not limited to the order and sequence shown and described. In a number of embodiments, some of the above components may executed or perform processes substantially simultaneously where appropriate or in parallel to reduce latency and processing times. In some embodiments, one or more of the above components may be omitted. Although the above embodiments of the invention are described in reference to applying metadata to NFTs the techniques disclosed herein may be used in any of the rich media systems, permissioned blockchains, cryptographic systems, tokenization of content, and artifact origination assessments, artifact origination tokens, and other systems and processes discussed herein.

An example implementation of a personal profile functionality, in accordance with a number of embodiments of the invention, is illustrated in FIG. 23A. Profile applications 2310 running on mobile devices may include management interfaces for entering and storing various features. Such features may include, but are not limited to personal profile details 2312, public and secret key generation and management interface 2314, any necessary DRM tools 2316 for publishing and protecting content, and an ability to share 2318 information with other applications, users, family members, colleagues, and organizations.

An example implementation of an NFT marketplace 2322 functionality, in accordance with various embodiments of the invention, is illustrated in FIG. 23B. An example marketplace application 2320 running on mobile devices, may include, but is not limited to an NFT shopping experience where users may purchase, and/or rent NFTs available for license 2326. NFT marketplace applications may also incorporate advertisement 2324 capabilities. Marketplace applications 2320 may include, but are not limited to, a search capability 2328 and an ability to share 2329 information with other applications, users, family members, colleagues, and organizations.

Figure 23D:
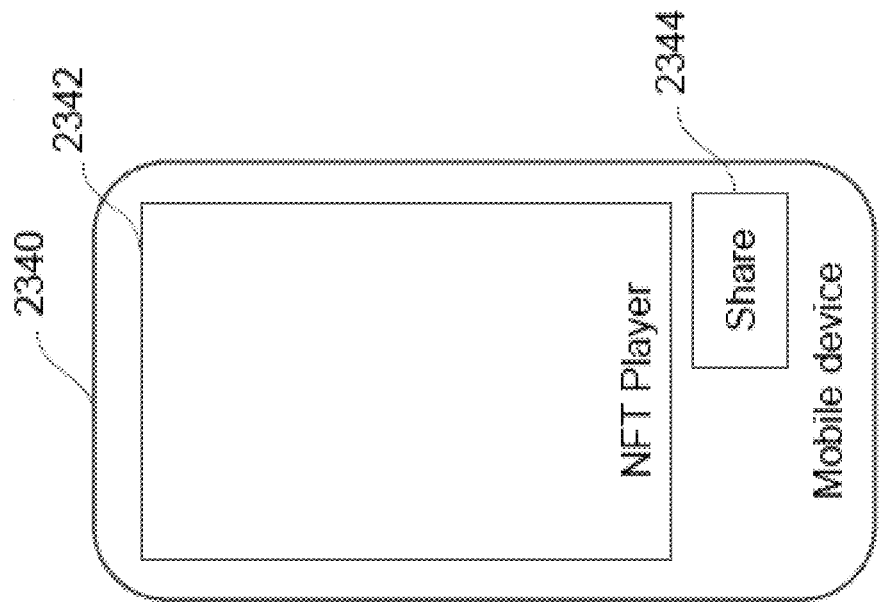
FIG. 23D conceptually illustrates an example implementation of an NFT media player functionality.
Figure 23C:
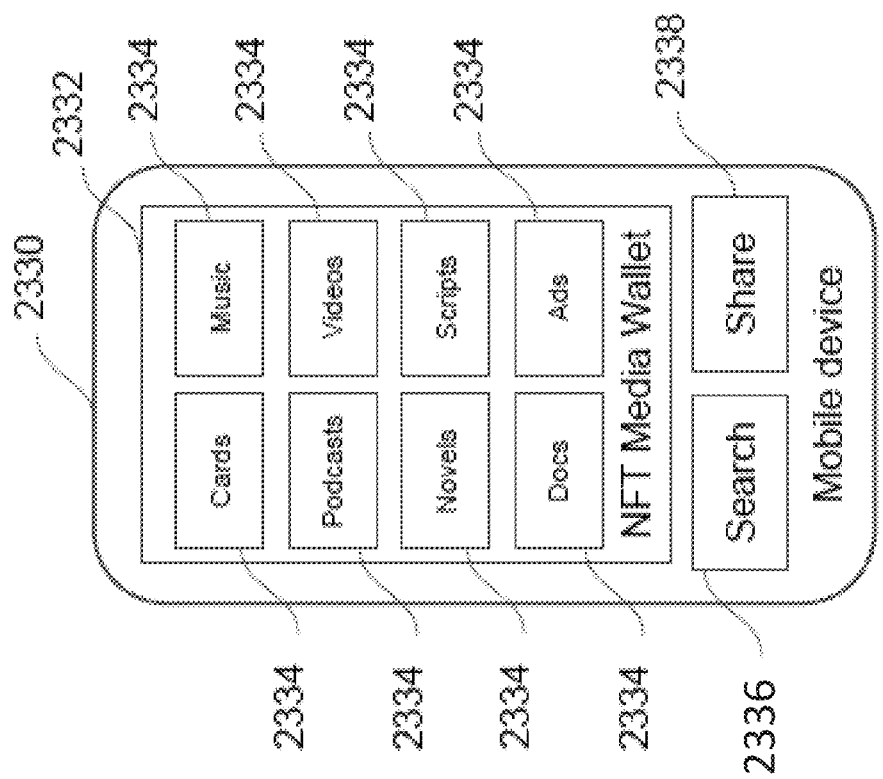
FIG. 23C conceptually illustrates an example implementation of an NFT media wallet functionality.

An example implementation of an NFT media wallet 2332 functionality, in accordance with many embodiments of the invention, is illustrated in FIG. 23C. The media wallet application 2330 running on mobile devices may include, but is not limited to a media wallet 2332 housing references to NFTs 2334 presently licensed to the device owner. Housed NFTs may include, but are not limited to, NFTs 2334 for cards, music, podcasts, video, novels, scripts, documents, and advertisements. To assist users, media wallet applications 2330 may include search capabilities 2336 and share 2338 functions to share information with other applications, users, family members, colleagues, and organizations.

An example implementation of an NFT media player functionality, in accordance with numerous embodiments of the invention, is illustrated in FIG. 23D. Media player applications 2340 running on mobile devices may include the capacity to display content from media wallets 2332 on NFT Players 2342. For convenience, media player applications 2340 may include, but are not limited to share 2344 functions to share information with other applications, users, family members, colleagues, and organizations.

An example implementation of an NFT content creation functionality, in accordance with certain embodiments of the invention, is illustrated in FIG. 23E. Content creation applications 2350 running on mobile devices may include, but are not limited to, the ability to capture 2351 content, mix 2352, review 2353, and publish 2354. Publishing 2354 may involve, but are not limited to minting NFTs, placing them in the media wallet, and/or making them available for license. To assist users in collaborations, content creation applications 2350 may include, but are not limited to, direct message 2355 capability and share 2356 functions to share information with other applications, users, family members, colleagues, and organizations.

An example implementation of an NFT content publishing functionality, in accordance with various embodiments of the invention, is illustrated in FIG. 23F. Publishing applications 2360 running on mobile devices may include, but are not limited to, the ability to configure DRM tools 2361, metadata tools 2362, policy selections 2363, and the ability to mint the pre-configured NFT 2364 content and policies. To assist users in collaborations, the publishing application 2360 may include, but are not limited to, direct message 2365 capabilities and share 2366 functions to share information with other applications, users, family members, colleagues, and organizations.

An example implementation of an NFT asset management functionality specifically for the NFT assets produced by the owner, in accordance with some embodiments of the invention, is illustrated in FIG. 23G. Asset management applications 2370 running on mobile devices may include, but are not limited to, the capacity to initiate a variety of NFT asset functions 2371. token asset functions 2371 may include, but are not limited to the ability to view asset lists, manage the asset locations, manage the individual assets, and view statistics for the assets in the system. To assist users in collaborations, asset management applications 2370 may include, but are not limited to, asset alert 2372 capabilities and share 2373 functions to share information with other applications, users, family members, colleagues, and organizations.

An example implementation of an NFT asset statistics 2376 functionality specifically for the NFT assets produced by the owner, in accordance with many embodiments of the invention, is illustrated in FIG. 23H. Asset statistics applications 2375 running on mobile devices may include, but are not limited to, the capacity to review a variety of NFT asset statistics 2376. NFT asset statistics 2376 may include, but are not limited to asset usage, asset reports, and asset alerts. Asset statistics applications 2375 may also provide the ability to manage asset financials 2377. To assist users, asset statistics applications 2375 may include, but are not limited to, direct message 2378 capabilities and share 2379 functions to share information with other applications, users, family members, colleagues, and/or organizations.

Figures 23I, 23J:
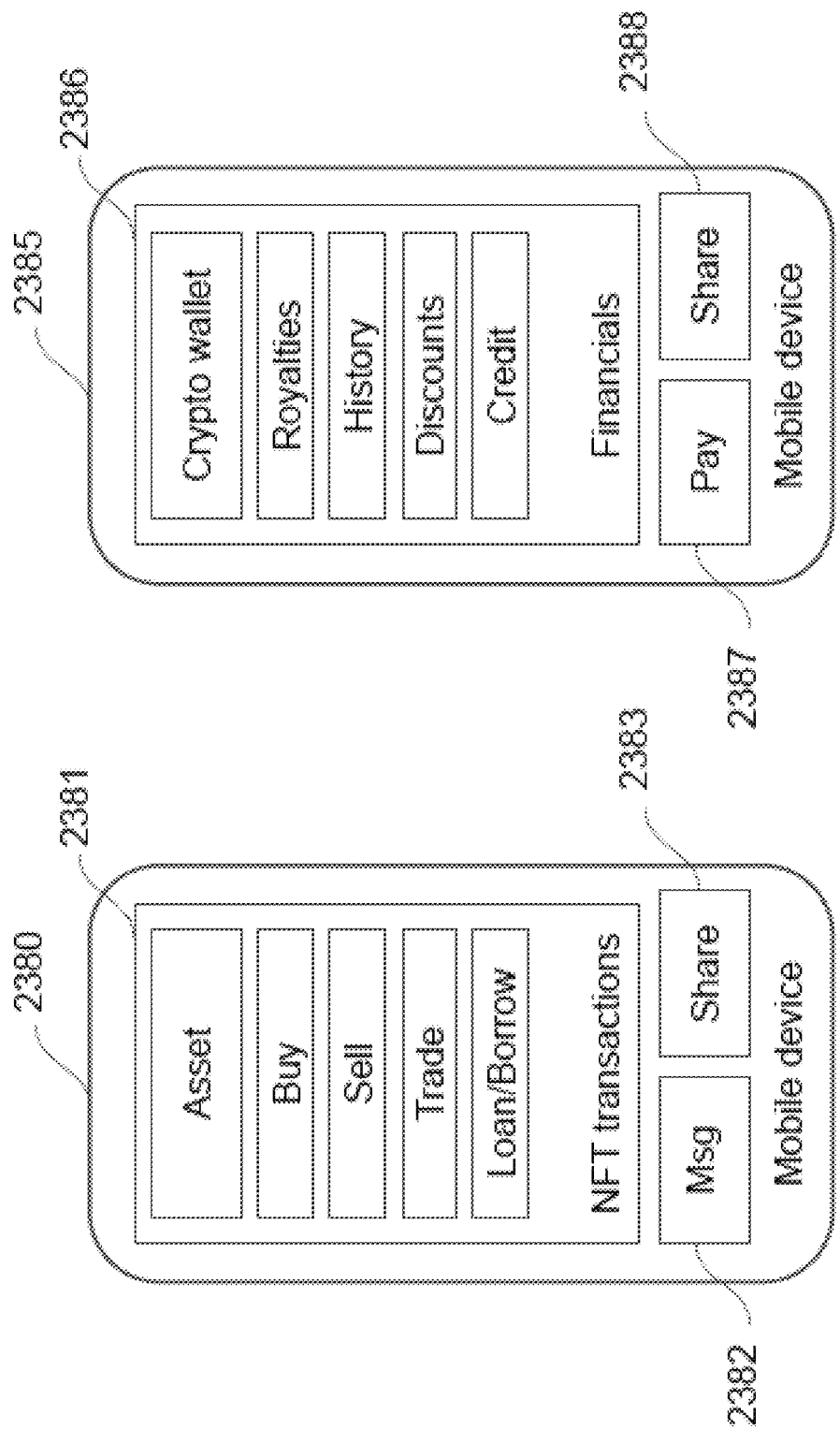
FIG. 23I conceptually illustrates an example implementation of an NFT transaction functionality specifically for NFT assets produced by the owner.
FIG. 23J conceptually illustrates an example implementation of an NFT cryptocurrency wallet financial functionality specifically for the NFT assets produced by the owner.

An example implementation of an NFT transaction 2381 functionality specifically for NFT assets produced by the owner, in accordance with a number of embodiments of the invention, is illustrated in FIG. 23I. NFT transaction applications 2380 running on mobile devices may include, but are not limited to, the capacity to initiate a variety of NFT transactions 2381. token transactions 2381 may include, but are not limited to, the ability to view a particular asset, buy, sell, trade, loan, and borrow NFTs. To assist users, the NFT transaction application may include, but are not limited to, direct message 2382 capabilities and share 2383 functions to share information with other applications, users, family members, colleagues, and organizations.

An example implementation of an NFT cryptocurrency wallet financial functionality specifically for the NFT assets produced by the owner, in accordance with many embodiments of the invention, is illustrated in FIG. 23J. The financial application 2385 running on mobile devices may include, but are not limited to, the capacity to initiate a variety of financial directed functions 2386. Financial-directed functions may include but are not limited to, the ability to manage the crypto wallet, view and manage royalties from NFT licensing, view financial transaction history, issue and manage discounts, and issue credits. To assist users, the application may include, but are not limited to, payment portal 2387 capabilities and share 2388 functions to share information with other applications, users, family members, colleagues, and organizations.

Figures 23K, 23L:
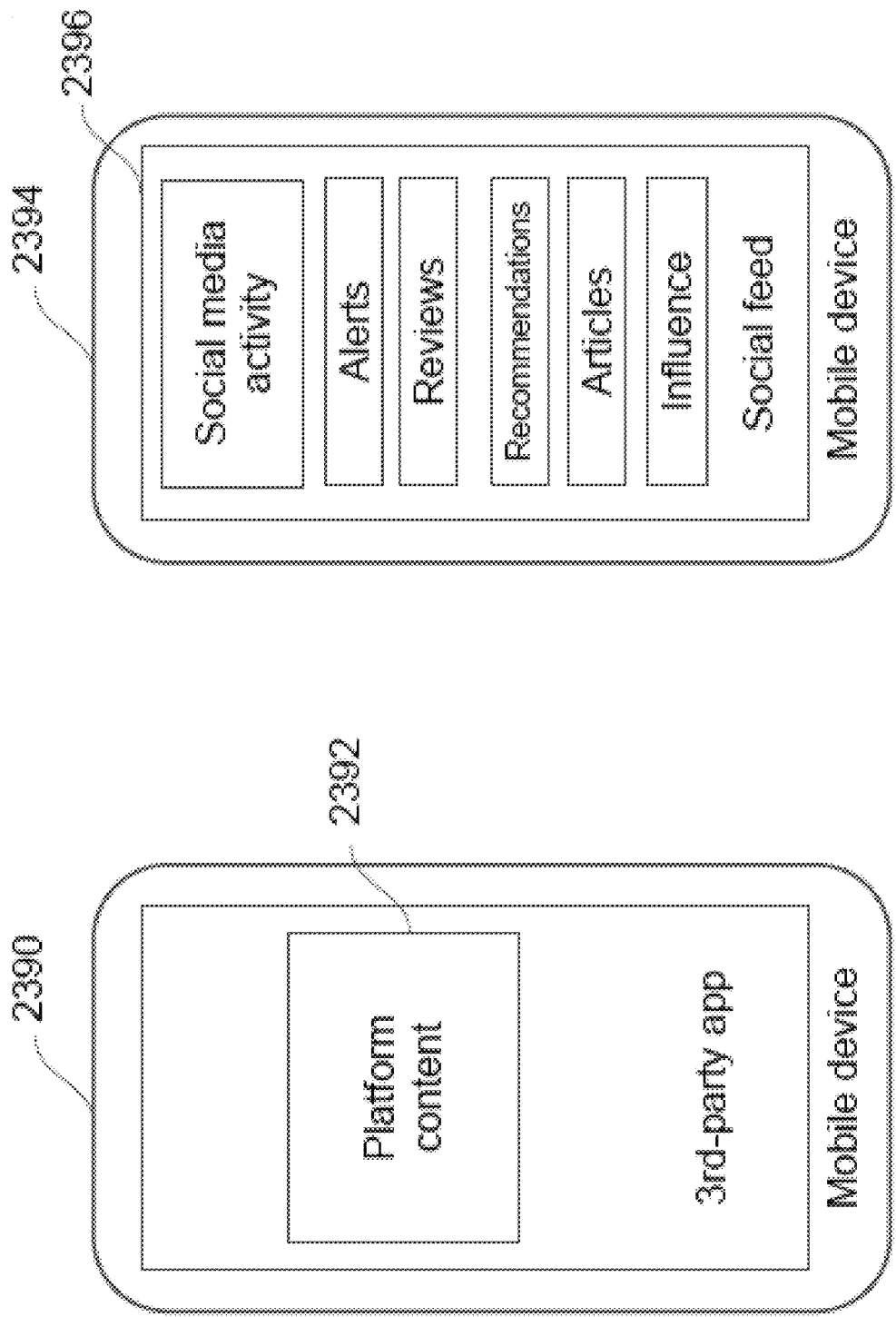
FIG. 23K conceptually illustrates an example implementation of a 3rd-party application.
FIG. 23L conceptually illustrates an example implementation of a social media interface functionality.

An example implementation of a 3rd-party application 2390 operating on mobile devices, in accordance with certain embodiments of the invention, is illustrated in FIG. 23K. In accordance with a number of embodiments, 3rd-party applications 2390 may include and/or produce platform content 2392. The platform content 2392 may include, but is not limited to licensed NFTs.

An example implementation of a social media interface functionality, in accordance with various embodiments of the invention, is illustrated in FIG. 23L. The social media application 2394 running on mobile devices may include a variety of social feed functions 2396. The social feed functions may include, but are not limited to, the ability to interface with dedicated and/or 3rd-party social media platforms, the ability to view, send, and/or manage alerts, reviews, and recommendations produced by the owner and/or others, view and manage saved articles, and an interface to view the owner's influence status on the platform.

Systems in accordance with numerous embodiments of the invention can work with both public and private decentralized ledgers containing, among other things, tokens. In several embodiments, application systems can be deployed within organizations. In various embodiments of the invention, music memes can be hosted in applications on computing devices (e.g., a mobile devices) where users are able to create, browse, socialize and/or interact with collections of content. Using computing devices, users can use embedded sensors to interact with music memes. For example, a musician sings a melody into the phone, while using the accelerometer on the phone to change a filter audio effect on the recorded voice in real-time. Users listening and/or playing back the recorded music meme, can also use the accelerometer to create audio effects and thereby modify the played back music meme. In some embodiments, different content creators can generate and synchronize different types of content to each other. For example, a movie may be synchronized with the drum beat of a solo, while the lighting may be synchronized with the pitch of the trumpet solo. In another example, content creators can incorporate samples including vocalizations in a way that is aligned with the changing of scenes in the movie. In accordance with various embodiments of the invention, several entities can all collaborate with each other, to attach, combine, overlay and/or otherwise modify content to generate composite content. In various embodiments, meta-tokens can identify how the content of individual tokens representing original content can be combined and modified. In some embodiments, distribution of content can be performed in terms of the distribution of meta-tokens that select and modify other content sources. Content sources can include tokens representing original content. Users and/or other entities can modify meta-tokens to generate new combinations of content, and can substitute and/or enhance components of the content.

In many embodiments, composite tokens can include constituent tokens. Constituent tokens can be associated with policies. Policies can include access rights, royalties, distribution rights and other DRM policies. Meta-tokens can be associated with policies. In some embodiments, when multiple policies overlap (e.g., tokens with different policies have been combined to generate composite tokens), the most constraining policies can determine what actions are permitted. Tokens (e.g., meta-tokens) can include policies identifying whether derivative works are permitted and if so, what DRM constraints apply. Derivative works can be new combinations of content elements. One example of a constraint is that content can be played freely, but that anonymized logs must be transmitted to the originator. Anonymized logs can describe the usage (e.g., the context of the usage, the number of times the content is used, and/or some non-identifying demographic information). Another example can require either full identity information and/or payment, where the payment can be anonymous, to use the content in a derivative work.

In many embodiments, use policies can be associated with any content. Policies can be inherited by meta-tokens that derive from token contents. In accordance with embodiments of the invention, access policies can specify that to render the content associated with a token, an advertisement needs to be displayed. Policies can specify the advertisement, and/or the advertisement may be selected based on contextual information. Contextual information can include information related to the viewing user, the content, the demographic of the accessing user, recent actions by the user and/or events associated with the accessing user. Policies can specify how revenue from selling advertisements is shared between different originators of content associated with content to be rendered. In various embodiments, when users request content, processes can access token licenses and policies. Based on the token licenses and policies the process can recognize requirements to play advertisements before allowing access to the request content. Advertisements played can be pre-selected by the policy, can be selected from a pre-selected group of advertisements, and/or can be selected by comparing users' personal preferences and demographics to various classifications. In some embodiments, a content-access policies for advertisements can match users' recent social media interactions with relevant advertisements. In various embodiments, displayed advertisements can include options to select more information about the product, and/or options to view the partial and/or full advertisement. In many embodiments, plays of advertisements can cause a partial and/or full advertising revenue payments to automatically transfer to relevant owners of content. In various embodiments, advertising payments can be shared between platform providers and content owners.

In several embodiments, browsing systems enable users to browse collections of content. Browsing systems can have features that sort and/or filter files by genre, location, language, and/or instruments, etc. Browsing systems can also include recommendation engines. Recommendation engines are disclosed in U.S. patent application Ser. No. 17/806,728, entitled "Systems and Methods for Encrypting and Controlling Access to Encrypted Data Based Upon Immutable Ledgers," filed Jun. 13, 2022, the disclosure of which is incorporated by reference herein in its entirety. Some embodiments allow licensees to save, store, and export licensed NFTs.

Systems in accordance with some embodiments of the invention can allow content creators to upload completed content. In some embodiments, machine learning can be used to identify portions of the content for marketing. In some embodiments, machine learning can be used to identify target audiences for content. Identifying portions of content to use for marketing and identifying target audiences are disclosed in U.S. patent application Ser. No. 17/806,728, entitled "Systems and Methods for Encrypting and Controlling Access to Encrypted Data Based Upon Immutable Ledgers," filed Jun. 13, 2022, the disclosure of which is incorporated by reference herein in its entirety. For example, a machine learning system may observe posts of multiple portions (e.g., snippets) of content (e.g., content) to monitor which snippets get the most likes and licenses and/or purchases and determine a ranking of the multiple portions and their combinations. In a further example, an artificial intelligence and/or machine learning system can be configured to monitor and learn the performance of a library of content portions and resulting purchases, likes, dislikes, and/or reviews, etc. Based on the library, the system can recommend preferred portions of new content to maximize the return on the creator's efforts.

While specific systems and components for including various functionalities in applications are described above, any of a variety of systems and components can be utilized for including various functionalities in applications as appropriate to the requirements of specific applications. In certain embodiments components can be arranged in any order or sequence not limited to the order and sequence shown and described. In a number of embodiments, some of the above components may executed or perform processes substantially simultaneously where appropriate or in parallel to reduce latency and processing times. In some embodiments, one or more of the above components may be omitted. Although the above embodiments of the invention are described in reference to including various functionalities in applications the techniques disclosed herein may be used in any of the rich media systems, permissioned blockchains, cryptographic systems, tokenization of content, and artifact origination assessments, artifact origination tokens, and other systems and processes discussed herein.

Figure 24:
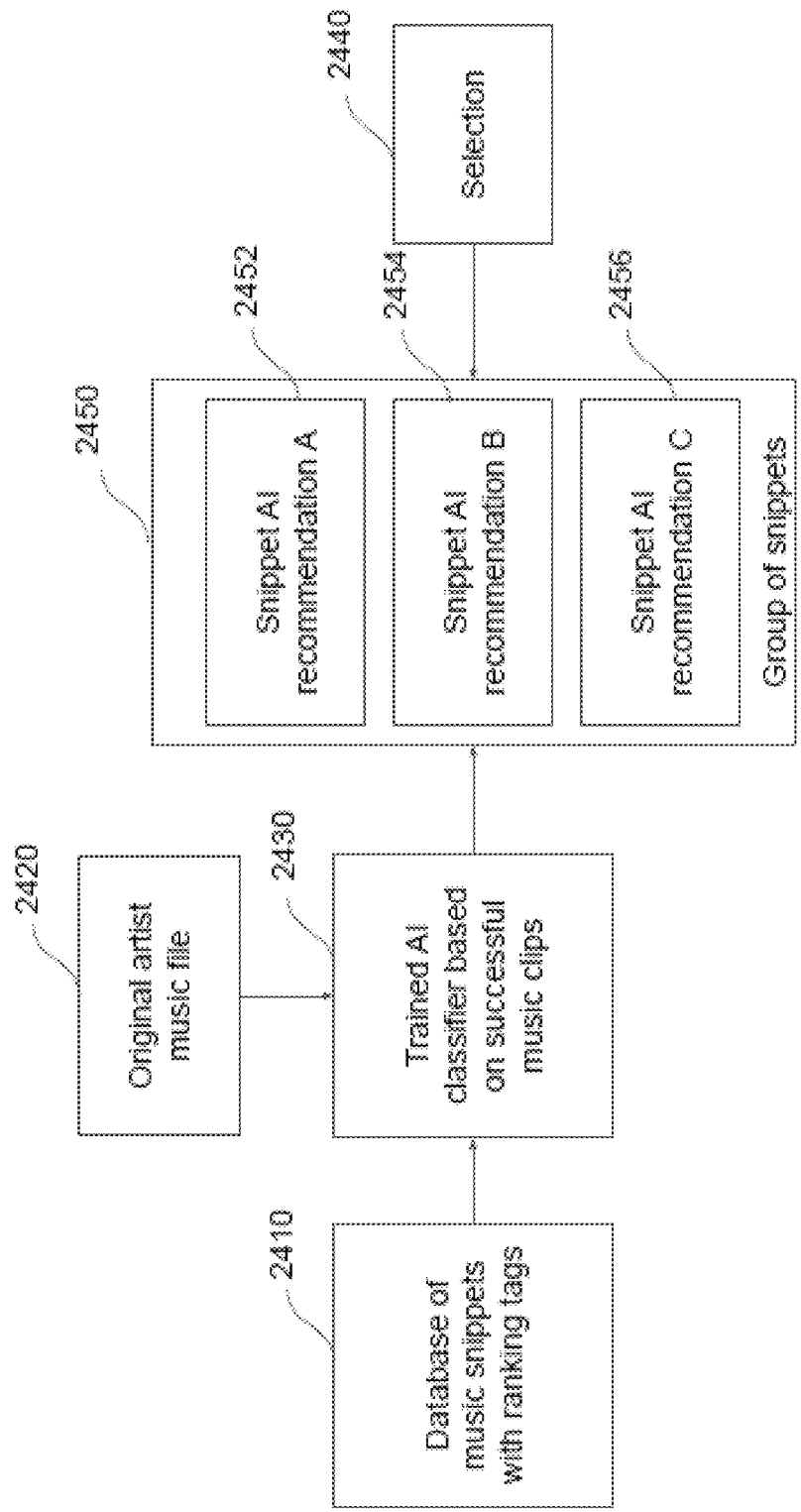
FIG. 24 conceptually illustrates a system for selecting music snippets with aid from artificial intelligence and/or machine learning.

A system for selecting music snippets (e.g., clips) with aid from artificial intelligence and/or machine learning is illustrated in FIG. 24. database of music snippets with ranking tags 2410 is utilized by a trained AI classifier based upon successful music clips 2430 along with an original artist music file 2420 with a goal of selecting 2440 the ideal music snippet to attract listeners, licensees, and/or buyers. That database contains the relative success levels of the music snippets from the past. The AI classifier 2430 creates a group of new snippets 2450 such as snippet AI recommendation A 2452, B 2454, and C 2456 from which artists and/or responsible individuals may select 2440 one or more of the snippets for use on a platform. Alternatively, the snippets may be selected by the AI for use without human selection 2440, some may be ideally selected based upon the demographics and/or personal preferences of specific listeners, and/or groups of listeners. For example, Arthur has a very large database 2410 of music snippets and rankings for how successful each song was on the platform and/or market. Bradley, one of his existing artists has a new song 2420 and wants to determine what the ideal snippet might be to maximize his financial return. Arthur uses his trained AI classifier algorithms 2430 to select one or more snippets 2450 for Bradley to select 2440 from.

In various embodiments, content can be content associated with various types of content creators, such as (but not limited to) visual artists, tattoo artists, and jewelry artists, game designers, textbook authors, and more. For example, a jewelry designer creates a design for a ring. This ring design has an associated NFT that details ownership rights of the design. Other users might take the design from the original designer, and modify it to their liking, assuming the licensing policy allows such modification, for example adding a different stone. The jewelry store and/or other user decides they like this jewelry and is able to manufacture this piece of jewelry while appropriately compensating the owners of the NFT/original designers of the ring. The various transactions can be tracked in smart contracts and enabled by various embodiments of the invention described herein. In another example, artists may create visual designs for tattoos that get stored as an NFT. Later designers may then find this design on the platform and modify it adding new elements to the original design and new NFTs can be created with a smart contract outlining rights of both artists. Now tattoo parlors can view all the designs on a system and users can choose to pick designs, attributing payment and license to the original creators.

In several embodiments, systems support the creation of tokens for content created in the past and includes abilities to document previous provenance licensing and ownership transfers, and track the subsequent provenance updates in the future. Documenting previous provenance licensing and ownership transfers, and tracking subsequent provenance updates in the future are disclosed in U.S. patent application Ser. No. 17/401,687, entitled "Proxy Management and Attribution", filed Aug. 13, 2021, the disclosures of which are incorporated by reference herein in their entirety.

Systems in accordance with some embodiments of the invention can support the creation of any number of token types, as described in U.S. patent application Ser. No. 17/808,264, entitled "Systems and Methods for Token Creation and Management," filed Jun. 22, 2022, the disclosure of which is incorporated by reference herein in its entirety. In some embodiments, supported tokens can include owner tokens, license tokens, access tokens, DRM tokens, attestation tokens, derived tokens, inheritance tokens, contract tokens, etc. In an example, a record label may have existing ownership of content and may begin creating tokens with which to begin licensing the content in the new manners disclosed herein.

Systems in accordance with various embodiments of the invention can enable creative content producers to share content with end-users. For example, content producers can share content to members of the content producer's fan club, and obtain helpful feedback and quantifiable metrics. For example, if a musician has composed 3 new melodies, and/or "hooks," they can release these hooks for their fans to consume. Based on the results of the interaction of the community (example the number of likes, shares, and/or the value of NFTs), the artist can then decide to invest more time and money into fully developing that specific hook into a full-blown song for full release. In some embodiments, fans can want to vote for preferred content, as a way of supporting and influencing their favorite artists. In various embodiments, users who are not fans of the artist but who have shown that they are bellwether users, can be sent requests to review content. In some embodiments, content can be sent for review while keeping the content generator anonymous. In various embodiments, users that provide reviews and feedback can earn badges, money, and/or access to resources.

Systems in accordance with certain embodiments can enable the creation of logs indicating who created content and what content, who accessed created content, who reacted to content (e.g., by playing it again, and/or not, and/or sharing it with others), and/or what content combinations and/or renditions were most popular.

In several embodiments, methods can be directed towards combining content, such as having an animated character from one artist sing along with music content from another artist. In various embodiments, licensing terms of tokens can allow, limit, and/or restrict the use of content in this manner.

Collaborative content generation and licensing terms of tokens allowing, limiting and/or restricting collaborative content generating are disclosed in U.S. patent application Ser. No. 17/806,724, entitled "Systems and Methods for Blockchain-Based Collaborative Content Generation," filed Jun. 13, 2022, the disclosure of which is also incorporated by reference herein in its entirety.

Content producers can feel safe using several of the aforementioned methods, as when there is a theft of material, several embodiments can be used to identify influences; detect similarities; track access; determine time-stamps for material, and more, as described elsewhere herein.

Systems and methods in accordance with certain embodiments of the invention may be free-standing. In some embodiments, systems can combine with existing content sharing systems. Existing content sharing systems can include TikTok™, Smule™, and/or Facebook™. Integration with existing content sharing systems can include providing APIs, providing the ability for existing content sharing systems to embed HTML content from other platforms. In some embodiments, free-standing systems and/or platforms can be repurposed by other services and may be implemented as white-label products.

In various embodiments, artists can create ten slightly different versions of content (e.g., a song) and upload each. The artist can then select a number of users to share each version with, and/or can select whether to identify the originating artist to these users. In several embodiments, systems can identify reactions of selected users, determine statistical significance for collections of estimates, and/or cluster the reactions by demographic groups, and provide feedback to artists. For example, an artist may receive an indication that one core audience group prefers a first version of the song, whereas another core audience group prefers a second version. This can be shown with significance estimates, and indications of what audience group is most likely to buy music from the artist.

In several embodiments, users can provide feedback in a variety of manners, some of which are implicit, and others which can be explicit. Implicit feedback can include metrics of whether users played the entire content, how many times the content was played by users, whether the content was forwarded by the users to others, and/or demographic information about users who accessed the content. Explicit feedback can include, user feedback in the form of a selection of one or more stars, a text field where users provide suggestions, audio fields where the users provide suggestions, and/or other ways of receiving inputs from users. In various embodiments, users can provide identifying information. Identifying information can be in the form of their suggestions being tokenized and linked to their identity tokens.

In several embodiments, users can enable communication, indicate a communication preference, and/or provide information enabling communication (e.g., tokens including communication handles). Information enabling communication can include persistent addresses, such as (but not limited to) email addresses and/or a phone numbers. Information enabling communication can include one-time communication references that enable the sending of one response only, in a pseudonymized manner. In several embodiments, entities (e.g., content producers) can select accepted types of communication. For example, an entity can select to only receive communications from parties that disclose their identities, and/or from anybody. In several embodiments, entities (e.g., content producers) can have policies about generating responses. Response policies can include: any-thing from a one-time address gets either an automated thank-you note and/or, if the transmitted message is deemed relevant, a longer response. Determinations of relevance can be performed at least in part automatically (e.g., by scanning messages for spam content, insults, etc., and/or blocking unwanted messages). In several embodiments, entities generating messages to send can receive indications regarding whether the generated message may violate policies (e.g., content filtering rules) of recipients. In some embodiments, suggestions for altering the message to comply with the policy can be provided. (e.g., messages can be blocked for including profanities, a suggestion can be to remove the profanities). Policies of recipients can whitelist users that belong to select groups, forums, and/or that have selected certifications.

Systems in accordance with some embodiments of the invention can process obtained feedback. Based on the obtained feedback a variety of recommendations and reports can be computed. Recommendations can be purchase recommendations to other users (e.g., users with similar characteristics). Recommendations can suggest changes and/or new material to and/or from the artist. Reports can address many facets of users' behavior. Reports can include information such as (but not limited to): how many times did users play the content in the first day and/or the first week; did users mention the content on social media; did users' social media friends make purchases; did users stop the content after 45 seconds and never play it again. Various other information can be included in reports based on information gathered from users. Information can be gathered based on content licenses.

Sometimes, movie creators create movies with two different endings. This is an expensive approach to identifying what audiences like the most. In various embodiments of the invention, a storyline creator can create a story with two different endings, and tokenize the two corresponding story elements. Tokenizing story elements is disclosed in U.S. patent application Ser. No. 17/808,264, entitled "Systems and Methods for Token Creation and Management," filed Jun. 22, 2022, the disclosure of which is incorporated by reference herein in its entirety. Different characters in the script can be represented by different ready-to-be-used avatars and/or other characters. The ready-to-be-used avatars can be matched with suitable voice models and scenes from the storylines can be generated using ready-to-be-used backgrounds. In this way, rapid generation of movies and segments of movies (including of the two different endings). In various embodiments, these movies can be shown to audiences after merely hours of computation on the input material. Various embodiments of the invention enable testing of the different endings at a lower cost than current technologies and approaches permit. Testing of alternative elements can be applied to all portions of videos and storylines, not being limited to endings. In some embodiments, a storyline can be broken up into a number of different parts (e.g., 8 parts). Each part can have one or more versions (e.g., two). Based on the parts and versions, there can be many final compilations (e.g., $2^8=256$ final compilations). In several embodiments, some compilations may be nonsensical, and a selected smaller number of resulting versions (e.g., 85 versions), may be produced. In various embodiments, a system can facilitate transmitting the produced versions to audiences (e.g., audiences of 100 users per version). In various embodiments, the audiences do not have overlapping viewers. In several embodiments, implicit and explicit feedback can be collected from the users. In various embodiments, the attentiveness of audience members can be measured to see what audience members appeared the most captivated. Measuring attentiveness of audience members can be measured as disclosed in U.S. patent application Ser. No. 17/808,264, entitled "Systems and Methods for Token Creation and Management," filed Jun. 22, 2022, the disclosure of which is incorporated by reference herein in its entirety. Based on audience feedback, hypotheses can be tested regarding audience preferences. Based on audience feedback more appealing stories can be created in short amounts of time, and with limited resources. While creators, can, in the end, create footage for several options, they will do so in a manner that has been informed by these experiments, thereby dramatically reduce costs and increase quality. These tools can facilitate various entities to create masterpieces, as they can test hypotheses and improve their scripts in a simple manner. In various embodiments, systems can be integrated with systems such Amazon Mechanical Turk™ and/or can be built to natively support crowdsourcing features, such as user authentication, user sign-up, and user feedback collection. As will be understood by skilled artisans, this example use is only illustrative, and the use of the aforementioned systems are not limited to the creation of movie scripts and can, for example, be used by composers, performers, visual artists, and more.

Systems in accordance with various embodiments of the invention can have metadata layers that describe elements of media files generated. For example, when the media file is music, metadata elements can include tempo, pitch, scale, raga, gender of voice, genre, etc. In several embodiments, metadata can be entered manually by the creator and/or by collaborating users. In several embodiments, AI systems can extract metadata automatically and store the information in media cards. Metadata can be used for sorting, browsing and querying collections of rich media files on platforms, to allow creators/collectors and users to easily find assets. For example, if a musician looking for a melody in the Key of A, that is sung by a female artist, the platform can easily find all available NFTs that match those requirements based on metadata.

Systems in accordance with some embodiments of the invention can track authorship and ownership of creative elements through NFT structures. In various embodiments, machine learning can help authors claim ownership when these assets are used as parts of a corpus of training data to build AI models. This adds a new layer to AI Training where smart contracts are correlated together into new agreements for how a particular AI model can be used commercially. For example, company A creates an algorithm that automatically determines and displays what artists are involved in a song they are listening to. Company A uses a number of songs created using elements from the platform that have smart contracts. These smart contracts may result in new smart contracts with company A which allows them to license these elements for use in their trained model.

While specific systems and components for selecting music with aid from artificial intelligence and/or machine learning are described above, any of a variety of systems and components can be utilized for selecting music with aid from artificial intelligence and/or machine learning in applications as appropriate to the requirements of specific applications. In certain embodiments components can be arranged in any order or sequence not limited to the order and sequence shown and described. In a number of embodiments, some of the above components may executed or perform processes substantially simultaneously where appropriate or in parallel to reduce latency and processing times. In some embodiments, one or more of the above components may be omitted. Although the above embodiments of the invention are described in reference to selecting music with aid from artificial intelligence and/or machine learning the techniques disclosed herein may be used in any of the rich media systems, permissioned blockchains, cryptographic systems, tokenization of content, and artifact origination assessments, artifact origination tokens, and other systems and processes discussed herein.

Figure 25:
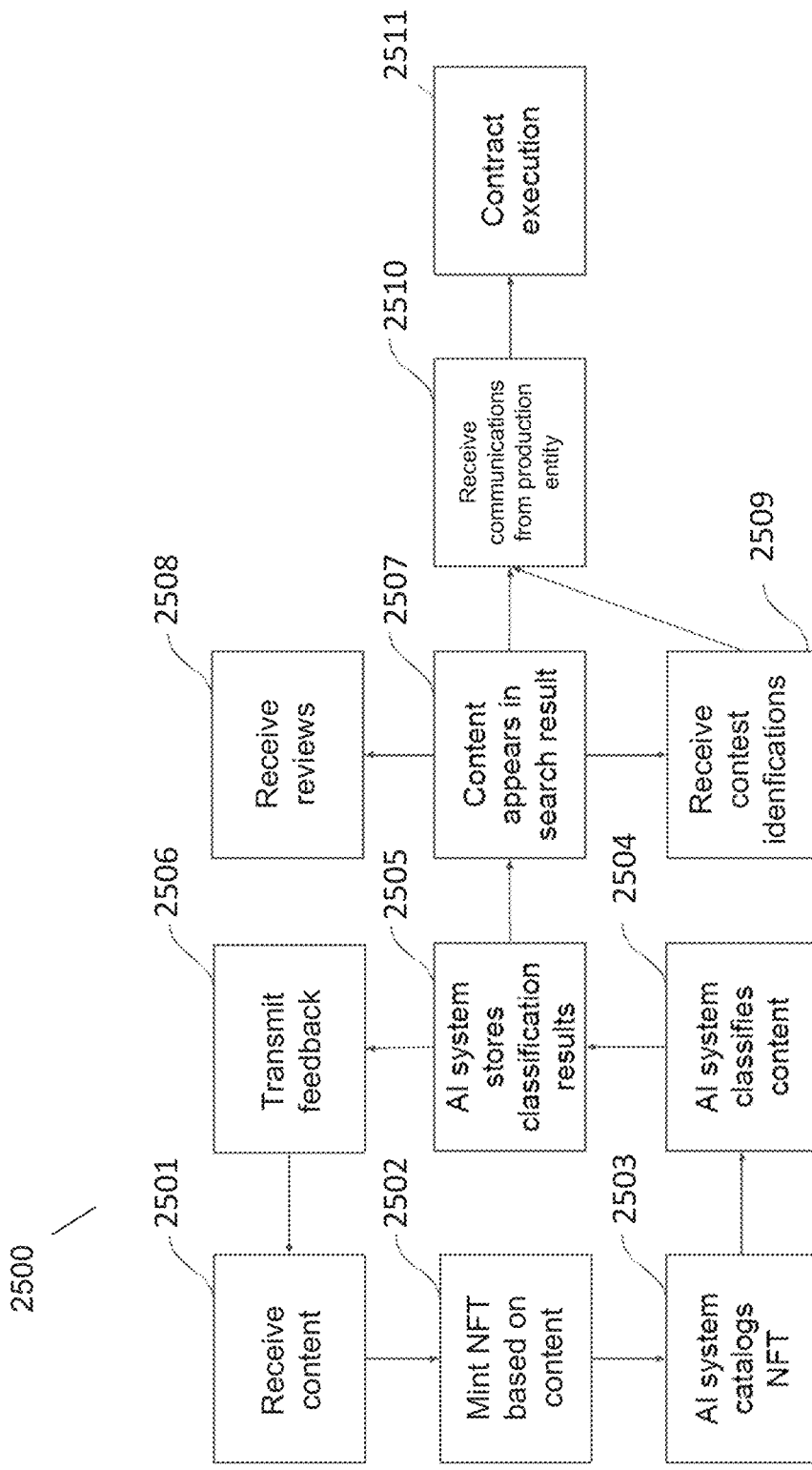
FIG. 25 conceptually illustrates an example process for enabling content to be classified by an AI system to monetize the content.

In several embodiments, processes can enable content to be classified by an AI system to monetize the content. An example process for enabling content to be classified by an AI system to monetize the content is conceptually illustrated in FIG. 25. The process 2500 can receive (2501) content. The content can be received from a content creator. The process 2500 can mint (2502) an NFT based on the received content. The process 2500 can catalog (2503) the NFT. Processes can use AI systems to catalog NFTs. The process 2500 can classify (2504) the content associated with the NFT. Processes can use AI systems to classify content. The process 2500 can store (2505) the classification results. Processes can use AI systems to store classification results. The process 2500 can transmit (2506) feedback based on the content. Feedback can be transmitted to an entity from which the content was received. Feedback can include comparisons between the content and a library of previously successful content. The process 2500 can serve (2507) the content as a search result. The process 2500 can receive (2509) contest identification for which the content may be suitable based on serving of the content in search results. The process 2500 can receive (2508) reviews based on the serving of the content in search results. The process 2500 can receive (2510) communications from production entities based on serving of the content in search results. The process 2500 can execute (2511) a smart contract licensing the content to a production entity.

In many embodiments, AI or natural language processing (NLP) can be used to analyze written content using a semantic search tree. Semantic search trees can be used to improve the quality of results returned in a search result. Semantic search trees can be used to aid in allowing others to locate quality scripts in a manner beyond simple keyword searches. For example, rather than searching through 100 scripts with a keyword of "EMP", an acronym for electromagnetic pulse, which might result in thousands of poor results, such as every instance of the word "employee." Semantic search tree solutions can enable an entity to search through all of the scripts with a natural language approach, such as: "an EMP weapon detonation" and receive improved search results. Another example is if an entity searches for the words "starry night," a famous painting by Van Gough. The result of a keyword search might return no results; however, a semantic search tree solution would result in a "Van Gogh" and other paintings and terms associated with the artist that the AI had learned over time. Semantic search trees are described in "Survey of Semantic Search Research" 2008 by Eetu Makela. In various embodiments, semantic search trees can be used with system-level features such as sorting, ranking, description generation, searching, promotion, recommendations, collaborator recommendations, and author feedback.

In a number of embodiments, inputs to the AI systems can include numerous sources such as (but not limited to) authored content, NFT data, metadata, licensing terms, authored works from existing libraries (e.g., such as the library of congress and/or online repositories), reviews associated with content, ratings, recommendations, demographic data, television and movie scripts, historical viewership and attendance information, manually entered data, and/or any other source of information about authored works. In various embodiments, the term authored can refer to written works, photographed works, art works, and/or other works generated by creators.

In several embodiments, search results can be served to entities looking to perform one or more of (but not limited to) sort, search, and locate authored works. Generation of the search results can use AI and/or NLP. Generation of search results can include deep cataloging and can access widely disseminated prior works, such as all English-speaking scripts from films produced in the past 50 years, professional and consumer ratings and reviews, and the demographics of reviewers. In various embodiments, search results can be generated based on inputs from a user. Users can select a variety of inputs to narrow the search results. For example, the reviewer might choose, filters such as: English language only, authors with at least 4 out of 5 stars in the system, a storyline arch that closely matches a particular work, and a specified level of emotional content. In many embodiments, the search results can be received by a requesting entity through a mobile device application, such as on a tablet, and/or through a browser, such as on a personal computer. User interfaces can include search, recommendations, options such as pull-down selections, slider adjustments, radio buttons, and/or semantic search criteria, as described herein. In several embodiments, AI systems can generate classifications for content based on input data provided by the author and/or based on received content. In some embodiments, AI systems can generate inputs to a search based on search criteria provided by an entity. User interfaces can include search options. Search options can include: type of document, such as a script; language, such as English; time period, such as early 1900s; genre, such as war drama; locations, such as England; storyline arching pattern or amplitude comparisons to existing films, such as similar to the film 1917; emotional content, such as highly-emotional; cultural characteristics, such as anti-war stance; author ratings, such as 4 or more stars out of 5; expected film length, such as 140 minutes; number of primary characters, such as 12; target audience demographics, such as USA resident males aged 15 to 40; and an option to include existing film titles from which the system may generate similar script possibilities. Searching entities can also select options based upon the licensing models for associated with the search content. For example, a searching entity can select only content associated with low-cost exclusive licensing models. In some embodiments, results can be filtered based on the content having not appeared in prior search results.

In several embodiments of the invention, content can be captured within an application. Content can be captured directly in a mobile wallet application additionally capable of minting content into tokens. The application can be further capable of distributing and licensing the tokens—such as through online NFT marketplaces, storing the tokens—whether in a traditional centralized or decentralized storage system or database, advertising and recommending content, and communicating between the authors, editor, reviewers, influencers, and anyone involved in the market. Methods of tokenizing content are disclosed in co-pending application titled Methods of tokenizing content are disclosed in co-pending U.S. Provisional Patent Application No. 63/220,641 filed Jul. 12, 2021 titled "Tokenization and Quantification of Creative Content Elements", which is incorporated by reference in its entirety. Methods for advertising and recommending content are disclosed in co-pending U.S. Provisional Patent Application No. 63/223,099 filed Jul. 19, 2021 titled "Advertisement Portability Method", which is incorporated by reference in its entirety.

In a number of embodiments, processes can enable receiving feedback from others, reviews, recommendations, comparative metrics. Processes can enable marketplaces for authoring services, such as editing. Example methods for receiving feedback and enabling marketplaces are disclosed in co-pending U.S. patent application Ser. No. 17/806,728 filed Jun. 13, 2022 titled "Systems and Methods for Encrypting and Controlling Access to Encrypted Data Based Upon Immutable Ledgers", by Markus Jakobsson, Stephen C. Gerber, and Ajay Kapur, and is incorporated by reference in its entirety.

In many embodiments, a content creator (e.g., authors) can elect to mint an NFT representing a particular work, in a manner with tightly-controlled licensing policies. The policies can restrict access to the work to selected entities only. Access restrictions can include restricting access with traditional logins, restricting access with public key/secret key access systems, and/or restricting access to only those capable of accessing a control system from a specific email registration domain.

In several embodiments, content creators (e.g. authors) can receive requests to generate content specifically for an entity. In various embodiments, content creators can mint NFTs to enable copyright protections, such as restricting the production company from sharing the work with 3rd-parties.

In a number of embodiments, content creators can mint NFTs with policies that enable characterization, searching, and recommendation by the described AI system, but with restrictions on the viewers capable of including the work in output content. Content creators can generate tokens from content. The origination of these tokens can be established. Methods for generating tokens from content are disclosed in co-pending U.S. patent application Ser. No. 17/808,264 filed Jun. 22, 2022 titled "Systems and Methods for Token Creation and Management" by Markus Jakobsson and Stephen C. Gerber, which is incorporated by reference in its entirety. Methods of establishing the origination of a token or NFT are disclosed in co-pending U.S. Provisional Patent Application No. 63/220,488 filed Jul. 10, 2021 titled "Content Origin Determination and Tokenization" by Markus Jakobsson, which is incorporated by reference in its entirety.

In a variety of embodiments, NFT minting processes can include using a variety of information, such as (but not limited to) the date and time created, for the purpose of proving provenance of an NFT. The generation of content in the authoring space can be primarily digital and may involve movie scripts, scripts for television, plays, music lyrics, novels, textbooks, immersive experiences, video games, articles, journals, reports, etc. Systems and methods in accordance with many embodiments of the invention can allow authors to record or otherwise capture their created content. Authors can mint non-fungible tokens (NFTs) to capture their original content and simultaneously set the license terms, typically copyrights, for use by other parties. In several embodiments, license terms can be expressed using smart contracts. License terms can require that the content be accessed in specified digital rights management (DRM) modules or trusted execution environments (TEEs). Examples of licensing terms requiring that the content be accessed in specified digital rights management (DRM) modules or trusted execution environments (TEEs) are co-pending U.S. Provisional Patent Application No. 63/220,488 filed Jul. 10, 2021 titled "Content Origin Determination and Tokenization" by Markus Jakobsson, which is incorporated by reference in its entirety.

While specific processes for enabling content to be classified by an AI system to monetize the content are described above, any of a variety of processes can be utilized for enabling content to be classified by an AI system to monetize the content as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to enabling content to be classified by an AI system to monetize the content the techniques disclosed herein may be used in any of the rich media systems, permissioned blockchains, cryptographic systems, tokenization of content, and artifact origination assessments, artifact origination tokens, and other systems and processes discussed herein.

Figure 26:
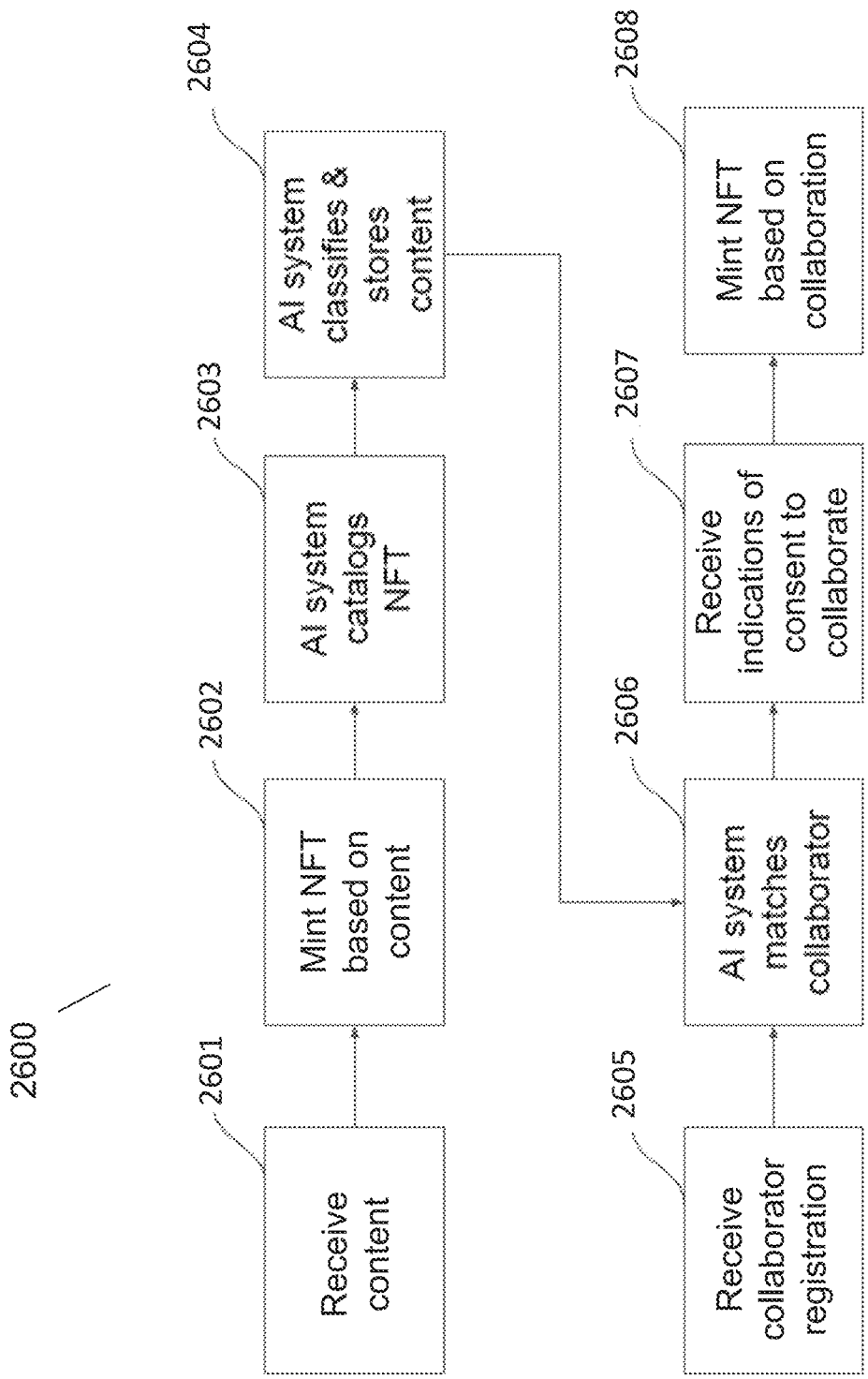
FIG. 26 conceptually illustrates an example process for enabling generation of collaboratively generated NFTs.

In various embodiments, processes can enable generation of collaboratively generated NFTs. An example process for enabling generation of collaboratively generated NFTs is conceptually illustrated in FIG. 26. The process 2600 can receive (2601) content. The content can be received from a content creator. The process 2600 can mint (2602) an NFT based on the received content. The process 2600 can catalog (2603) the NFT. Processes can use AI systems to catalog NFTs. The process 2600 can classify and store (2604) the content associated with the NFT. Processes can use AI systems to classify content. Processes can use AI systems to store classification results. The process 2600 can receive (2605) collaborator registrations. Collaborator registrations can be a registration with a system by a collaborator entity. The process 2600 can match (2606) a collaborator entity with the received content. Processes can use AI systems to match collaborators to content. The matched collaborator entity can be matched based on the collaborator entity's self-ascribed capabilities during registration, or based on previous works associated with the collaborator entity. The previous works can be stored in a library. The process 2600 can receive (2607) indications of consent to collaborate. The indications of consent to collaborate can be received from the entity from which the content was received, and from a matched collaborator. The process 2600 can mint an NFT based on collaboration between the matched collaborator and the entity from which the content was received.

In various embodiments, AI, NLP systems and/or user interfaces for searching and recommending content, can match content from separate content creators. For example, proposed or developed characters from a first content creator can be matched with stories from a second content creator. For example, a professional author and historian in London enjoys developing characters in 100-page descriptions; but has never felt successful about her work as a story author. Another author in Los Angeles enjoys authoring dystopian novels about alternative outcomes of historical events, but does not want to spend the arduous time developing characters. In some embodiments, the authors, having submitted their proposed, partial, or completed works to the platform, can be matched such that the two authors may collaborate on the final work product.

While specific processes for can enabling generation of collaboratively generated NFTs are described above, any of a variety of processes can be utilized for enabling generation of collaboratively generated NFTs as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to enabling generation of collaboratively generated NFTs the techniques disclosed herein may be used in any of the rich media systems, permissioned blockchains, cryptographic systems, tokenization of content, and artifact origination assessments, artifact origination tokens, and other systems and processes discussed herein.

Figure 27:
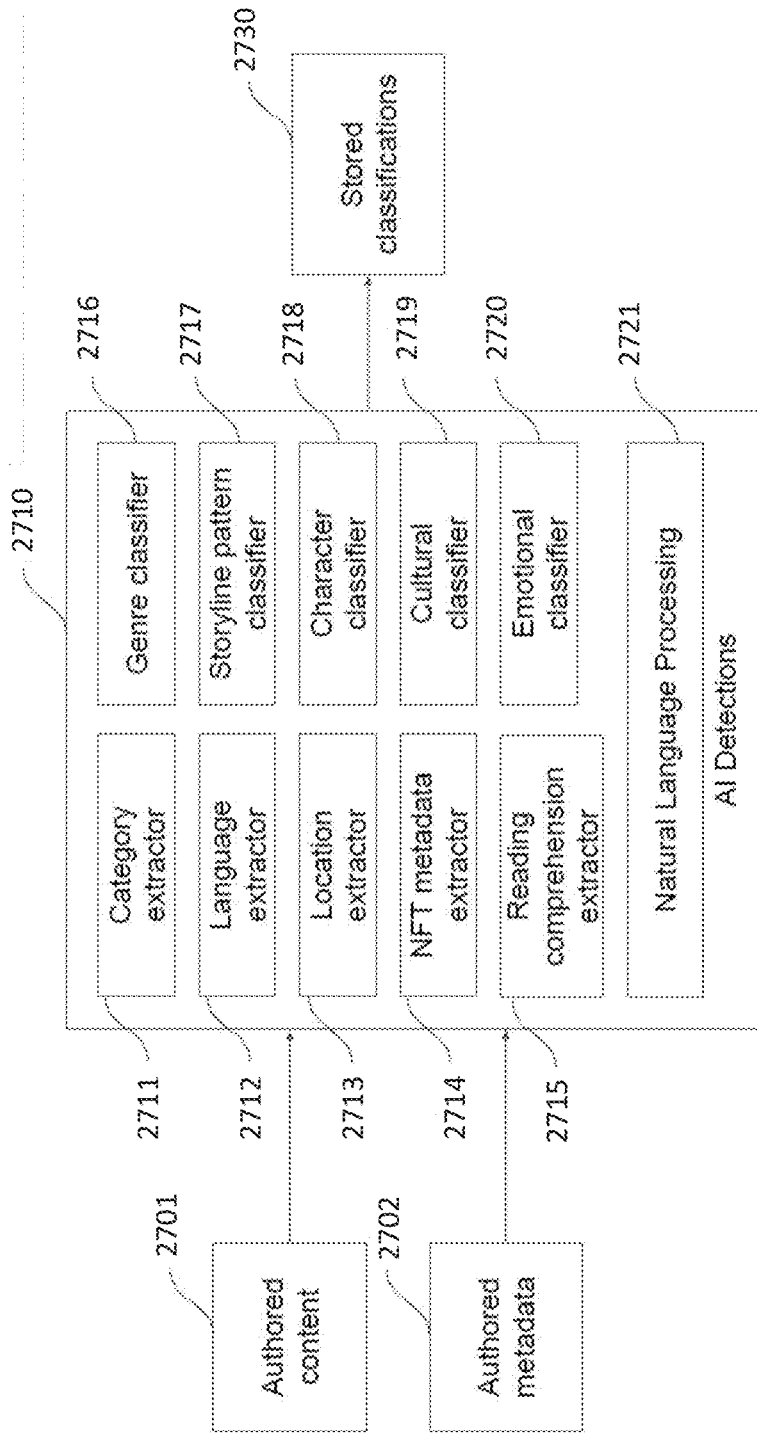
FIG. 27 conceptually illustrates an example of a system for using AI and natural language processing (NLP) to generate classifications based on content and metadata.

In several embodiments, processes can use AI and natural language processing (NLP) to generate classifications based on content and metadata. An example of a system for using AI and natural language processing (NLP) to generate classifications based on content and metadata is conceptually illustrated in FIG. 27. Authored content 2701, such as a text (e.g., a novel, and/or a script) or another type of content, can be received by an AI detection system 310. Metadata 2702 can be received by the AI detection system 310. The metadata can be received from an author associated with authored content and/or from a minted NFT. Both the authored content and the metadata can be received as part of an NFT. The AI detection system 2710, with natural language processing module 2721 can be utilized to extract and classify details from the authored content 2701, including (but not limited to): category extraction 2711, language extraction 2712, location extraction 2713, NFT metadata extraction 2714, reading comprehension level extraction 2715, genre classification 2716, storyline pattern classification 2717, character classifiers 2718, cultural classifications 2719, and emotional classification 2720. The resulting classification data can be stored 2730.

In many embodiments, processes can generate categorizations and/or classifications based on received content, based on categorizations from authors, and/or based on metadata associated with received content of NFTs. Categorizations and/or classifications can include categories, such as (but not limited to) novel, script or article, language, such as Portuguese or English, described locations, such as Spain, Italy, and Indonesia. In various embodiments, processes can determine reading comprehension levels based on received content, categorizations by authors, and/or based on metadata. Reading comprehension levels can be used to match reader capability with content.

In various embodiments, authored content, such as scripts for film, television, video, theater, or novels, short stories, articles, journals, non-text content, etc. can be tokenized as NFTs. In several embodiments, authored content can be processed with categorization of verified features such as genres, languages, locations, diversity, genders, emotional content, storyline patterns, cultural aspects, etc. In many embodiments, the content, including its categorization and metadata can be used by artificial intelligence (AI) and natural language processing (NLP) engines to parse and analyze the content to provide enhanced high-throughput sorting, search, evaluation, ranking, description generation, review, promotions, author feedback, and/or recommendation functionality. In several embodiments, systems can include user interfaces for inputting content, such as by authors, interfaces for controlling the system, such as by system administrators, and interfaces for extracting knowledge from the system, such as by film producers in accordance with many embodiments of the invention, systems can have crowdsourced methods of ranking and a community generated slate of editorial services or collaborators for member writers.

In many embodiments, AI and/or NLP systems can classify, storylines according to story arcs of written content. Storyline arcs describe the emotional and well-being ups and downs that characters experience as a story progresses. The storyline classification can be performed from any of (but not limited to) the perspective of a character, place, and/or thing. For example, the main character in a novel can undergoes periods of, for instance, calm, distress, adversity, and elation. These periods might be classified as "good things" and "bad things" affecting the character.

A popular storyline arch of a novel, that symbolizes the human condition, often crests up and down, often starting with calm, a long period of bad things, and finally a long period of good things. In certain embodiments, AI and/or NLP systems can perform classifications of various portions of a novel to classify the relative levels of good and bad times experienced by one or more characters. In various embodiments, sentiment analysis can be used to classify the emotional well-being of characters. Based on classifications of the story arch and/or characters system-level features such as sorting, ranking, description generation, searching, promotion, recommendations, collaborator recommendations, and/or author feedback can be improved. Classifications of storyline arching can be applied to works, such as (but not limited to) chatbots, lyrics, novels, poems, articles, and similar types of publications. In several embodiments, AI and NLP methods are used together. For example, an NLP component can extract keywords and determine one or more topics corresponding to these keywords, and feed this information to an AI component that determines a classification based on the one or more topics. One example classification may be "young adult", for example, and example keywords may include "exciting", "teens", "pets", "puberty", and "goofy".

In some embodiments, AI and/or NLP systems can analyze content for emotional classifications. In a number of embodiments, sentiment analysis can be used to determine the emotional content of sentences and paragraphs thereby classifying the emotional choices by the author. Based on classifications of emotional choices, the emotional choices can be compared to other works. AI and/or NLP systems can use natural language processing to analyze scripts with sentiment analysis techniques to classify the emotional swings and patterns associated with characters. The classification can be compared between different works to find matches. A match can indicate content with similar emotional swings and patterns associated with characters. For example, a character in a horror story may undergo extreme levels of fear as the story unfolds. Sentiment analysis, focused on words and phrases with similarity to fear, can enable a classification of the story or script such that it may be compared with other successful and unsuccessful stories and scripts based upon reviews, etc. In this example, a machine learning system can analyze various previous works to build a database of classifications with associated quality scores, such as between 0 and 1, based at least in part on reviews of these prior works. Classifications based on emotional swings and patterns of characters can provide improved system-level features such as sorting, ranking, description generation, searching, promotion, recommendations, collaborator recommendations, and author feedback. Classifications of emotional content can be used with various works, such as chatbots, lyrics, novels, poems, articles, and similar types of publications.

In certain embodiments, AI and/or NLP systems can analyze content for classification of character evolution. In various embodiments, sentiment analysis can determine the evolution of characters. For example, a new script might closely match the evolution of a local police officer searching for a rather large shark in a very popular movie. Determining similarities in the evolution of the characters can assist AI and/or NLP systems in characterizing the relative quality or likely success of the new script. Classifications based on character evolution can improve system-level features such as (but not limited to) sorting, ranking, description generation, searching, promotion, recommendations, collaborator recommendations, and author feedback. Classifications of character evolution can be used with various works, such as (but not limited to) short stories, novels, articles, and similar types of publications.

In many embodiments, AI and/or NLP systems can analyze content for classification of cultural content. In several embodiments, sentiment analysis can determine the cultures within the author's work. For example, an English script from India may be different culturally from an English script from the US. Cultural characterization may be important to entities as they search for content fitting their target audience. In an example, an AI and/or NLP system can evaluate previous works to build a database of classifications with associated cultural-specific quality scores, such as between 0 and 1, based at least in part on reviews of these prior works. For example, a script from India, written by a content creator that has traveled the world may score 0.8 for Indian cultural references and 0.1 for UK-specific cultural influences and 0.1 for Australian cultural influences. The sum of cultural influences need not add to 1. Cultural classifications can be important when reviewing or searching for content written in non-English. Classification based on cultural influences can improve system-level features such as sorting, ranking, description generation, searching, promotion, recommendations, collaborator recommendations, and author feedback.

In various embodiments, scripts for film, tv, video, theater, etc. can be tokenized as NFTs. NFTs can have vast classifications such as (but not limited to) action, drama, location, diversity, genders, etc. Several embodiments, can include crowdsourced methods for ranking content, and/or community generated slates of editorial services for member writers.

In many embodiments, rights modifying units can be associated with tools used for licensed purchases of content. An example of such a tool is a marketplace with a user interface, wherein a user can select content to obtain a license for the content.

In several embodiments, the rights modifying units can be associated with tools used for rendering content, such as a browser with a DRM plugin, a movie rendering application running on a TEE, and/or a physical projector as used in a movie theatre.

While specific systems and components for AI and/or NLP systems for generating classifications based on content and metadata are described above, any of a variety of systems and components can be utilized for AI and/or NLP systems for generating classifications based on content and metadata as appropriate to the requirements of specific applications. In certain embodiments components can be arranged in any order or sequence not limited to the order and sequence shown and described. In a number of embodiments, some of the above components may executed or perform processes substantially simultaneously where appropriate or in parallel to reduce latency and processing times. In some embodiments, one or more of the above components may be omitted. Although the above embodiments of the invention are described in reference to AI and/or NLP systems for generating classifications based on content and metadata the techniques disclosed herein may be used in any of the rich media systems, permissioned blockchains, cryptographic systems, tokenization of content, and artifact origination assessments, artifact origination tokens, and other systems and processes discussed herein.

Figure 28:
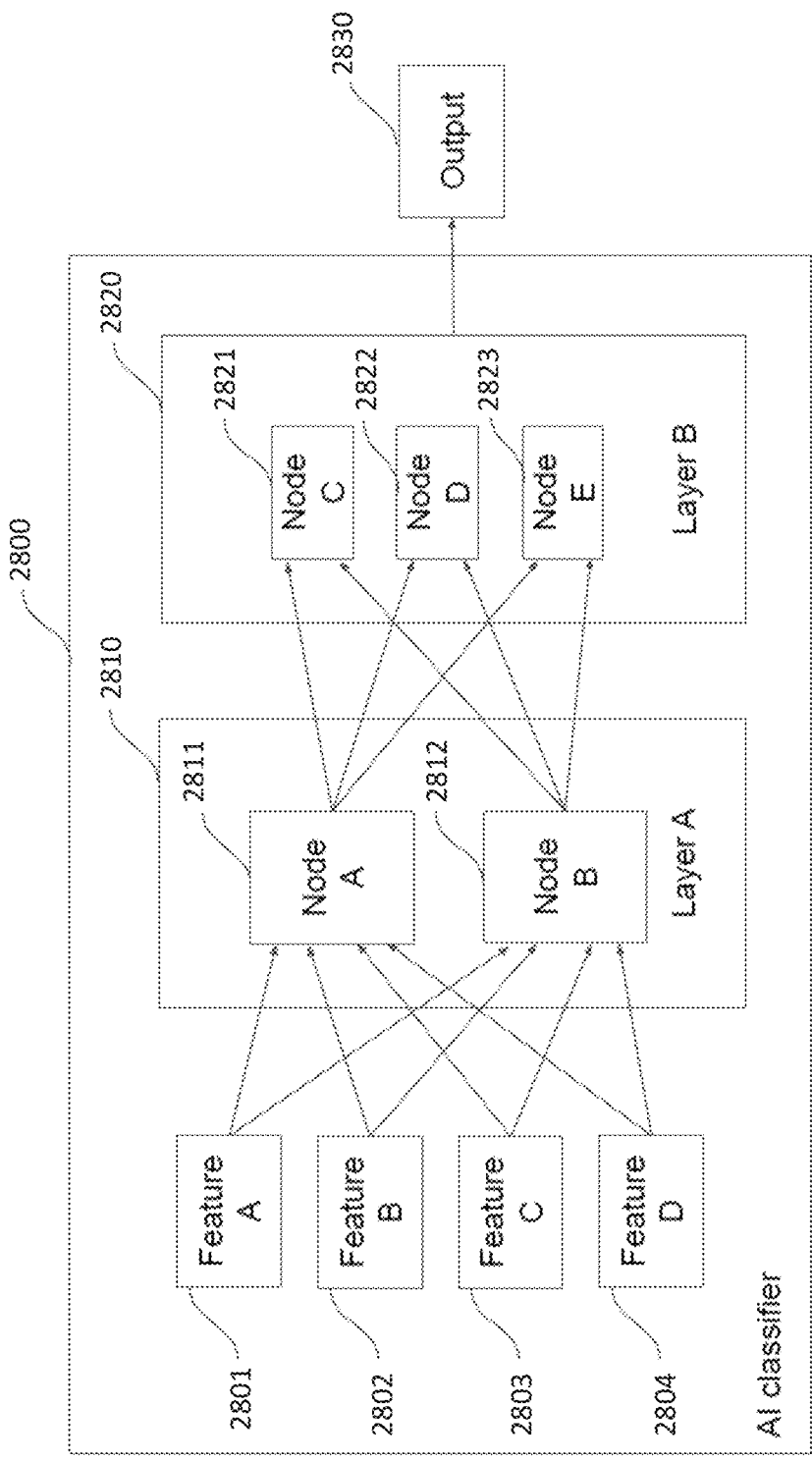
FIG. 28 conceptually illustrates an example AI classifier for discerning characteristics of authored content.

In various embodiments, AI classifiers can be used to discern characteristics of authored content. An example AI classifier for discerning characteristics of authored content is conceptually illustrated in FIG. 28. The example illustrates a trained AI classifier 2800 utilized for discerning whether a novel file is fiction or nonfiction. The AI classifier 2800 is provided with four features, feature A 2801, feature B 2802, feature C 2803, and feature D 2804. Feature extraction can be performed as part of the classifier, or performed separately. Feature A 2801 may describe the time period. A novel depicted in the year 2090 is fictional. Feature B 2802 may describe biographical characteristics such as those in a historical biography. Feature C 2803 may describe location details. Feature D 2804 may describe the type of storyline arc. The features can be input to a sequence of hidden layers of neural network processing. Each layer, layer A 2810 and layer B 2820 can contain nodes, such as node A 2811, node B 2812, node C 2821, node D 2822, and node E 2823. Each node, during operation, can include a weight, such as a value between 0 and 1 corresponding to the match between an input and an associated training value. The weights can be processed by the neural network to output 2830 a value of either fiction or nonfiction. The number of layers, the number of nodes at each layer and the weights at each hidden layer node describe the neural network model; these key values may be stored on blockchains.

While specific systems and components for AI classifiers for discerning characteristics of authored content are described above, any of a variety of systems and components can be utilized for AI classifiers for discerning characteristics of authored content as appropriate to the requirements of specific applications. In certain embodiments components can be arranged in any order or sequence not limited to the order and sequence shown and described. In a number of embodiments, some of the above components may executed or perform processes substantially simultaneously where appropriate or in parallel to reduce latency and processing times. In some embodiments, one or more of the above components may be omitted. Although the above embodiments of the invention are described in reference to AI classifiers for discerning characteristics of authored content the techniques disclosed herein may be used in any of the rich media systems, permissioned blockchains, cryptographic systems, tokenization of content, and artifact origination assessments, artifact origination tokens, and other systems and processes discussed herein.

Figure 29:
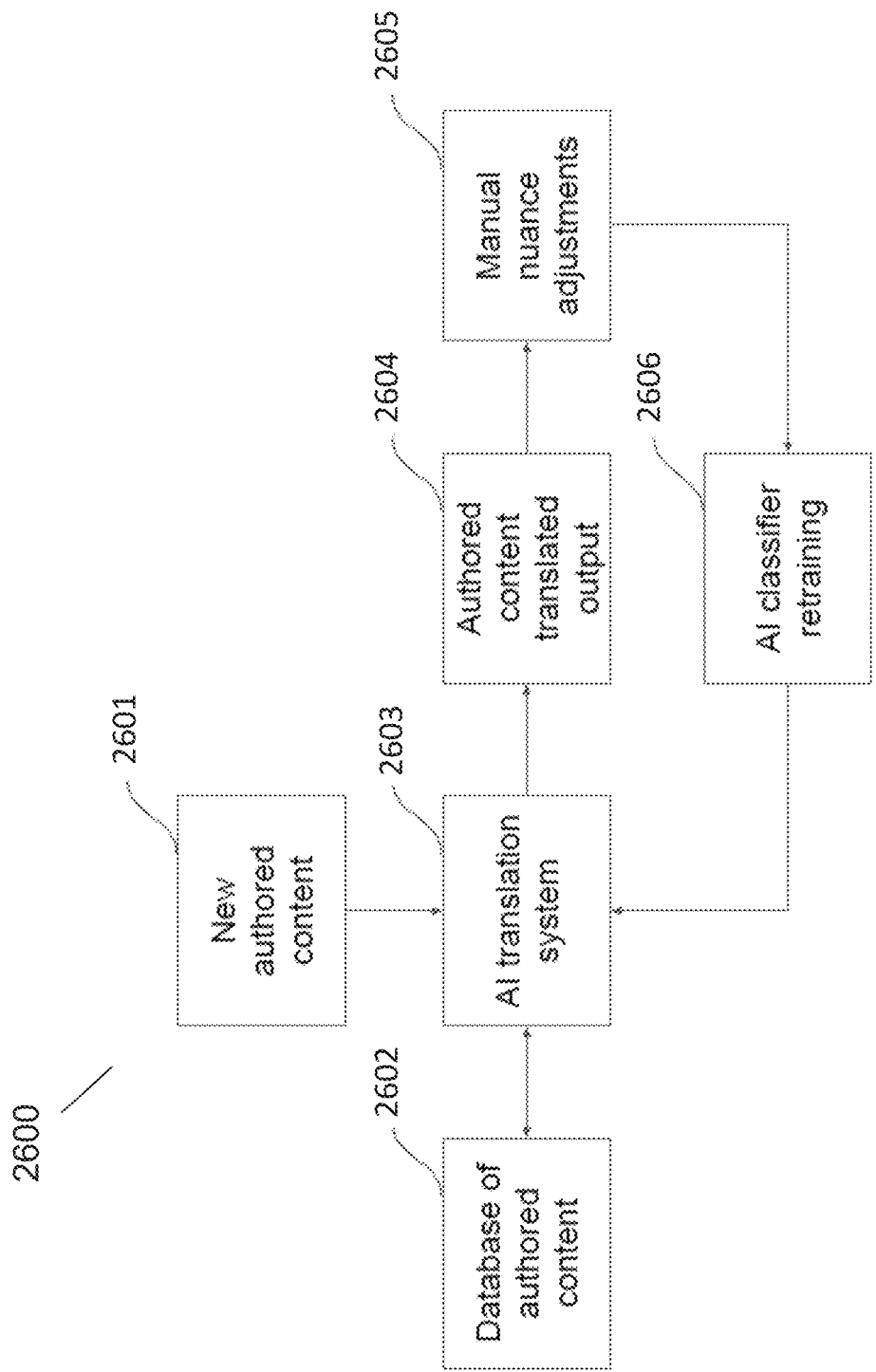
FIG. 29 conceptually illustrates an example of an AI translation learning system.

In several embodiments, AI translation learning systems can translate content. An example of an AI translation learning system is conceptually illustrated in FIG. 29. New authored content 2901 can be provided as input to an AI translation system 2903. AI translation system 2903 can have access to a database of authored content 2904 and can provide authored content translation 2904. A review, as may be performed by the original author, a human translator, or an editor can result in manual nuance adjustments 2905. The manual nuance adjustments can be provided to the AI translation system 2903 in a feedback mechanism for AI classifier retraining 2906. The completed translation can be stored by the AI translation system 2903, and/or within a database of authored content 2902.

In a number of embodiments, AI and/or NLP systems can use translation techniques to convert authored content (e.g., scripts or other works), from one language to another. In various embodiments, collaborator inputs can be translated by machine before being made available to other entities. In various embodiments, systems can rely on existing AI and/or NLP translation systems. In many embodiments, the AI and/or NLP translation system can be improved based on added transfer learning provided by databases of authored content-specific content (e.g., scripts), and/or manual nuance adjustments. The transfer learning and adjustments can generate a large dataset and uniquely trained AI that understand the nuances of narrative language as offered during the storytelling process across cultures and languages.

While specific systems and components for AI translation learning system are described above, any of a variety of systems and components can be utilized for AI translation learning system as appropriate to the requirements of specific applications. In certain embodiments components can be arranged in any order or sequence not limited to the order and sequence shown and described. In a number of embodiments, some of the above components may executed or perform processes substantially simultaneously where appropriate or in parallel to reduce latency and processing times. In some embodiments, one or more of the above components may be omitted. Although the above embodiments of the invention are described in reference to AI translation learning system the techniques disclosed herein may be used in any of the rich media systems, permissioned blockchains, cryptographic systems, tokenization of content, and artifact origination assessments, artifact origination tokens, and other systems and processes discussed herein.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A device configured to broadcast blocks incorporating artifact origination tokens, the device comprising:
   a network interface;
   a memory; and
   a processor, the processor configured to:
      obtain an artifact origination token, wherein the artifact origination token comprises:
         an artifact-to-time association element, the artifact-to-time association element comprising:
            an artifact reference corresponding to an artifact generated using a trusted service; and
            a timestamp comprising a reference to the artifact reference;
         a certifier descriptor indicating a certifier public key; and
         a certifier digital signature, the certifier digital signature generated based on the certifier public key and the artifact-to-time association element;
      access a ledger entry comprising the artifact origination token and a public key;

compute a challenge using a cryptographic system, wherein the challenge is based on the ledger entry; and broadcast a block that incorporates the ledger entry to securely add the block to a distributed ledger, wherein the block is capable of being validated by using a cryptographic system to obtain a proof based on the challenge.

2. The device of claim 1, wherein broadcasting the block comprises:
receiving:
the block; and
origination evidence comprising a series of timestamps associated with a series of versions of the artifact; and
obtaining the proof based on the block and the origination evidence.

3. The device of claim 2, wherein the origination evidence is generated based on a timestamped version of the artifact.

4. The device of claim 2, wherein the origination evidence is at least one of:
evidence of possession of the artifact, wherein the evidence of possession of the artifact is obtained from the trusted service; or
an assertion of possession of the artifact, wherein the assertion of possession of the artifact is obtained from the trusted service.

5. The device of claim 1, wherein the artifact reference is a URL linking to where the artifact is stored.

6. The device of claim 1, wherein the artifact-to-time association element further comprises at least one of:
an artifact checksum, wherein the artifact checksum verifies that the artifact is not corrupted;
a certainty score, wherein the certainty score corresponds to a degree of certainty of validity for the timestamp;
an origination assessment score, wherein the origination assessment score corresponds to a likelihood that generation of the artifact, as identified by the artifact reference, is authentic;
a precision score, wherein the precision score corresponds to a likelihood that the artifact, as identified by the artifact reference, is authentic; or
a context descriptor, wherein the context descriptor describes at least part of the artifact-to-time association element.

7. The device of claim 1, wherein the proof is generated based on an iterative process.

8. The device of claim 1, wherein the timestamp further comprises at least one of:
a reference to a blockchain;
an assertion to the timestamp by a trusted entity; or
an origination timestamp, wherein the origination timestamp identifies a point of creation for the artifact.

9. The device of claim 1, wherein the proof comprises a proof of origination.

10. The device of claim 1, wherein the artifact is a document.

11. A method for broadcasting blocks incorporating artifact origination tokens, the method comprising:
obtaining an artifact origination token, wherein the artifact origination token comprises:
an artifact-to-time association element, the artifact-to-time association element comprising:
an artifact reference corresponding to an artifact generated using a trusted service; and
a timestamp comprising a reference to the artifact reference;
a certifier descriptor indicating a certifier public key; and
a certifier digital signature, the certifier digital signature generated based on the certifier public key and the artifact-to-time association element;
accessing a ledger entry comprising the artifact origination token and a public key;
computing a challenge using a cryptographic system, wherein the challenge is based on the ledger entry; and
broadcasting a block that incorporates the ledger entry to securely add the block to a distributed ledger, wherein the block is capable of being validated by using a cryptographic system to obtain a proof based on the challenge.

12. The method of claim 11, wherein broadcasting the block comprises:
receiving:
the block; and
origination evidence comprising a series of timestamps associated with a series of versions of the artifact; and
obtaining the proof based on the block and the origination evidence.

13. The method of claim 12, wherein the origination evidence is generated based on a timestamped version of the artifact.

14. The method of claim 12, wherein the origination evidence is at least one of:
evidence of possession of the artifact, wherein the evidence of possession of the artifact is obtained from the trusted service; or
an assertion of possession of the artifact, wherein the assertion of possession of the artifact is obtained from the trusted service.

15. The method of claim 11, wherein the artifact reference is a URL linking to where the artifact is stored.

16. The method of claim 11, wherein the artifact-to-time association element further comprises at least one of:
an artifact checksum, wherein the artifact checksum verifies that the artifact is not corrupted;
a certainty score, wherein the certainty score corresponds to a degree of certainty of validity for the timestamp;
an origination assessment score, wherein the origination assessment score corresponds to a likelihood that generation of the artifact, as identified by the artifact reference, is authentic;
a precision score, wherein the precision score corresponds to a likelihood that the artifact, as identified by the artifact reference, is authentic; or
a context descriptor, wherein the context descriptor describes at least part of the artifact-to-time association element.

17. The method of claim 11, wherein the proof is generated based on an iterative process.

18. The method of claim 11, wherein the timestamp further comprises at least one of:
a reference to a blockchain;
an assertion to the timestamp by a trusted entity; or
an origination timestamp, wherein the origination timestamp identifies a point of creation for the artifact.

19. The method of claim 11, wherein the proof comprises a proof of origination.

20. The method of claim 11, wherein the artifact is a document.

* * * * *